(12) United States Patent
Fonnum et al.

(10) Patent No.: US 10,836,854 B2
(45) Date of Patent: Nov. 17, 2020

(54) INVERSE UGELSTAD PARTICLES

(71) Applicant: LIFE TECHNOLOGIES AS, Olso (NO)

(72) Inventors: Geir Fonnum, Oslo (NO); Nils Pontus Lundberg, Strømmen (NO); Muhammed Talha Gokmen, Fjellhamar (NO); Synne Larsen, Oslo (NO); Wilhelm Glomm, Malvik (NO); Heidi Johnsen, Trondheim (NO); Ruth Schmid, Tiller (NO); Lars Kilaas, Trondheim (NO)

(73) Assignees: SINTEF, Trondheim (NO); LIFE TECHNOLOGIES AS, Oslo (NO)

( * ) Notice: Subject to any disclaimer, the term of this patent is extended or adjusted under 35 U.S.C. 154(b) by 0 days.

(21) Appl. No.: 15/745,620

(22) PCT Filed: Jul. 19, 2016

(86) PCT No.: PCT/EP2016/067218
§ 371 (c)(1),
(2) Date: Jan. 17, 2018

(87) PCT Pub. No.: WO2017/013138
PCT Pub. Date: Jan. 26, 2017

(65) Prior Publication Data
US 2018/0215852 A1 Aug. 2, 2018

(30) Foreign Application Priority Data
Jul. 20, 2015 (GB) .................................. 1512725.1

(51) Int. Cl.
*C08F 265/10* (2006.01)
*C08F 120/54* (2006.01)
*C08F 265/06* (2006.01)

(52) U.S. Cl.
CPC .......... *C08F 265/10* (2013.01); *C08F 120/54* (2013.01); *C08F 265/06* (2013.01)

(58) Field of Classification Search
CPC ..... C08F 265/10; C08F 265/06; C08F 120/54
See application file for complete search history.

(56) References Cited

U.S. PATENT DOCUMENTS

| 4,539,200 A * | 9/1985 | Quarfoot .............. A61K 31/785 |
| | | 424/78.06 |
| 6,133,047 A * | 10/2000 | Elaissari .................. B03C 1/01 |
| | | 427/127 |
| 2013/0210991 A1 | 8/2013 | Fonnum et al. |

FOREIGN PATENT DOCUMENTS

| CN | 1631913 A | 6/2005 |
| EP | 1564227 | 8/2005 |
| EP | 1564227 A1 * | 8/2005 ............ C08F 257/02 |
| JP | S62135573 A | 6/1987 |
| JP | H081895 A | 1/1996 |
| JP | 2002542318 A | 12/2002 |
| JP | 2005501960 A | 1/2005 |
| WO | WO-03022316 A1 | 3/2003 |
| WO | WO-2004/011513 | 2/2004 |
| WO | WO-2017013138 A1 | 1/2017 |

OTHER PUBLICATIONS

International Search Report and Written Opinion 2016, 1-10.

* cited by examiner

*Primary Examiner* — Robert D Harlan

(57) ABSTRACT

This invention relates to monodisperse cross-linked hydrogel polymer particles comprising a polymer formed from (a) a hydrophilic vinylic monomer; and (b) a crosslinker comprising at least two vinyl groups. The invention also relates to monodisperse seed particles with a Z-average diameter of from 100 nm to 1500 nm that comprise a plurality of non-crosslinked oligomers of poly N,N-dimethylacrylamide. Also provided are methods of forming the monodisperse cross-linked hydrogel polymer particles and monodisperse seed particles.

18 Claims, 3 Drawing Sheets

INVERSE UGELSTAD PARTICLES

CROSS-REFERENCE TO RELATED APPLICATIONS

This application is a National Stage 371 of PCT/EP2016/067218 filed on Jul. 19, 2016, which claims priority to GB 1512725.1 filed on Jul. 20, 2015, which disclosures are herein incorporated by reference in their entirety.

This invention relates to monodisperse polymer particles useful in biological assays and other applications, and seed particles used in processes of preparing the monodisperse polymer particles. The invention also relates to processes for preparing such particles and, intermediates used in such processes and methods of using the particles, as well as other subject matter.

BACKGROUND

Emulsion polymerisation can be used to form relatively monodisperse polymer particles of from 50-1,000 nm. The formation of monodisperse polymer particles does, however, have a number of important limitations. Firstly, all of the particles must be formed as part of the same batch and within a short timespan relative to the polymerization time. Secondly, growth conditions need to be controlled to ensure that growth of the polymer particles is identical in all particles. Thirdly, as the process requires that monomer is transferred from large reservoir droplets and swelled into the growing particles, the particles are either not crosslinked, or have a very low level of crosslinking, as higher levels of crosslinking will prevent the particles swelling.

Precipitation or dispersion polymerisation may be used to create larger particles, of 0.5-10 micron. Precipitation polymerisation is carried out in a solvent (e g alcohols) that dissolves the monomer, but not the polymer. Monodispersity can be achieved when the polymer precipitates out of solution and particles formation happens in a short time span. A relatively large amount of steric stabilizer is required to stabilize the particles after precipitation. The amount and type of stabilizer may change the size of the particles, and porous particles can be obtained by use of a high level of crosslinker. The conditions in precipitation polymerisation are, however, difficult to control, for example it is very difficult to control porosity, which is a result of how the pore structure is built up when the polymers precipitate out of solution. The difficulties of precipitation polymerisation mean that in practice it is nearly impossible to produce porous particle with the same monomer composition and porosity for more than a very limited size variation.

One way to address some of the issues is to produce crosslinked porous or solid monodisperse polymer particles by a two stage process, named the Ugelstad process after the late Professor John Ugelstad, which is described for example in EP-B-3905 and U.S. Pat. No. 4,530,956. An improved Ugelstad process is described in WO 00/61647. In the Ugelstad process, seed particles, suitably made by emulsion polymerization, are converted in two steps into monodisperse particles by seeded suspension polymerization. In a first step, the seed particles are swollen by making a fine (e.g. submicron) aqueous emulsion of a relatively low molecular weight water-insoluble substance and then adding a water-miscible organic solvent (e.g. acetone) so that the water-insoluble substance diffuses into the seed particles. It is convenient for the water-insoluble substance to be a heat-activated polymerisation initiator. In a second step, the solvent is then removed, locking the water-insoluble substance in the seed particles, and the seed particles take up a large quantity of monomer and also a crosslinker. Following initiation of polymerization, e. g. by heating to activate the initiator, larger polymer particles are produced. The Ugelstad process therefore comprises making seed particles by emulsion polymerization and expanding the seed particles by suspension polymerization. The smallest monodisperse particles described in the aforementioned prior art have an average diameter of 1 μm.

In a simplified version of the Ugelstad process, the enhanced capacity for swelling may be achieved simply by the use of oligomeric seed particles, e.g. where the oligomer weight average molecular weight corresponds to up to 50 monomer units (a molecular weight of about 5000 in the case of polystyrene). This is described in U.S. Pat. No. 4,530,956. In another version of the Ugelstad process, described in WO2010/125170, oligomeric seed particles can be used to make monodisperse particles with an average diameter in the submicron range.

Particles made by the Ugelstad process and its variants as described above are made from hydrophobic monomers, such as styrene, typically using oil (discontinuous phase) in aqueous (continuous phase) systems. The resulting polymer particles are therefore hydrophobic. Hydrophobic particles suffer from the problem of non-specific absorption when used in biological applications. This means that hydrophobic polymer particles are typically surface modified to increase the hydrophilicity of the surface prior to use in biological applications.

US 2014/0073715 describes a method of producing monodisperse hydrophilic particles. The method uses monomers that have a hydrophobic protection group added to the monomers that polymerize to form the particles and removing the protection group afterwards. This approach provides good results. Addition and removal of the protecting group does, however, add to the complexity of the process and may limit the number of different types of monomer that can be used in the process.

It is apparent that known monodisperse polymeric particles and methods of making such particles are subject to a number of limitations. There is therefore a need for new monodisperse polymeric particles and new methods of production.

It is an aim of the invention to provide monodisperse polymeric particles and methods of making monodisperse polymeric particles with a low coefficient of variation (CV) and/or low % polydispersity. It is also an aim of the invention to provide seed particles suitable for making such monodisperse particles.

BRIEF SUMMARY OF THE DISCLOSURE

The invention is based in part on an appreciation that seed particles comprising hydrophilic oligomers may be used in a novel process for forming cross-linked monodisperse polymeric particles.

In accordance with a first aspect of the present invention there are provided monodisperse crosslinked hydrogel polymer particles comprising a polymer formed from (a) a hydrophilic vinylic monomer having a log $P_{oct/wat}$ (log P) of less than about 1; and (b) a crosslinker comprising at least two vinyl groups.

A second aspect of the invention provides monodisperse seed particles with a Z-average diameter of from 100 nm to 1500 nm, wherein each seed particle comprises a plurality of non-crosslinked oligomers of poly N,N-dimethylacrylamide.

A third aspect the invention provides a method of forming monodisperse seed particles. The method comprises dissolving N,N-dimethylacrylamide, a stabilizer, a radical initiator and a chain transfer agent in an organic solvent to form a reaction mixture; and heating the reaction mixture to activate the initiator; thereby forming the monodisperse seed particles.

A fourth aspect comprises the use of seed particles of the invention to form monodisperse crosslinked hydrogel polymer particles. The monodisperse crosslinked hydrogel polymer particles may be crosslinked polyacrylamide particles. The seed particles may be seed particles of the second aspect. The seed particles may be seed particles obtainable by or obtained by the method of the third aspect.

A fifth aspect provides a method of forming monodisperse crosslinked hydrogel polymer particles. The method comprises forming a solution (a) of at least 2% wt of a hydrophilic vinylic monomer in an aqueous solution, the aqueous solution also comprising a crosslinker comprising at least two vinyl groups; forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion; allowing the monodisperse seed particles to form swollen particles in the emulsion; and polymerising the swollen particles to form the monodisperse crosslinked hydrogel polymer particles. The seed particles may be seed particles of the second aspect. The seed particles may be seed particles obtainable by or obtained by the method of the third aspect.

A sixth aspect provides a method of forming monodisperse crosslinked hydrogel polymer particles. The method comprises forming a solution (a) of at least 2% wt of a hydrophilic vinylic monomer in an aqueous solution, the aqueous solution also comprising a chain transfer agent; forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion; allowing the monodisperse seed particles to form swollen particles in the emulsion; polymerising the swollen particles to form monodisperse polymer particles; forming a solution (d) of stabilizer in an organic solvent, wherein the organic solvent is not miscible in water; forming a solution (e) of at least 2% wt of a hydrophilic vinylic monomer in an aqueous solution, the aqueous solution also comprising a crosslinker comprising at least two vinyl groups, wherein at least one of solution (d) and solution (e) comprises a radical initiator; mixing solutions (d) and (e) to form a water-in-oil emulsion (f) and adding the monodisperse polymer particles to the emulsion; allowing the monodisperse polymer particles to form swollen polymer particles in the emulsion; and polymerising the swollen polymer particles to form the monodisperse crosslinked hydrogel polymer particles. The seed particles may be seed particles of the second aspect. The seed particles may be seed particles obtainable by or obtained by the method of the third aspect.

A seventh aspect comprises monodisperse crosslinked hydrogel polymer particles obtainable by the method of the fifth or sixth aspect. The monodisperse crosslinked hydrogel polymer particles may be obtained by the method of the fifth or sixth aspect.

An eighth aspect comprises the use of monodisperse crosslinked hydrogel polymer particles in nucleic acid amplification and/or oligonucleotide sequencing. The nucleic acid amplification may be polymerase chain reaction (PCR) amplification or emulsion PCR amplification. The oligonucleotide sequencing may be may be chemical field-effect transistor (chemFET) based sequencing. The oligonucleotide sequencing may be ion sensitive field-effect transistor (ISFET) based sequencing.

A ninth aspect provides a method for nucleic acid amplification comprising conducting a primer extension reaction on a polynucleotide that is hybridized to an oligonucleotide which is attached to a polymer particle of the invention.

An embodiment of the invention provides particles which have been obtained by the processes described in this specification.

An embodiment of the invention provides particles having the characteristics of particles obtained by the methods disclosed herein; whilst such particles are obtainable by the processes described herein, they are characterized solely by their properties and not by their method of manufacture and, accordingly, the scope of protection of claims directed to particles specified by their characteristics is determined solely by the characteristics of the particles to the exclusion of their actual method of manufacture.

The products, processes and uses of the invention are not limited to the subject matter just-mentioned but are, without limitation, described more fully in the following description and claims.

BRIEF DESCRIPTION OF THE DRAWINGS

Embodiments of the invention are further described hereinafter with reference to the accompanying drawings, in which.

DETAILED DESCRIPTION

Figure 1:
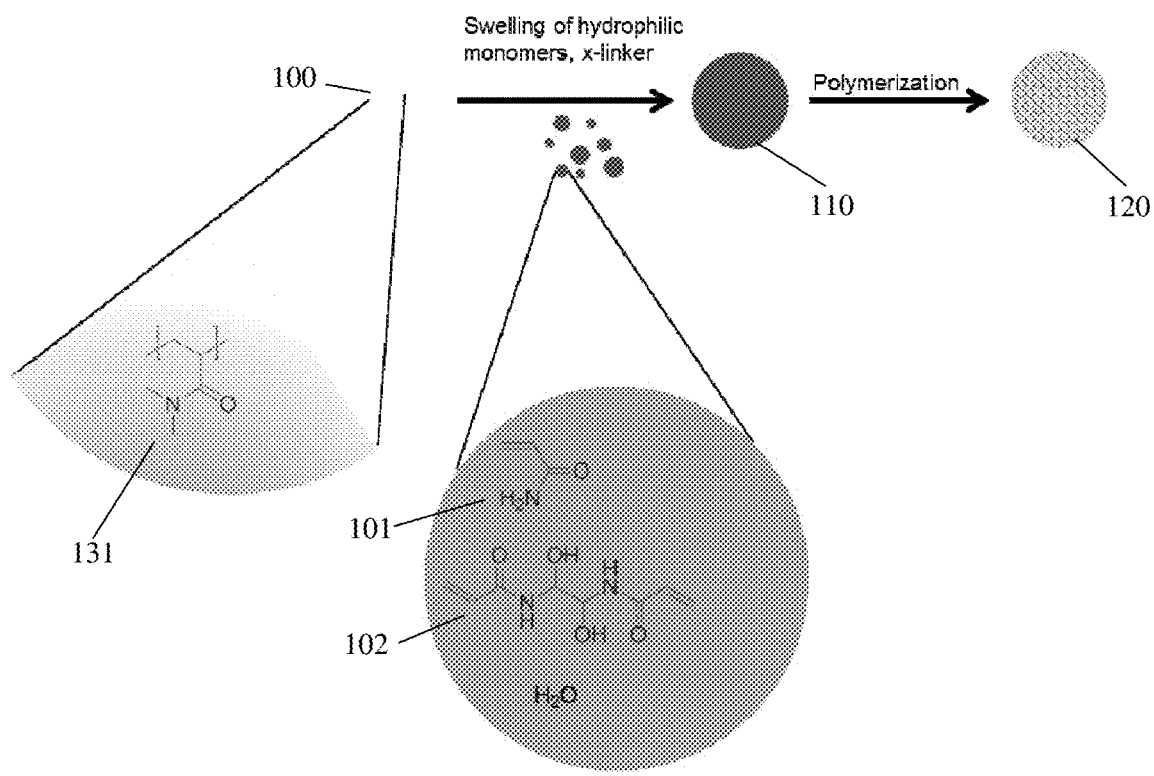
FIG. 1 is a diagrammatic representation of a single-stage swelling particle forming process of the invention, including an indication of exemplary monomers.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any embodiments disclosed herein. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

All publications, patent applications, patents, and other references mentioned herein are incorporated by reference in their entirety. In case of conflict, the present specification, including definitions, will control.

The present invention provides in an embodiment novel polymer particles and another embodiment provides a process by which the novel particles may be prepared. An embodiment provides novel seed particles for use in the process for forming the polymer particles and other embodiments provide methods of using the polymer particles which may be obtained by the process.

The polymer particle forming process involves a water-in-oil emulsion, i.e. a discontinuous aqueous phase suspended in a continuous oil phase.

The polymer particle forming process described herein involves, therefore, two different particles, namely a seed particle which is subjected to a swelling and polymerization process to form a polymer particle. The terms "seed particle" and "polymer particle" are therefore used herein as follows:

"Seed particle" means, unless the context requires otherwise, a particle obtainable by dispersion polymerization and used as an intermediate in the polymer particle forming process.

"Polymer particle" refers to a particle which may be made from the seed particle by suspension polymerization in the process described herein.

The mention of "hydrogel" with reference to polymer, for example polymer particles, means a polymer gel in which the swelling agent is water. A hydrogel polymer may absorb at least 20% of its weight in water. A hydrogel polymer may absorb at least 45%, at least 65%, at least 85%, at least 100% or at least 300% of its weight in water. For example a hydrogel polymer may absorb at least 1000%, at least 1500% or even at least 2000% of its weight in water.

The mention of "transparent" in relation to polymer particles (for example hydrogel polymer particles) means that the particles are porous and that molecules or other reagents of interest are able to diffuse readily through aqueous solution in the pores of the particles. For example, crosslinked hydrogel polymer particles of the present disclosure may be transparent to oligonucleotides and nucleic acid amplification and sequencing reagents, e.g. the oligonucleotides may be located partly or wholly within the pores, even when a polymerase is attached to the oligonucleotide.

The mention in this specification of "average" diameters unless otherwise specified refers to the mode diameter for cross-linked polymer particles (e.g. cross-linked hydrogel polymer particles) or refers to the z-average diameter for seed particles. The mode diameter may be measured by disc centrifuge, for example by a CPS disc centrifuge. The z-average diameter may be the z-average mean diameter measured by dynamic light scattering (also known as photon correlation spectroscopy). Across the entire scope, there are further hereby disclosed embodiments in which the average diameters are the mode diameter, e.g. the mode diameter as determined by optical microscopy.

The term "monodisperse" means that for a plurality of particles (e. g. at least 100, more preferably at least 1000) the particles have a coefficient of variation (CV) or % polydispersity of their diameters of less than 20%, for example less than 15%, typically of less than 10% and optionally of less than 8%, e.g. less than 5%.

The term "Mw" is the weight average molecular weight of a polymer. It is defined by the following formula:

$$Mw = \frac{\sum N_i M_i^2}{\sum N_i M_i}$$

where $M_i$ is the molecular weight of a particular chain and $N_i$ is the number of chains of that molecular weight. The Mw may be measured using gel permeation chromatography (GPC) relative to a set of standard polymers with a specified eluent solvent system. For example, the Mw of the oligomers or polymers in seed particles may be measured by GPC relative to polystyrene standards using as eluent DMF with 0.01 M LiBr.

The mention in this specification of "polydispersity" or "% polydispersity" refer to a value for dynamic light scattering data derived from the "polydispersity index". The polydispersity index is a number calculated from a simple 2 parameter fit to the correlation data, e.g. dynamic light scattering data, as defined in ISO standard document 13321: 1996 E and ISO 22412:2008. The polydispersity index is dimensionless and scaled such that values smaller than 0.05 are rarely seen other than with highly monodisperse standards. Polydispersity index values of greater than 0.7 for a sample of particles indicate that the sample has a very broad size distribution, e.g. the particles are not monodisperse.

The term "alkyl" and "$C_x$-$C_y$ alkyl" (where x is at least 1 and less than 10, and y is a number greater than 10) as used herein include reference to a straight or branched chain alkyl moiety having, e.g. 1, 2, 3, 4, 5, 6, 7, 8, 9 or 10 carbon atoms. The term includes reference to, for example, methyl, ethyl, propyl (n-propyl or isopropyl), butyl (n-butyl, sec-butyl or tert-butyl), pentyl, hexyl and the like. In particular, alkyl may be a "$C_1$-$C_6$ alkyl", i.e. an alkyl having 1, 2, 3, 4, 5 or 6 carbon atoms; or a "$C_1$-$C_4$ alkyl", i.e. an alkyl having 1, 2, 3 or 4 carbon atoms. The term "lower alkyl" includes reference to alkyl groups having 1, 2, 3 or 4 carbon atoms. An alkyl may be optionally substituted, where chemically possible, by 1 to 5 substituents which are each independently at each occurrence selected from: oxo, $=NR^a$, $=NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl.

The term "log P" as used herein refers to the octanol-water partition coefficient (log $P_{oct/wat}$) for a compound, for example a hydrophilic vinylic monomer. The log P for a compound may be determined by any one of a variety of methods. In particular, for compounds of use in embodiments and other compounds disclosed herein, log P may be measured in accordance with the shake-flask method described in J. Sangster, "Octanol-water partition coefficients of simple organic compounds", *J. Phys. Chem. Ref. Data*, Vol. 18, No. 3, 1989, 1111-1227 (incorporated herein by reference in its entirety) at section 2.1.a on page 1116. Log P may also be calculated from the structure of the compound using software, e.g. log P may be calculated using ChemBioDraw® Ultra 14.0 from CambridgeSoft Corp.

The Polymer Particle

The invention includes embodiments in which the particles are polymeric and monodisperse. The invention includes embodiments in which the particles are porous.

The particles may be in a population of at least 100, e.g. at least 1000. For example, for the purposes of measurement the particles may be in a population of at least 100, e.g. at least 1000. For example, in certain end use applications, the particles may conveniently be in a population of at least 100, e.g. at least 1000.

By "monodisperse" is meant that for a plurality of particles (e. g. at least 100, more preferably at least 1000) the particles have a coefficient of variation (CV) of their diameters of less than 20%, for example less than 15%, typically of less than 10% and optionally of less than 8%, e.g. less than 5%. A particular class of polymer particles has a CV of less than 10%. CV is defined as 100 times (standard deviation) divided by average where "average" is mean particle diameter and standard deviation is standard deviation in particle size. The invention also includes embodiments where the "average" is either the z-average or mode particle diameter. CV is preferably calculated on the main mode. Thus some particles below or above mode size may be discounted in the calculation which may for example be based on about 90% of total particle number (of detectable particles that is). Such a determination of CV is performable on a CPS disc centrifuge.

The polymer particles may be produced by a polymer particle forming process described later in the specification, e.g. by using monodisperse seed particles as described herein.

Reverting now to the polymer particles, this specification discloses crosslinked hydrogel polymer particles. It is a characteristic of crosslinked hydrogel polymer particles that, when placed in an aqueous solution that is a good solvent for the polymer, the particles swell instead of dissolving. By way of example, water is a good solvent for hydrogel particles comprising acrylamide polymer. Hydrogel particles are hydrophilic and swell in water and may be made in a variety of different porosities. The crosslinked hydrogel particles disclosed herein provide a combination of low nonspecific binding, monodispersity and porosities that provide advantages when the particles are used in biological assays.

The level of crosslinking in a polymer particle made by the process can be expressed as the percentage by weight (% wt) of crosslinker monomer included in the total monomer used in the suspension polymerisation. The % wt of crosslinker monomer may be equivalent to the % wt of the crosslinker in matrix polymer (i.e. the % wt of crosslinker in the dry weight of the crosslinked polymer particles). Thus, where the monomers used in the suspension polymerisation are, for example, a monofunctional acrylamide and a bifunctional acrylamide the percentage of bifunctional acrylamide (the crosslinker monomer) is calculated as weight percent based upon the total weight of bifunctional acrylamide plus monofunctional acrylamide. Typical levels of crosslinking include >1% wt crosslinker, for example >2% wt crosslinker, e.g. >5% wt crosslinker. For example, the level of crosslinking may be >10% wt crosslinker, or >15% wt crosslinker, e.g. >20% wt crosslinker or >25% wt crosslinker. The level of crosslinking may also be, for instance 5-60% wt crosslinker, for example 10-50% wt crosslinker, e.g. 20-40% wt crosslinker or 20-30% wt crosslinker. The level of crosslinking may also be 1-30% wt crosslinker, for example 1-20% wt crosslinker, e.g. 1-10% wt crosslinker; or the level of crosslinking may also be 2-30% wt crosslinker, for example 2-20% wt crosslinker, e.g. 2-10% wt crosslinker; levels which, e.g. are suitable for porous hydrogel particles.

The level of crosslinking may be >30% wt crosslinker or >40% wt crosslinker, for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer may be a crosslinker.

As stated above, crosslinked particles swell when placed in a good solvent for the polymer. The amount of swelling, e.g. measured as an increase in diameter, is related to the level of crosslinking. Particles with a higher degree of crosslinking will typically swell less than particles made from a similar polymer, but with a lower degree of crosslinking. This property can be used to determine the relative level of crosslinking in a sample of polymer particles by comparing the sample with a series of standards of known, different levels of crosslinking.

The particles suitably comprise an addition polymer made by polymerising one or more vinylic unsaturated monomers. The vinylic unsaturated monomers may comprise a generalised vinyl group, —CR=CH$_2$, where R is H or alkyl (e.g. where R is —CH$_3$ or —CH$_2$CH$_3$). The vinylic unsaturated monomers may comprise a vinyl group, —CH=CH$_2$. The monomers may be hydrophilic vinylic monomers, for example vinylic monomers with a log P value of less than about 1, e.g. a log P value of less than about 0.5. The hydrophilic vinylic monomers may comprise a generalised vinyl group, —CR=CH$_2$, where R is H or alkyl (e.g. where R is —CH$_3$ or —CH$_2$CH$_3$). The hydrophilic vinylic monomers may comprise a vinyl group, —CH=CH$_2$. The monomers may be vinylic monomers with a log P of less than about 0.6. The monomers may be vinylic monomers with a log P of less than about 0.5. For example, the monomers may be vinylic monomers with a log P of less than about 0.3 or of less than about 0.2, e.g. the monomers may be vinylic monomers with a log P of less than about 0.1. The monomers may be vinylic monomers with a log P of less than about 0, e.g. with a log P of less than about −0.2. The monomers may be vinylic monomers that have a log P of from 0.5 to −2, for example a log P of from 0 to −2, e.g. a log P of from −0.2 to −2. In particular, the monomers may be vinylic monomers that also comprise a hydrophilic group, for example an acrylamide monomer or an acrylate monomer.

The monomer used in the particles may be at least one compound of formula (I):

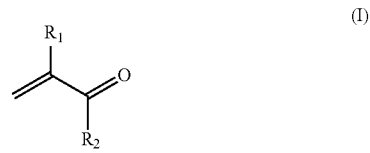

wherein:

$R^1$ is —H, —CH$_3$ or —CH$_2$CH$_3$;

$R^2$ is —OR$^3$ or —N(R$^4$)R$^5$;

$R^3$ is —H, —C$_1$-C$_6$ alkyl, or —C$_1$-C$_6$ alcohol; and $R^4$ and $R^5$ are each independently selected from —H, —C$_1$-C$_6$ alkyl, —C$_1$-C$_6$ haloalkyl, —C$_1$-C$_6$ alcohol.

Where $R^3$ is —C$_1$-C$_6$ alkyl or —C$_1$-C$_6$ alcohol, the alkyl or alcohol may be substituted, where chemically possible, by 1 to 5 (e.g. 1, 2, 3 or 4) substituents which are each independently at each occurrence selected from: oxo, =NR$^a$, =NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, S(O)R$^a$, S(O)$_2$OR$^a$, S(O)$_2$R$^a$, S(O)$_2$NR$^a$R$^a$, CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl. For example, where $R^3$ is —C$_1$-C$_6$ alkyl or —C$_1$-C$_6$ alcohol, the alkyl or alcohol may be substituted, where chemically possible, by 1 to 5 (e.g. 1, 2, 3 or 4) substituents which are each independently at each occurrence selected from OR$^a$ or CO$_2$R$^a$, optionally where R$^a$ is H.

Where $R^4$ and/or $R^5$ are —C$_1$-C$_6$ alkyl, —C$_1$-C$_6$ haloalkyl, —C$_1$-C$_6$ alcohol, each may be independently substituted, where chemically possible, by 1 to 5 (e.g. 1, 2, 3 or 4) substituents which are each independently at each occurrence selected from: oxo, =NR$^a$, =NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, S(O)R$^a$, S(O)$_2$OR$^a$, S(O)$_2$R$^a$, S(O)$_2$NR$^a$R$^a$, CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl. For example, where $R^4$ and/or $R^5$ are —C$_1$-C$_6$ alkyl, —C$_1$-C$_6$ haloalkyl, —C$_1$-C$_6$ alcohol, each may be independently substituted, where chemically possible, by 1 to 5 (e.g. 1, 2, 3 or 4) substituents which are each independently at each occurrence selected from OR$^a$ or CO$_2$R$^a$, optionally where R$^a$ is H.

$R^1$ may be —H or —CH$_3$. For example, $R^1$ may be —H.

$R^2$ may be —OR$^3$. $R^2$ may be —N(R$^4$)R$^5$.

$R^3$ may be —H. $R^3$ may be —C$_1$-C$_6$ alkyl. For example, $R^3$ may be —C$_1$-C$_6$ alkyl substituted by 1 or 2 substituents which are each independently at each occurrence selected from: oxo, halo, cyano, NR$^a$R$^a$, NR$^a$CONR$^a$R$^a$, NR$^a$CO$_2$R$^a$, OR$^a$; CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl, for example wherein R$^a$ is —H. $R^3$ may be —C$_1$-C$_6$ alcohol. For example, $R^3$ may be —C$_1$-C$_6$ alcohol substituted by 1 or 2 substituents which are each independently at each occurrence selected from: oxo, halo, cyano, NR$^a$R$^a$, NR$^a$CONR$^a$R$^a$, NR$^a$CO$_2$R$^a$, OR$^a$; CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl, for example wherein R$^a$ is —H.

$R^4$ may be —H or —C$_1$-C$_6$ alkyl. $R^4$ may be —C$_1$-C$_6$ alkyl. For example, $R^4$ may be —C$_1$-C$_6$ alkyl substituted by 1 or 2 substituents which are each independently at each occurrence selected from: oxo, halo, cyano, NR$^a$R$^a$, NR$^a$CONR$^a$R$^a$, NR$^a$CO$_2$R$^a$, OR$^a$; CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl, for example wherein R$^a$ is —H.

$R^5$ may be —H or —C$_1$-C$_6$ alkyl. $R^5$ may be —C$_1$-C$_6$ alkyl. For example, $R^5$ may be —C$_1$-C$_6$ alkyl substituted by 1 or 2 substituents which are each independently at each occurrence selected from: oxo, halo, cyano, NR$^a$R$^a$, NR$^a$CONR$^a$R$^a$, NR$^a$CO$_2$R$^a$, OR$^a$; CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H and C$_1$-C$_4$ alkyl, for example wherein R$^a$ is —H.

The compound of formula (I) may have a log P value of less than about 1, e.g. a log P of less than about 0.5. The compound of formula (I) may have a log P of less than about 0.6. The compound of formula (I) may have a log P of less than about 0.5. For example, the compound of formula (I) may have a log P of less than about 0.3 or of less than about 0.2, e.g. the compound of formula (I) may have a log P of less than about 0.1. The compound of formula (I) may have a log P of less than about 0, e.g. with a log P of less than about −0.2. The compound of formula (I) may have a log P of from 0.5 to −2, for example a log P of from 0 to −2, e.g. a log P of from −0.2 to −2.

The monomer may comprise at least one hydrophilic vinylic monomer comprising a primary amide group (—C(O)NH$_2$).

Acrylamide monomers and/or acrylate monomers may be mentioned in particular. Suitable monomers include acrylamide (prop-2-enamide), N-(hydroxymethyl)acrylamide, N-hydroxyethyl acrylamide, N-[tris(hydroxymethyl)methyl]acrylamide, 3-acrylamidopropanoic acid, methacrylamide, N-(2-hydroxyethyl)methacrylamide, N-(3-aminopropyl)methacrylamide, hydroxypropylacrylamide, N,N-dimethylacrylamide, 2-hydroxyethyl acrylate, 2-hydroxyethyl methacrylate, acrylic acid; and other acrylamide monomers, acrylic monomers, methacrylamide monomers, or methacrylic monomers with a log P value of less than about 1 (e.g. with a log P value of less than about 0.5).

The monomer may comprise a mixture of monomers. For example, the monomer may comprise at least one monomer as defined above and at least one compatible functional monomer. A corresponding functional monomer is a hydrophilic vinylic monomer as defined herein, which comprises a carboxylic acid (—COOH), a primary amine or a secondary amine.

In highly crosslinked particles, the monomer may be or comprise a crosslinker, e.g. a crosslinker as defined elsewhere herein. For example, the monomer may be or comprise at least one compound of formula (IIa) or (IIb).

A functional monomer may be a vinylic monomer with a log P value of less than about 1, e.g. a log P of less than about 0.5, which comprises a carboxylic acid or primary amine. A functional monomer may be a vinylic monomer with a log P of less than about 0.6. A functional monomer may be a vinylic monomer with a log P of less than about 0.5. For example, the functional monomer may be a vinylic monomer with a log P of less than about 0.3 or of less than about 0.2, e.g. the functional monomer may be a vinylic monomer with a log P of less than about 0.1. A functional monomer may be a vinylic monomer with a log P of less than about 0, e.g. with a log P of less than about −0.2. A functional monomer may be a vinylic monomer that has a log P of from 0.5 to −2, for example a log P of from 0 to −2, e.g. a log P of from −0.2 to −2. A functional monomer may be a compound of formula (I) which comprises a carboxylic acid or primary amine. A functional monomer may be an acrylamide monomer which comprises a carboxylic acid or primary amine. Suitable functional monomers include 3-acrylamidopropionic acid, 4-acrylamidobutanoic acid, 5-acrylamidopentanoic acid, N-(3-aminopropyl)methacrylamide, and acrylic acid.

Where at least one functional monomer is present, the amount of the functional monomer may be about 0.1 to about 100% mol, for example about 0.2 to about 50% mol, e.g. about 0.5 to about 40% mol or about 1 to about 30% mol (such as about 2 to about 20 mol %. The amount of functional monomer may be about 0.1 to about 10% wt, for example about 0.2 to about 5% wt, e.g. \about 0.5 to about 2% wt. The % wt may refer to the percent by weight of the functional monomer included in the total monomer used in the polymerisation process. The total monomer may, for example, comprise a hydrophilic vinylic monomer that is not the at least one functional monomer, a crosslinker and a functional monomer.

Crosslinking may be achieved by incorporating a crosslinker comprising at least two (e.g. two) vinyl groups (—CH=CH$_2$) as a comonomer. The crosslinker may be at least one compound of formula (IIa) or (IIb):

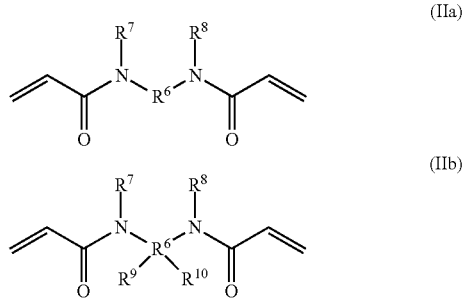

wherein $R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units;
$R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether;
$R^9$ is —N($R^{11}$)C(O)CH=CH$_2$;
$R^{10}$ is selected from —H and —N($R^{12}$)C(O)CH=CH$_2$; and
$R^{11}$ and $R^{12}$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether.

The crosslinker may be at least one compound of formula (IIa). The crosslinker may be at least one compound of formula (IIb).

$R^6$, $R^7$, $R^8$, $R^9$, $R^{10}$, $R^{11}$ and $R^{12}$ may be independently substituted, where chemically possible, by 1 to 5 substituents which are each independently at each occurrence selected from: oxo, =NR$^a$, =NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, S(O)R$^a$, S(O)$_2$OR$^a$, S(O)$_2$R$^a$, S(O)$_2$NR$^a$R$^a$, CO$_2$R$^a$ C(O)R$^a$, CONR$^a$R$^a$, $C_1$-$C_4$-alkyl, $C_2$-$C_4$-alkenyl, $C_2$-$C_4$-alkynyl, $C_1$-$C_4$ haloalkyl; wherein R$^a$ is independently at each occurrence selected from: H, $C_1$-$C_4$ alkyl and $C_1$-$C_4$ alkenyl.

$R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl- and —$C_1$-$C_6$ ether-. $R^6$ may be selected from —$C_1$-$C_6$ alkyl- and —$C_1$-$C_6$ hydroxyalkyl-. $R^6$ may be a —$C_1$-$C_6$ alkyl-, for example —CH$_2$—, —(CH$_2$)$_2$—, —(CH$_2$)$_3$—, or —(CH$_2$)$_4$—, e.g. —(CH$_2$)$_2$—. $R^6$ may be a —$C_1$-$C_6$ hydroxyalkyl-, for example —C(OH)H—, —(C(OH)H)$_2$—, —(C(OH)H)$_3$—, or —(C(OH)H)$_4$—, e.g. —(C(OH)H)$_2$—.

$R^6$ may be a —$C_1$-$C_6$ heteroalkyl-, optionally wherein the heteroatom is an amine (e.g. a tertiary amine). For example a —$C_1$-$C_6$ heteroalkyl-substituted by C(O)R$^a$ on the hetero atom, optionally wherein the heteroatom is an amine, e.g. $R^6$ may be —CH$_2$CH$_2$N(C(O)CH=CH$_2$)CH$_2$CH$_2$—.

Where $R^6$ is a polyether, the polyether may be linear or branched. $R^6$ may be a polyether comprising 2 to 100 $C_2$-$C_3$ ether units, e.g. a polyether comprising 2 to 50 $C_2$-$C_3$ ether units. $R^6$ may be a polyether comprising 2 to 100 $C_2$ ether units, e.g. a polyether comprising 2 to 50 $C_2$ ether units. For example $R^6$ may be —(CH$_2$)$_r$(OCH$_2$CH$_2$)$_n$O(CH$_2$)$_s$, wherein r and s are each independently 2 or 3 (e.g. 2); and n is an integer from 1 to 100 (e.g. 1 to 50 or 1 to 25; such as 5 to 50 or 5 to 25). Without wishing to be bound by any theory, it is believed that crosslinkers comprising a polyether (e.g. where $R^6$ is a polyether) have excellent solubility in the aqueous phase. This means that, while such crosslinkers may be used to provide particles with a low level of crosslinking (e.g. 1-20% wt crosslinker, or 1-10% wt crosslinker), such polyether comprising crosslinkers are particularly suitable for providing particles comprising relatively high levels of crosslinking, for example >20% wt crosslinker, >25% wt crosslinker, or >30% wt crosslinker. For example, the level of crosslinking may be 10-90% wt crosslinker, 20-80% wt crosslinker or 25-75% wt crosslinker, e.g. 25-60% wt crosslinker or 30-50% wt crosslinker.

$R^7$ and/or $R^8$ and/or $R^{11}$ and/or $R^{12}$ may be H. For example, $R^7$ and/or $R^8$ may be H. For example, $R^1$ and/or $R^{12}$ may be H.

The compound of formula (II) may have a log P value of less than about 1, e.g. a log P of less than about 0.5. The compound of formula (II) may have a log P of less than about 0.6. The compound of formula (II) may have a log P of less than about 0.5. For example, the compound of formula (II) may have a log P of less than about 0.3 or of less than about 0.2, e.g. the compound of formula (II) may have a log P of less than about 0.1. The compound of formula (II) may have a log P of less than about 0, e.g. with a log P of less than about −0.2. The compound of formula (II) may have a log P of from 0.5 to −2, for example a log P of from 0 to −2, e.g. a log P of from −0.2 to −2.

Exemplary crosslinkers of use in particles of the invention include N,N'-(1,2-dihydroxyethylene)bisacrylamide, N,N'-methylenebis(acrylamide), N,N'-ethylenebis(acrylamide), piperazine diacrylamide, glycerol 1,3-diglycerolate diacrylate, N,N'-((ethane-1,2-diylbis(oxy))bis(ethane-2,1-diyl)) diacrylamide, polyethyleneglycol diacrylamide (MW≤2000), 4-arm PEG-acrylamide (MW≤2000), N,N-bis (2-acrylamidoethyl)acrylamide. The exemplary crosslinkers N,N'-((ethane-1,2-diylbis(oxy))bis(ethane-2,1-diyl))diacrylamide, polyethyleneglycol diacrylamide (MW≤2000) and 4-arm PEG-acrylamide (MW≤2000), (in particular N'-((ethane-1,2-diylbis(oxy))bis(ethane-2,1-diyl)diacrylamide) are particular suitable for use in highly crosslinked particles and mechanically more stable particles, for example particles with a level of crosslinking of at least 20% wt crosslinker (e.g. a level of crosslinking of at least 30% wt crosslinker). An embodiment of the invention includes the use of a combination of crosslinkers. As a particular monomer may be mentioned acrylamide (prop-2-en-amide), for which N,N'-(1,2-dihydroxy bisacrylamide) is a suitable crosslinker. As a particular monomer may be mentioned hydroxymethyl acrylamide, for which N,N'-((ethane-1,2-diylbis(oxy))bis (ethane-2,1-diyl))diacrylamide is a suitable crosslinker. As a particular monomer may be mentioned hydroxyethyl acrylamide, for which N,N'-((ethane-1,2-diylbis(oxy))bis(ethane-2,1-diyl))diacrylamide is a suitable crosslinker.

The crosslinker may be a compound that does not comprise a primary amine, secondary amine, hydroxy or carboxylic acid. The crosslinker may be a compound of formula (IIa) or formula (IIb) that does not comprise a primary amine, secondary amine, hydroxyl or carboxylic acid.

A number of exemplary monomers and crosslinkers that may be used are set out in Table 1. A number of other monomers are set out in Table 2. The log P values for the monomers listed in table 1 and table 2 were determined using the software ChemBioDraw® Ultra 14.0 from CambridgeSoft Corp. In some particles that are embodiments of the invention the monomers of Table 2 are not used, for example due to the log P values of the monomers. In addition, the monomers methyl acrylate and methacrylic acid of Table 2 may be used in conventional Ugelstad procedures, therefore these monomers and other monomers with higher log P values may be less preferred for use in the particles of the present invention, which may be made with a polymer particle forming process described herein.

TABLE 1

Exemplary Monomers and crosslinkers

| Name | Abbreviation | Structure | log P | Function |
|---|---|---|---|---|
| Acrylamide | AAm | [structure] | −0.27 | Monomer |
| N-(Hydroxymethyl)acrylamide | HMAAm | [structure] | −0.28 | Monomer |
| N-Hydroxyethyl acrylamide | HEAAm | [structure] | −0.56 | Monomer |
| N-[Tris(hydroxymethyl)methyl]acrylamide | THMAAm | [structure] | −1.73 | Monomer |
| 3-acrylamidopropanoic acid | AAmPA | [structure] | −0.48 | Functional monomer |
| Methacrylamide | MAAm | [structure] | 0.08 | Monomer |

TABLE 1-continued

Exemplary Monomers and crosslinkers

| Name | Abbreviation | Structure | log P | Function |
| --- | --- | --- | --- | --- |
| N-(2-hydroxyethyl) methacrylamide | HEMAAm | | −0.21 | Monomer |
| N-(3-Aminopropyl) methacrylamide | APMAAm | | −0.59 | Functional monomer |
| 2-Hydroxyethyl acrylate | HEA | | 0.12 | Monomer |
| 2-Hydroxyethyl methacrylate | HEMA | | 0.47 | Monomer |
| Acrylic acid | AA | | 0.38 | Functional monomer |
| N,N'-(1,2-Dihydroxy-ethylene)bisacrylamid | DHEBAAm | | −0.47 | Crosslinker |
| N,N'-Methylenebis(acrylamide) | MBAAm | | −0.04 | Crosslinker |
| N,N'-Ethylenebis(acrylamide) | EBAAm | | −0.32 | Crosslinker |

TABLE 1-continued

Exemplary Monomers and crosslinkers

| Name | Abbreviation | Structure | log P | Function |
|---|---|---|---|---|
| Piperazine diacrylamide | PDAAm | | −0.09 | Crosslinker |
| Glycerol 1,3-diglycerolate diacrylate | GDGDA | | −0.89 | Crosslinker |
| N,N'-((ethene-1,2-diylbis(oxy))bis(ethane-2,1-diyl))diacrylamide | EGEEAAm | | −0.68 | Cross-linker |
| Polyethyleneglycol diercylamide (MWS3000) | PEGDAAm | | ≤−0.63[+] | Cross-linker |
| 4-Arm PEG-Acrylamide (MWS2000) | 4PEGAAm | | ≤−0.63[+] | Cross-linker |
| N,N-bis(2-acrylamidoethyl)acrylamide | BAAmEAAm | | −0.37 | Cross-linker |
| hydroxypropyl-acrylamide | HPAAm | | −0.45 | Monomer |
| N,N-dimethyl-acrylamide | DMAAm | | 0.2 | Monomer |

TABLE 2

Other Monomers and crosslinkers

| Name | Abbreviation | Structure | log P | Function |
|---|---|---|---|---|
| N-isopropylacrylamide | MPAm | | 0.62 | Monomer |

TABLE 2-continued

Other Monomers and crosslinkers

| Name | Abbreviation | Structure | log P | Function |
|---|---|---|---|---|
| Methyl acrylate | MA | 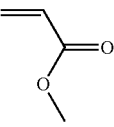 | 0.64 | Monomer |
| Methacrylic acid | MAA | 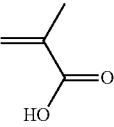 | 0.78 | Functional monomer |
| Propargyl acrylate | PA | 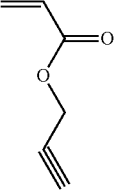 | 0.85 | Monomer |
| Methyl methacrylate | MMA | 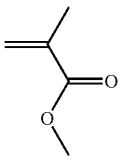 | 0.99 | Monomer |
| Chloromethyl acrylate | CMA | 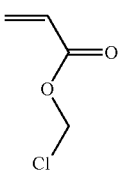 | 1.16 | Monomer |
| Vinyl acrylate | VA | 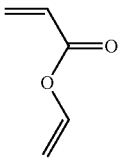 | 1.22 | Monomer |
| N,N'-hexamethylene-bis-acrylamide | HMBAAm | 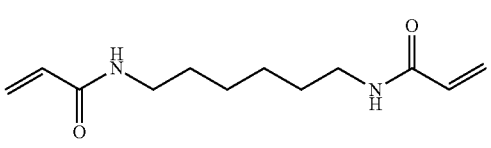 [SMILES: C=CC(=O)NCCCCCCNC(=O)C=C] | 1.07 | Cross-linker |
| Ethyleneglycol dimethacrylate | EGDMA | 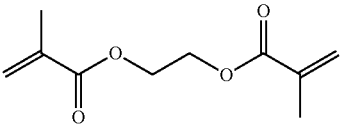 | 1.74 | Cross-linker |

The level of crosslinking in the crosslinked hydrogel polymer particles can be expressed as the percentage by weight (% wt) of crosslinker monomer included in the total monomer used in the polymerisation. Typical levels of crosslinking include >1% wt crosslinker, for example >2% wt crosslinker, e.g. >5% wt crosslinker. For example, the level of crosslinking may be >10% wt crosslinker, or >15% wt crosslinker, e.g. >20% wt crosslinker (such as >30% wt crosslinker or >40 wt % crosslinker). The level of crosslinking may also be 1-60% wt crosslinker, e.g. 5-30% wt crosslinker. For example, the level of crosslinking may be 5-60% wt crosslinker, for example 10-50% wt crosslinker. The level of crosslinking may also be, for instance 15-40% wt crosslinker, for example 20-40% wt crosslinker, e.g. 20-30% wt crosslinker. The level of crosslinking may be 10-90% wt crosslinker, 20-80% wt crosslinker or 25-75% wt crosslinker, e.g. 25-60% wt crosslinker or 30-50% wt crosslinker; for example in highly crosslinked particles. The level of crosslinking may also be 1-30% wt crosslinker, for example 1-20% wt crosslinker, e.g. 1-10% wt crosslinker.

The level of crosslinking may also be 2-30% wt crosslinker, for example 2-20% wt crosslinker, e.g. 2-10% wt crosslinker. In highly crosslinked particles the level of crosslinking may be up to 100% wt crosslinker, for example the hydrophilic vinylic monomer may be a crosslinker.

In an embodiment, the particles may have an average diameter of at least 500 nm, e.g. at least 600 nm, optionally at least 800 nm, as in the case of particles having a diameter of at least 1 μm.

In an embodiment, the particles may have an average diameter of not more than 10 μm, e.g. not more than 5 μm, optionally not more than 3 μm, as in the case of particles having a diameter of not more than 2 μm.

In an embodiment, the invention includes a class of polymer particles having average diameters of from 0.5 μm to 10 μm, e.g. of from 0.8 μm to 5 μm.

The size and size distribution of the polymer particles may be determined as described below under the heading "analytical methods".

The disclosure includes porous polymer particles having a porosity of at least 5%, e.g. at least 10%. The disclosure includes porous particles having a porosity of from 20% to 95%, particularly of from 30% to 90%, e.g. of from 40% to 90%, such as from 50% to 80%.

Porosity may be calculated after determining the density of the hydrogel polymer particles, as acrylamide and acrylate polymer has a density of about 1.3 g/mL, while water has a density of about 1 g/mL. The porous polymer particles may be transparent to solvated molecules, for example the porous polymer particles may be transparent to oligonucleotides and nucleic acid amplification reagents and sequencing reagents (e.g. primers, nucleotides and polymerases).

In an embodiment, the particles comprise functional groups. The functional groups may be selected from a hydroxyl group, carboxylic acid (—COOH), a primary amine or a secondary amine. In an embodiment, the functional groups are provided by a hydrophilic vinylic monomer (e.g. compound of formula (I)) and not a crosslinker (e.g. compound of formula (IIa) or formula (IIb)). The functional groups may be enhanced to facilitate binding with target analytes (e.g. oligonucleotides) or target receptors. Exemplary methods of enhancing functional groups of particles of the invention are described herein in the section relating to "Uses of the Particles".

In an embodiment, the particles comprise one or more oligonucleotides attached to the particles. The oligonucleotides may be attached to the particles via a linker. For example, each of (or a proportion of) the particles may comprise a plurality of oligonucleotides attached to the particle. The plurality of oligonucleotides may be identical for each individual particle. For example, a first particle may comprise a plurality of oligonucleotides having a first sequence attached to the first particle, and a second particle may comprise a plurality of oligonucleotides having a second sequence attached to the second particle. In an embodiment where the particles of the invention are porous, the oligonucleotides may be attached to the outer surface of the particle, or attached inside a pore, or attached throughout the particle matrix. The pores may be of sufficient size to render the particle transparent to the oligonucleotides, related molecules and other reagents, such that the oliogonucleotides may be located partly or wholly within the pores, even when a polymerase is attached to the oligonucleotide.

The particles of the invention may be stable (i.e. resistant to polymer degradation) in aqueous solution over the typical temperature ranges of aqueous solutions. The monodisperse crosslinked hydrogel polymer particles may be stable at a temperature of up to about 100° C. For example the monodisperse crosslinked hydrogel polymer particles may be stable in a temperature range of from about 0° C. to about 100° C.

Seed Particles

The polymer particles may be prepared by a polymer particle forming process, starting with specific seed particles. The applicant has identified that the seed particles typically used in other processes, e.g. polystyrene seed particles, are not compatible with the process of the invention. The invention therefore provides seed particles that are suitable for use in a polymer particle forming process of the invention.

In an embodiment the seed particles are monodisperse. The seed particles comprise a plurality of non-crosslinked oligomers of poly N,N-dimethylacrylamide and a z-average diameter of from 100 nm to 1,500 nm. Each of the seed particles may comprise more than $1 \times 10^5$ (e.g. more than $1 \times 10^6$) non-crosslinked oligomers of poly N,N-dimethylacrylamide, for example each of the seed particles may comprise more than $5 \times 10^6$ non-crosslinked oligomers of poly N,N-dimethylacrylamide.

The seed particles may have a z-average diameter of from 150 nm to 1,300 nm. For example, the seed particles may have a z-average diameter of 300 nm to 1,100 nm.

The oligomers have a weight average molecular weight (Mw) of from about 2,000 Da to about 100,000 Da when measured by GPC relative to polystyrene standards. Additionally or alternatively to the specified Mw range, the polymer of each oligomer may comprise about 30 to 2,000 (e.g. about 60 to about 1,000, or about 80 to about 500) monomer units.

The Mw of the seed particle oligomers may be less than 100,000 Da, optionally less than 50,000 Da, further optionally less than 40,000 Da, e.g. less than 30,000 Da. The Mw may be more than 4,000 Da, optionally more than 5,000 Da, further optionally more than 6,000 Da, as in the case of more than 8,000 Da, e.g. more than 10,000 Da. For example, the Mw may be from 5,000 Da to 70,000 Da, e.g. from 6,000 Da to 60,000 Da, for example from 7,000 Da to 50,000 Da or from 8,000 Da to 40,000 Da.

Without wishing to be bound by any theory, it is believed that the Mw of the oligomers of the seed particles is an important characteristic of the seed particles. For example, it may be that having the Mw of the seed particle oligomers in the specified range is necessary to provide seed particles that form monodisperse polymer particles during the particle forming process described herein. If the seed particle polymer has a higher molecular weight, for example because no chain transfer agent was used during seed particle formation (such as for the monodisperse microspheres of M. Babic and D. Horak, *Macromolecular Reaction Engineering*, 2007, 1, 86-94), the particles are not suitable for use in the present process, for example because the particles resulting from such a process may not be monodisperse, e.g. the CV may be greater than 20%.

The seed particles may have the characteristics of seed particles formed in accordance with the methods of forming seed particles disclosed herein. For example, the seed particles may have the characteristics of seed particles formed by radical initiated polymerisation of N,N-dimethylacrylamide in an organic solvent in the presence of a stabilizer and a chain transfer agent.

Preparation of Seed Particles

The polymer particles may be prepared by a process as described herein, starting with specific seed particles. The invention therefore provides methods of preparing monodisperse seed particles.

The monodisperse seed particles may be made by a method comprising dissolving N,N-dimethylacrylamide, a stabilizer, a radical initiator and a chain transfer agent in an organic solvent to form a reaction mixture; and heating the reaction mixture to activate the initiator, thereby forming the monodisperse seed particles.

In this method, once the reaction mixture is formed in a suitable container, the reaction mixture is typically mixed, for example with a stirrer during the heating step.

Preferably, the polymerization reaction will occur in a reaction mixture that comprises a minimal amount of oxygen. Thus the reaction mixture may be purged of oxygen prior to heating the reaction mixture. The purging may comprise sparging with a chemically inert gas. The inert gas may be nitrogen or a noble gas (e.g. helium, neon, argon, krypton or xenon). For example, the inert gas may be argon, helium or nitrogen, e.g. argon or nitrogen.

The method may be considered an inverse precipitation polymerization, with the hydrophilic seed particles precipitating out of the organic solvent. The stabilizer may prevent aggregation of seed particles, assisting in the formation the monodisperse seed particles. The selection of a suitable stabilizer is dependent on the ability of the stabilizer to be dissolved in the organic solvent. The stabilizer may be a block copolymer of styrene and a polyolefin, for example a triblock copolymer based on styrene and ethylene/butylene, e.g. a linear triblock copolymer consisting of styrene and ethylene/butylene. The stabilizer may be a triblock copolymer consisting of a midblock of poly(ethylene-co-butylene) and outer blocks of polystyrene. Exemplary stabilizers comprise Kraton A1535H, Kraton G1650M, Kraton G1652M, or Kraton G1657M, or combinations thereof.

The radical initiator may be a peroxide initiator or an azo-initiator, for example a peroxide initiator or an azo-initiator that decomposes at elevated temperature. Exemplary radical initiators include 2,2'-Azobis(2-methylpropionitrile), 2,2'-Azodi(2-methylbutyronitrile), 2,2'-Azobis(2,4-dimethyl valeronitrile), dibenzoylperoxide and the like. The radical initiator may be 2,2'-Azobis(2-methylpropionitrile). The radical initiator may be 2,2'-azodi(2-methylbutyronitrile). The temperature to which the reaction mixture may be heated will depend on the temperature at which the radical initiator is activated. Heating the reaction mixture to activate the initiator may comprise heating the reaction mixture to a temperature of at least 40° C., for example heating to a temperature of at least 50° C., e.g. heating to a temperature of at least 60° C., or e.g. heating to a temperature of at least 70° C. For example, when the radical initiator is 2,2'-Azobis(2-methylpropionitrile), the reaction mixture may be heated to a temperature of at least 50° C. or a temperature of at least 60° C.

The addition of a chain transfer agent reduces the molecular weight of the polymer of the seed particles by reacting with the free radical of a growing polymer chain to terminate the chain and transfer the lone electron to a radical species derived from the chain transfer agent. The radical species derived from the chain transfer agent may then react with a monomer to form a radical from the monomer, which can then react with another monomer to commence formation of a new polymer chain. The chain transfer reagent may be a thiol or a haloalkane. For example, the chain transfer agent may be selected from thiols (e.g. 1-octanethiol, hexane thiol, 6-mercapto-1-hexanol, benzylthiol), alkyl thiols (e.g. 1-octanethiol, hexane thiol), carbon tetrachloride and bromotrichloromethane. For example, the chain transfer agent may be 1-octanethiol. The total amount of chain transfer agent added can be in the range 1 mol per 10 mol of monomer to 1 mol per 300 mol of monomer, for example 1 mol per 20 mol of monomer to 1 mol per 100 mol monomer, e.g. approximately 1 mol chain transfer agent per 30 mol of monomer. The time of addition of the chain transfer agent is important to obtain monodisperse seed particles: the chain transfer agent should be present in the reaction mixture prior to the initiation of polymerization (i.e. prior to activation of the radical initiator). This finding is surprising, as for seed particles of use in conventional Ugelstad processes (e.g. polystyrene seed particles), the chain transfer agent, if added, should be added after the commencement of particle formation as taught in WO 2010/125170, the content of which is incorporated herein by reference.

The organic solvent may comprise a mixture of an alkane component and an aromatic component. The organic solvent may comprise a single component, for example an alkane component or an aromatic component. The alkane component may be or comprise hexane, heptane or octane. The aromatic component may be or comprise a $C_1$-$C_{10}$ alkyl substituted phenyl or a $C_1$-$C_8$ di-alkyl substituted phenyl, for example a $C_1$-$C_4$ alkyl substituted phenyl, e.g. toluene. Where the organic solvent comprises a single component and that component is an aromatic component, the aromatic component may be a $C_4$-$C_{12}$ alkyl substituted phenyl, or a $C_2$-$C_8$ di alkyl substituted phenyl. The alkane component may be heptane and the aromatic component may be toluene. The alkane component and aromatic component may be present in a weight ratio of alkane component:aromatic component of between about 0.5:1 to about 20:1, for example the weight ratio of alkane component:aromatic component may be between about 1:1 to about 15:1, e.g. between about 1:1 to about 10:1.

The reaction mixture may comprise: the N,N-dimethylacrylamide in an amount of about 2% wt to about 5% wt; the stabiliser in an amount of about 1% wt to about 5% wt; the radical initiator in an amount of about 0.01% wt to about 4% wt (e.g. about 0.05% wt to about 0.25% wt); and the chain transfer reagent in an amount of about 0.05% wt to about 0.25% wt.

The monodisperse seed particles may then be subjected to an particle forming process, for example as outlined below:

Preparation of Particles

The present invention provides a method of forming monodisperse crosslinked hydrogel polymer particles. An Ugelstad process cannot be used to directly form such particles, for example because the Ugelstad process requires that the particles form in the oil phase of an oil-in-water emulsion, while hydrogel polymer particles and corresponding hydrophilic monomers would be preferentially soluble in water. The applicant has addressed this by providing the methods of the present disclosure, which provide a particle forming process that uses an aqueous (discontinuous phase) in oil (continuous phase) system. This is believed to represent the first such process that has been used to form monodisperse crosslinked polymer particles.

In an embodiment the present invention provides a method of forming monodisperse crosslinked hydrogel polymer particles. The method comprises forming a solution (a) of at least 2% wt of a hydrophilic vinylic monomer in an aqueous solution, the aqueous solution also comprising a crosslinker comprising at least two vinyl groups; forming a solution (b) of stabilizer in an organic solvent, wherein the organic solvent is not miscible in water, and wherein at least one of solution (a) and (b) comprises a radical initiator; mixing solutions (a) and (b) to form a water-in-oil emulsion (c) and adding monodisperse seed particles to the emulsion; allowing the monodisperse seed particles to form swollen particles in the emulsion; and polymerising the swollen particles to form the monodisperse crosslinked hydrogel polymer particles. As explained below, this method may be considered a single stage method, as it comprises a single step of swelling and a single step of polymerisation.

The solution (a) may be formed by first forming a solution of at least 2% wt of the hydrophilic vinylic monomer in an aqueous solution, and then adding the crosslinker; the crosslinker may be added before the hydrophilic vinylic monomer; or the hydrophilic vinylic monomer and crosslinker may be added to the solution at about the same time. Similarly, the stabilizer and radical initiator may be added to solution (b) at about the same time or sequentially.

In the context of the present disclosure, an organic solvent is considered not miscible with water when the organic solvent and water would separate into two separate phases, when an amount of at least 5% wt water is mixed with the organic solvent.

Figure 2:
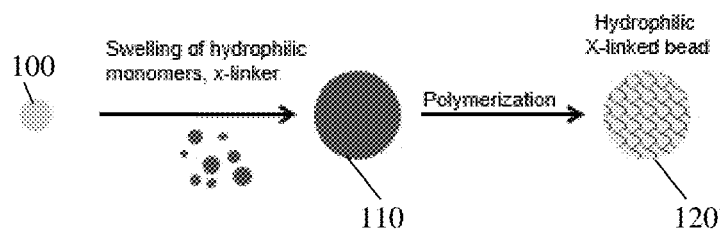
FIG. 2 is a diagrammatic representation of a single-stage particle forming process of the invention.

This method involves swelling the seed particles with an aqueous discontinuous phase in an oil continuous phase. A schematic of this process, which may be considered a single stage process as it comprises a single step of swelling and single step of polymerisation, is provided in FIG. 1 (illustrated with specific monomers) and FIG. 2 (illustrated more generally). The method illustrated in FIGS. 1 and 2 is conveniently divided into 2 steps, swelling of the monodisperse seed particles 100 to form swollen particles 110 and polymerisation of the monomer in the swollen seed particles to form crosslinked hydrogel polymer particles 120. Prior to the first step a water-in-oil emulsion is formed. The water-in-oil emulsion is formed by mixing an aqueous solution comprising exemplary monomer acrylamide 101 and exemplary crosslinker 1,2-dihydroxy bisacrylamide 102 with an oil phase comprising a steric stabiliser, with the emulsion formed when the water and oil phases are agitated (e.g. by stirring). If a (very) highly crosslinked particle is desired, it is also possible to replace the monomer with a crosslinker, so that the only monomers present in the water-in-oil emulsion are crosslinking monomers (i.e. crosslinkers, e.g. 1,2-dihydroxy bisacrylamide 102). The water-in-oil emulsion also typically contains an initiator, which may have been added to the oil phase. The initiator is a compound that upon activation will initiate polymerisation of the monomer and crosslinker. The monodisperse seed particles 100 comprise non-crosslinked oligomers of poly N,N-dimethylacrylamide 131 and are considered "activated seed particles". The seed particles 100 may be prepared as described elsewhere in this application. In the first step monodisperse seed particles 100 are added to the water-in-oil emulsion and the emulsion is agitated for a period of time (for instance for at least 30 minutes or for at least 1 hour, typically for 4-48 hours). During this period of time the monomer 101 and crosslinker 102 diffuse into the activated seed particles 100 to form the swollen seed particles 110. The swollen seed particles 110 comprise a mixture of at least the monomer 101, the crosslinker 102 and polymer from the activated seed particles 100. The swollen seed particles 110 may also include other components, for instance one or more porogens, which can enter the particles if included in the water-in-oil emulsion. For example, in the illustrated method, water is also present in the swollen seed particles 110, and this water may be considered a porogen. The second step comprises polymerisation of the monomer 101 and crosslinker 102 to form the crosslinked hydrogel polymer particles 120. In the second step polymerisation is initiated by activating the initiator, for example by heating the emulsion.

The provision of activated seed particles is a key feature of a successful Ugelstad process. Activation of the seed particle is typically provided by adding an organic compound of very low solubility as an emulsion to produce entropically activated seed particles. The applicant has, however, surprisingly determined that this additional activation step is not necessary in the process, for example where the seed particles comprise oligomers of poly N,N-dimethylacrylamide.

Swelling is key for embodiments of the particle forming process. In this process, the monomers and (when present) porogen are required to have a limited solubility in the continuous phase. If the monomers and the porogen have a solubility that is too high in the continuous phase, the solubility will not assist in driving the monomers (and optional porogen) to enter the seeds and form swollen particles. If, on the other hand, the monomers (and optional porogen) have insufficient solubility in the continuous phase, there will be negligible diffusion through the continuous phase and thus no mass transport of monomer to the seeds are possible, preventing the formation of swollen particles. The time to complete swelling, i.e. the time until all monomer (and optional porogen) are co-localized to the seed particles, will depend highly on factors such as temperature, solubility, and viscosity and will thus vary from system to system. Typical time scales for the step of allowing the monodisperse seed particles to form swollen particles will therefore vary from 30 min to 48 h. For example, in an embodiment of the method, the step of allowing the monodisperse seed particles to swell may be performed for at least 30 minutes, e.g. for at least 1 hour. The step of allowing the monodisperse seed particles to swell may be performed for at least 4 hours, at least 8 hours or at least 12 hours. The upper limit for the swelling time is not believe to be critical, for example it is believed that a swelling time of several days, e.g. 3 days or 2 days may be used.

The step of allowing the monodisperse seed particles to form swollen particles may comprise mixing the emulsion, e.g. mixing the emulsion for substantially all of the swelling time. The step of allowing the monodisperse seed particles to form swollen particles may be performed at a temperature of between about 10° C. to about 60° C., for example at a temperature of between about 10° C. to about 40° C., e.g. at a temperature of between about 15° C. to about 30° C. For example the mixing may be performed at a temperature of between about 10° C. to about 60° C., for example at a temperature of between about 10° C. to about 40° C., e.g. at a temperature of between about 15° C. to about 30° C.

Solution (a) comprises at least 2% wt of hydrophilic vinylic monomer in an aqueous solution. The aqueous solution may be water. The aqueous solution may comprise water and up to 50% wt (for example up to 30% wt or up to 25% wt, e.g. up to 20% wt, optionally up to 10% wt) of a water miscible organic solvent. The water miscible organic solvent may be a $C_1$-$C_4$ alcohol, for example ethanol or methanol, e.g. methanol. The water miscible organic solvent may be a $C_2$-$C_4$ nitrile, for example acetonitrile.

The hydrophilic vinylic monomer may comprise a generalised vinyl group, —CR=$CH_2$, where R is alkyl (e.g. where R is —$CH_3$ or —$CH_2CH_3$). The hydrophilic vinylic monomer may comprise a vinyl group, —CH=$CH_2$. The hydrophilic vinylic monomer may be vinylic monomers with a log P value of less than about 1, e.g. a log P of less than about 0.5. The monomers may be vinylic monomers with a log P of less than about 0.6. The monomers may be vinylic monomers with a log P of less than about 0.5. For example, the monomers may be vinylic monomers with a log P of less than about 0.3 or of less than about 0.2, e.g. the monomers may be vinylic monomers with a log P of less than about 0.1. The monomers may be vinylic monomers with a log P of less than about 0, e.g. with a log P of less than about −0.2. The monomers may be vinylic monomers that have a log P of from 0.5 to −2, for example a log P of from 0 to −2, e.g. a log P of from −0.2 to −2. In particular, the monomers may be vinylic monomers that also comprise a hydrophilic group, for example an acrylamide monomer or an acrylate monomer.

The monomer used in the method may be at least one compound of formula (I) where $R^1$ is —H, —$CH_3$ or —$CH_2CH_3$; $R^2$ is —$OR^3$ or —$N(R^4)R^5$; $R^3$ is —H, —$C_1$-$C_6$ alkyl, or —$C_1$-$C_6$ alcohol; and $R^4$ and $R^5$ are each independently selected from —H, —$C_1$-$C_6$ alkyl, —$C_1$-$C_6$ haloalkyl, —$C_1$-$C_6$ alcohol.

Where $R^3$ is —$C_1$-$C_6$ alkyl or —$C_1$-$C_6$ alcohol, the alkyl or alcohol may be substituted, where chemically possible, by 1 to 5 substituents (e.g. 1, 2, 3 or 4) which are each independently at each occurrence selected from: oxo, =$NR^a$, =$NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^3$ is —$C_1$-$C_6$ alkyl or —$C_1$-$C_6$ alcohol, the alkyl or alcohol may be substituted, where chemically possible, by 1 to 5 (e.g. 1, 2, 3 or 4) substituents which are each independently at each occurrence selected from $OR^a$ or $CO_2R^a$, optionally where $R^a$ is H.

Where $R^4$ and/or $R^5$ are —$C_1$-$C_6$ alkyl, —$C_1$-$C_6$ haloalkyl, —$C_1$-$C_6$ alcohol, each may be independently substituted, where chemically possible, by 1 to 5 (e.g. 1, 2, 3 or 4) substituents which are each independently at each occurrence selected from: oxo, =$NR^a$, =$NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^4$ and/or $R^5$ are —$C_1$-$C_6$ alkyl, —$C_1$-$C_6$ haloalkyl, —$C_1$-$C_6$ alcohol, each may be independently substituted, where chemically possible, by 1 to 5 (e.g. 1, 2, 3 or 4) substituents which are each independently at each occurrence selected from $OR^a$ or $CO_2R^a$, optionally where $R^a$ is H.

$R^1$ may be —H or —$CH_3$. For example, $R^1$ may be —H.
$R^2$ may be —$OR^3$. $R^2$ may be —$N(R^4)R^5$.
$R^3$ may be —H. $R^3$ may be —$C_1$-$C_6$ alkyl. For example, $R^3$ may be —$C_1$-$C_6$ alkyl substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H. $R^3$ may be —$C_1$-$C_6$ alcohol. For example, $R^3$ may be —$C_1$-$C_6$ alcohol substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^4$ may be —H or —$C_1$-$C_6$ alkyl. $R^4$ may be —$C_1$-$C_6$ alkyl. For example, $R^4$ may be —$C_1$-$C_6$ alkyl substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^5$ may be —H or —$C_1$-$C_6$ alkyl. $R^5$ may be —$C_1$-$C_6$ alkyl. For example, $R^5$ may be —$C_1$-$C_6$ alkyl substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

The compound of formula (I) may have a log P value of less than about 1, e.g. a log P of less than about 0.5. The compound of formula (I) may have a log P of less than about 0.6. The compound of formula (I) may have a log P of less than about 0.5. For example, the compound of formula (I) may have a log P of less than about 0.3 or of less than about 0.2, e.g. the compound of formula (I) may have a log P of less than about 0.1. The compound of formula (I) may have a log P of less than about 0, e.g. with a log P of less than about −0.2. The compound of formula (I) may have a log P of from 0.5 to −2, for example a log P of from 0 to −2, e.g. a log P of from −0.2 to −2.

The monomer may comprise at least one hydrophilic vinylic monomer comprising a primary amide group (—C(O)$NH_2$).

Acrylamide monomers and/or acrylic monomers may be mentioned in particular. Suitable monomers include acrylamide (prop-2-enamide), N-(hydroxymethyl)acrylamide, N-hydroxyethyl acrylamide, N-[tris(hydroxymethyl)methyl]acrylamide, 3-acrylamidopropanoic acid, methacrylamide, N-(2-hydroxyethyl)methacrylamide, N-(3-aminopropyl)methacrylamide, hydroxypropylacrylamide, N,N-dimethylacrylamide, 2-hydroxyethyl acrylate, 2-hydroxyethyl methacrylate, acrylic acid; and other acrylamide monomers, acrylic monomers, methacrylamide monomers, or methacrylic monomers with a log P value of less than about 1 (e.g. with a log P value of less than about 0.5).

The solution (a) may comprise not more than 60% wt hydrophilic vinylic monomer. For example, the solution (a) may comprise not more than 55% wt or 50% wt hydrophilic vinylic monomer. For example, the solution (a) may comprise not more than 45% wt or 40% wt hydrophilic vinylic monomer; e.g. solution (a) may comprise not more than 30% wt hydrophilic vinylic monomer. The solution (a) may comprise at least 2% wt hydrophilic vinylic monomer. The solution (a) may comprise at least 5% wt hydrophilic vinylic monomer. The solution (a) may comprise at least 8% wt hydrophilic vinylic monomer. The solution (a) may comprise at least 2% wt % (e.g. 5% wt) hydrophilic vinylic monomer and not more than 60% wt hydrophilic vinylic monomer, for example the solution (a) may comprise at least 8% wt hydrophilic vinylic monomer and not more than 60% wt hydrophilic vinylic monomer. The solution (a) may comprise at least 2% wt % (e.g. 5% wt) hydrophilic vinylic monomer and not more than 50% wt hydrophilic vinylic monomer, for example the solution (a) may comprise at least 8% wt hydrophilic vinylic monomer and not more than 50% wt hydrophilic vinylic monomer. The solution (a) may comprise at least 2% wt % (e.g. 5% wt) hydrophilic vinylic monomer and not more than 45% wt hydrophilic vinylic monomer, for example the solution (a) may comprise at least 8% wt hydrophilic vinylic monomer and not more than 45% wt hydrophilic vinylic monomer. The solution (a) may comprise at least 2% wt % (e.g. 5% wt) hydrophilic vinylic monomer and not more than 30% wt hydrophilic vinylic monomer, for example the solution (a) may comprise at least 8% wt vinylic monomer and not more than 30% wt hydrophilic vinylic monomer. The solution (a) may comprise at least 2% wt % (e.g. 5% wt) hydrophilic vinylic monomer and not more than 15% hydrophilic vinylic monomer, e.g. the solution (a) may comprise about 10% wt hydrophilic vinylic monomer.

The hydrophilic vinylic monomer may comprise a mixture of monomers. For example, the monomer may comprise at least one monomer as defined above and at least one compatible functional monomer. A corresponding functional monomer is a hydrophilic vinylic monomer as defined herein, which comprises a carboxylic acid (—COOH), primary amine or secondary amine. A functional monomer may be a vinylic monomer with a log P value of less than about 1 (e.g. a log P of less than about 0.5), which comprises a carboxylic acid or primary amine. A functional monomer may be a vinylic monomer with a log P of less than about 0.6. A functional monomer may be a vinylic monomer with a log P of less than about 0.5. For example, the functional monomer may be a vinylic monomer with a log P of less than about 0.3 or of less than about 0.2, e.g. the functional monomer may be a vinylic monomer with a log P of less than about 0.1. A functional monomer may be a vinylic monomer with a log P of less than about 0, e.g. with a log P of less than about −0.2. A functional monomer may be a vinylic monomer that has a log P of from 0.5 to −2, for example a log P of from 0 to −2, e.g. a log P of from −0.2 to −2. A functional monomer may be a compound of formula (I) which comprises a carboxylic acid or primary amine. A functional monomer may be an acrylamide monomer which comprises a carboxylic acid or primary amine. Suitable functional monomers include 3-acrylamidopropionic acid, 4-acrylamidobutanoic acid, 5-acrylamidopentanoic acid, N-(3-aminopropyl)methacrylamide, and acrylic acid.

Where at least one functional monomer is present, the amount of the functional monomer may be about 0.1 to about 100% mol, for example about 0.2 to about 50% mol, e.g. about 0.5 to about 40% mol or about 1 to about 30% mol (such as about 2 to about 20 mol %. The amount of functional monomer may be about 0.1 to about 10% mol, for example about 0.2 to about 5% mol, e.g. about 0.5 to about 2% mol. The % mol may refer to the mol percent of the functional monomer included in the total hydrophilic vinylic monomer of solution (a) (i.e. the solution comprising at least 2% wt hydrophilic vinylic monomer in water).

In highly crosslinked particles, the monomer may be or comprise a crosslinker. For example, the monomer may be or comprise at least one compound of formula (IIa) or (IIb).

The crosslinker used in the method may comprise at least two (e.g. 2) vinyl groups (—CH=CH$_2$). The crosslinker used in the method may be at least one compound of formula (IIa) or formula (IIb), wherein $R^6$ is selected from —C$_1$-C$_6$ alkyl-, —C$_1$-C$_6$ heteroalkyl-, —C$_1$-C$_6$ cycloalkyl-, —C$_1$-C$_6$ hydroxyalkyl-, —C$_1$-C$_6$ ether-, or polyether comprising 2 to 100 C$_2$-C$_3$ ether units; and $R^7$ and $R^8$ are each independently selected from —H, —C$_1$-C$_6$ alkyl, —C$_1$-C$_6$ heteroalkyl, —C$_3$-C$_6$ cycloalkyl, —C$_1$-C$_6$ hydroxyalkyl, or —C$_1$-C$_6$ ether; $R^9$ is —N(R$^{11}$)C(O)CH=CH$_2$; $R^{10}$ is selected from —H and —N(R$^{12}$)C(O)CH=CH$_2$; and $R^{11}$ and $R^{12}$ are each independently selected from —H, —C$_1$-C$_6$ alkyl, —C$_1$-C$_6$ heteroalkyl, —C$_3$-C$_6$ cycloalkyl, —C$_1$-C$_6$ hydroxyalkyl, or —C$_1$-C$_6$ ether.

The crosslinker may be at least one compound of formula (IIa). The crosslinker may be at least one compound of formula (IIb).

$R^6$, $R^7$, $R^8$, $R^9$, $R^{10}$, $R^{11}$ and $R^{12}$ may be independently substituted, where chemically possible, by 1 to 5 substituents which are each independently at each occurrence selected from: oxo, =NR$^a$, =NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, S(O)R$^a$, S(O)$_2$OR$^a$, S(O)$_2$R$^a$, S(O)$_2$NR$^a$R$^a$, CO$_2$R$^a$ C(O)R$^a$, CONR$^a$R$^a$, C$_1$-C$_4$-alkyl, C$_2$-C$_4$-alkenyl, C$_2$-C$_4$-alkynyl, C$_1$-C$_4$ haloalkyl; wherein R$^a$ is independently at each occurrence selected from: H, C$_1$-C$_4$ alkyl and C$_1$-C$_4$ alkenyl.

$R^6$ is selected from —C$_1$-C$_6$ alkyl-, —C$_1$-C$_6$ heteroalkyl-, —C$_1$-C$_6$ cycloalkyl-, —C$_1$-C$_6$ hydroxyalkyl- and —C$_1$-C$_6$ ether-. $R^6$ may be selected from —C$_1$-C$_6$ alkyl- and —C$_1$-C$_6$ hydroxyalkyl-. $R^6$ may be a —C$_1$-C$_6$ alkyl-, for example —CH$_2$—, —(CH$_2$)$_2$—, —(CH$_2$)$_3$—, or —(CH$_2$)$_4$—, e.g. —(CH$_2$)$_2$—. $R^6$ may be a —C$_1$-C$_6$ hydroxyalkyl-, for example —C(OH)H—, —(C(OH)H)$_2$—, —(C(OH)H)$_3$—, or —(C(OH)H)$_4$—, e.g. —(C(OH)H)$_2$—.

$R^6$ may be a —C$_1$-C$_6$ heteroalkyl-, optionally wherein the heteroatom is an amine (e.g. a tertiary amine). For example a —C$_1$-C$_6$ heteroalkyl-substituted by C(O)R$^a$ on the hetero atom, optionally wherein the heteroatom is an amine, e.g. $R^6$ may be —CH$_2$CH$_2$N(C(O)CH=CH$_2$)CH$_2$CH$_2$—.

Where $R^6$ is a polyether, the polyether may be linear or branched. $R^6$ may be a polyether comprising 2 to 100 C$_2$-C$_3$ ether units, e.g. a polyether comprising 2 to 50 C$_2$-C$_3$ ether units. $R^6$ may be a polyether comprising 2 to 100 C$_2$ ether units, e.g. a polyether comprising 2 to 50 C$_2$ ether units. For example $R^6$ may be —(CH$_2$)$_r$(OCH$_2$CH$_2$)$_n$O(CH$_2$)$_s$, wherein r and s are each independently 2 or 3 (e.g. 2); and n is an integer from 1 to 100 (e.g. 5 to 50 or 5 to 25). Without wishing to be bound by any theory, it is believed that crosslinkers comprising a polyether (e.g. where $R^6$ is a polyether) have excellent solubility in the aqueous phase. This means that, while such crosslinkers may be used to provide particles with a low level of crosslinking (e.g. 1-20% wt crosslinker, or 1-10% wt crosslinker), such polyether comprising crosslinkers are particularly suitable for providing particles comprising relatively high levels of crosslinking, for example >20% wt crosslinker, >25% wt crosslinker, or >30% wt crosslinker. For example, the level of crosslinking may be 10-90% wt crosslinker, 20-80% wt crosslinker or 25-75% wt crosslinker, e.g. 25-60% wt crosslinker or 30-50% wt crosslinker.

$R^7$ and/or $R^8$ and/or $R^{11}$ and/or $R^{12}$ may be H. For example, $R^7$ and/or $R^8$ may be H. For example, $R^{11}$ and/or $R^{12}$ may be H.

The compound of formula (II) may have a log P value of less than about 1, e.g. a log P of less than about 0.5. The compound of formula (II) may have a log P of less than about 0.6. The compound of formula (II) may have a log P of less than about 0.5. For example, the compound of formula (II) may have a log P of less than about 0.3 or of less than about 0.2, e.g. the compound of formula (II) may have a log P of less than about 0.1. The compound of formula (II) may have a log P of less than about 0, e.g. with a log P of less than about −0.2. The compound of formula (II) may have a log P of from 0.5 to −2, for example a log P of from 0 to −2, e.g. a log P of from −0.2 to −2.

Exemplary crosslinkers of use in embodiments of the method include N,N'-(1,2-dihydroxyethylene)bisacrylamide, N,N'-methylenebis(acrylamide), N,N'-ethylenebis(acrylamide), piperazine diacrylamide, glycerol 1,3-diglycerolate diacrylate. N,N'-((ethane-1,2-diylbis(oxy))bis(ethane-2,1-diyl))diacrylamide, polyethyleneglycol diacrylamide (MW≤2000), 4-arm PEG-acrylamide (MW≤2000), N,N-bis(2-acrylamidoethyl)acrylamide. The exemplary crosslinkers N,N'-((ethane-1,2-diylbis(oxy))bis(ethane-2,1-diyl))diacrylamide, polyethyleneglycol diacrylamide (MW≤2000) and 4-Arm PEG-Acrylamide (MW≤2000) (e.g., N'-((ethane-1,2-diylbis(oxy))bis(ethane-2,1-diyl))diacrylamide) are particular suitable for use in highly crosslinked particles and mechanically more stable particles, i.e. particles with a level of crosslinking of at least 20% wt crosslinker (e.g. a level of crosslinking of at least 30% wt crosslinker). Embodiments may also include the use of a combination of crosslinkers.

The crosslinker may be a compound that does not comprise a primary amine, secondary amine, hydroxy or carboxylic acid. The crosslinker may be a compound of formula (IIa) or formula (IIb) that does not comprise a primary amine, secondary amine, hydroxyl or carboxylic acid The level of crosslinking in the crosslinked hydrogel polymer particles formed by the method can be expressed as the percentage by weight (% wt) of crosslinker monomer included in the total monomer used in the polymerisation. Typical levels of crosslinking include >5% wt crosslinker, for example >10% wt crosslinker, or >15% wt crosslinker, e.g. >20% wt crosslinker. The level of crosslinking may also be, for instance 5-60% wt crosslinker, for example 10-50% wt crosslinker. The level of crosslinking may also be, for instance 15-40% wt crosslinker, for example 20-40% wt crosslinker, e.g. 20-30% wt crosslinker. The solution (a) may therefore comprise at an amount of crosslinker in % wt that corresponds to 5-60% of the amount of hydrophilic vinylic monomer, for example 10-50% of the amount of hydrophilic vinylic monomer. The solution (a) may therefore comprise at an amount of crosslinker in % wt that corresponds to, for instance 15-40% of the amount of hydrophilic vinylic monomer, for example 20-40% of the amount of hydrophilic vinylic monomer, e.g. 20-30% of the amount of hydrophilic vinylic monomer.

The level of crosslinking may be >30% wt crosslinker or >40% wt crosslinker (e.g. >50% wt crosslinker), for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer may be a crosslinker, e.g. the hydrophilic vinyilic monomer and the crosslinker may be the same compound. The solution (a) may therefore comprise at an amount of crosslinker in % wt that corresponds to 20-80% of the amount of hydrophilic vinylic monomer, for example 25-60% of the amount of hydrophilic vinylic monomer.

As a particular hydrophilic vinylic monomer may be mentioned acrylamide (prop-2-enamide), for which 1,2-dihydroxy bisacrylamide is a suitable crosslinker. As a particular hydrophilic vinylic monomer may be mentioned hydroxymethyl acrylamide, for which N,N'-((ethane-1,2-diylbis(oxy))bis(ethane-2,1-diyl))diacrylamide is a suitable crosslinker. As a particular hydrophilic vinylic monomer may be mentioned hydroxyethyl acrylamide, for which N,N'-((ethane-1,2-diylbis(oxy))bis(ethane-2,1-diyl))diacrylamide is a suitable crosslinker.

The stabilizer may be or comprise a non-ionic surfactant, for example a non-ionic polymeric surfactant. The non-ionic surfactant may comprise at least one oligomeric surfactant. For example, the non-ionic surfactant may comprise an oligomeric surfactant. The non-ionic polymeric or oligomeric surfactant may comprise at least one polyethyleneoxy group or at least one polypropyleneoxy group. The non-ionic polymeric surfactant may comprise at least one polyethyleneoxy group. The non-ionic oligomeric surfactant may comprise at least one polyethyleneoxy group or at least one polypropyleneoxy group. The stabiliser may be selected from or comprise hypermer 2296, Abil WE09, Abil EM90 and sorbitane monooleate (Span 80).

Polymerisation may comprise activating the radical initiator. The radical initiator is typically activated by heating to form radicals that will initiate the polymerization reaction, however other methods of activation may be used, e.g. radiation. Activating the radical initiator may comprise heating the emulsion comprising swollen particles. The heating typically comprises heating the emulsion to a temperature above the temperature at which the step of allowing the monodisperse seed particles to form swollen particles was performed. The heating may comprise heating to a temperature of at least 40° C., for example heating to a temperature of at least 50° C., e.g. a temperature of at least 60° C. or a temperature of at least 70° C.

The radical initiator may be or comprise a peroxide-initiator or an azo-initiator. For example, the radical initiator may be a peroxide-initiator. For example, the radical initiator may be an azo-initiator. An exemplary radical initiator is 2,2'-azobis-2,4-dimethyl valeronitrile. An exemplary radical initiator is 2,2'-azodi(2-methylbutyronitrile). The radical initiator may be present in solution (a). The radical initiator may be present in solution (b). The radical initiator may be present in an amount of from about 0.1 wt % to about 1.5 wt % in the emulsion. For example the radical initiator may be present in the emulsion in an amount of from about 0.6 wt % to about 1.2 wt %; e.g. the radical initiator may be present in the emulsion in an amount of about 0.8% in the emulsion.

The organic solvent used in the methods of forming monodisperse crosslinked hydrogel polymer particles may comprise (or consist of) at least one of an aliphatic hydrocarbon, an aliphatic carbonate, an aliphatic ester, an aliphatic ether, an aromatic hydrocarbon, or a silicone, or a combination thereof. For example, the organic solvent may comprise (or consist of) at least two of an aliphatic hydrocarbon, an aliphatic carbonate, an aliphatic ester, an aliphatic ether, an aromatic hydrocarbon, and a silicone; or the organic solvent may comprise (or consist of) at least three of an aliphatic hydrocarbon, an aliphatic carbonate, an aliphatic ester, an aliphatic ether, an aromatic hydrocarbon, and a silicone. The organic solvent may comprise (or consist of) a mixture of heptane and toluene. The organic solvent may comprise (or consist of) a mixture of aliphatic hydrocarbons. The organic solvent may comprise (or consist of) bis(2-ethylhexyl) carbonate. The organic solvent may comprise (or consist of) bis(2-ethylhexyl) carbonate, aliphatic hydrocarbons and aromatic hydrocarbons. The organic solvent may comprise (or consist of) bis(2-ethylhexyl)adipate.

The monodisperse seed particles added to the water-in-oil emulsion (c) may have the characteristics of monodisperse seed particles formed according to a method of preparing monodisperse seed particles disclosed herein. The monodisperse seed particles added to water-in-oil emulsion (c) may be monodisperse seed particles formed according to a method of preparing monodisperse seed particles disclosed herein. The monodisperse seed particles may be monodisperse seed particles of the disclosure, e.g. monodisperse seed particles of the invention.

In an embodiment the present invention provides a method of forming monodisperse crosslinked hydrogel polymer particles. The method comprises forming a solution (a) of at least 2% wt of a hydrophilic vinylic monomer in an aqueous solution, the aqueous solution also comprising a chain transfer agent; forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion; allowing the monodisperse seed particles to form swollen particles in the emulsion; polymerising the swollen particles to form monodisperse polymer particles; forming a solution (d) of stabilizer in an organic solvent, wherein the organic solvent is not miscible in water; forming a solution (e) of at least 2% wt of a hydrophilic vinylic monomer in an aqueous solution, the aqueous solution also comprising a crosslinker comprising at least two vinyl groups, wherein at least one of solution (d) and solution (e) comprises a radical initiator; mixing solutions (d) and (e) to form a water-in-oil emulsion (f) and adding the monodisperse polymer particles to the emulsion; allowing the monodisperse polymer particles to form swollen polymer particles in the emulsion; and polymerising the swollen polymer particles to form the monodisperse crosslinked hydrogel polymer particles. As explained below, this method may be considered a two-stage method, as it comprises a first swelling step and first polymerisation step, followed by a second swelling step and a second polymerisation step. Compared to a single stage-method, the two-stage method may provide large monodisperse crosslinked hydrogel crosslinked polymer particles.

Figure 3:
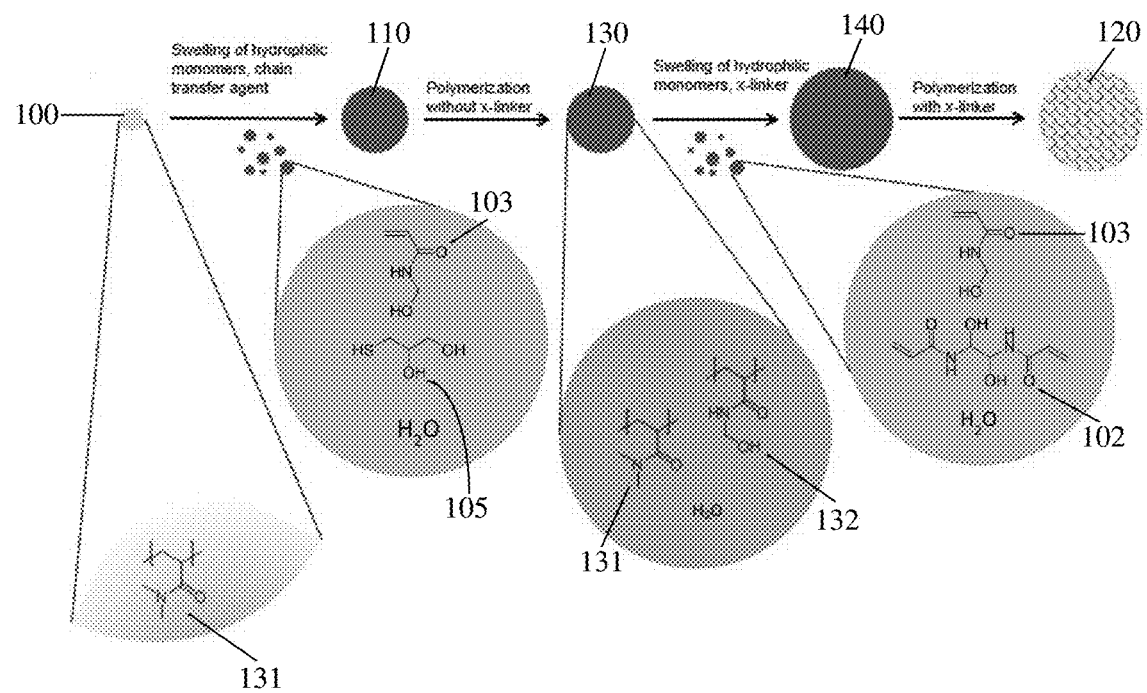
FIG. 3 is a diagrammatic representation of a two-stage swelling particle forming process of the invention, including an indication of exemplary monomers and chain transfer agent.
Figure 4:
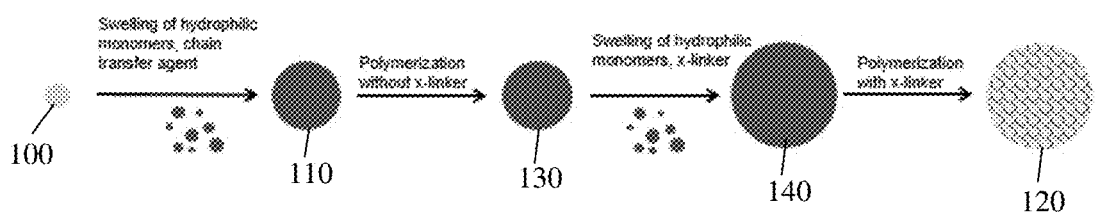
FIG. 4 is a diagrammatic representation of a two-stage swelling particle forming process of the invention.

Similarly to the single-stage method, the two-stage method involves swelling the seed particles with an aqueous discontinuous phase in an oil continuous phase. A schematic of this process, which may be considered a two-stage process, as it comprises a two steps of swelling and two steps of polymerisation, is provided in FIG. 3 (illustrated with specific monomers) and FIG. 4 (illustrated more generally). The method illustrated in FIGS. 3 and 4 is conveniently divided into 4 steps: swelling of the monodisperse seed particles 100 with monomer 103 and chain transfer agent 105 to form swollen (monodisperse) seed particles 110; polymerisation of the monomer in the swollen seed particles to form (non-crosslinked) hydrophilic polymer particles 130; swelling of the hydrophilic polymer particles with monomer 103 and cross-linker 102 to form swollen hydrophilic polymer particles 140; and polymerisation of monomer in the hydrogel polymer particles to form crosslinked hydrogel polymer particles 150. Prior to the first step a water-in-oil emulsion is formed. The water-in-oil emulsion is formed by mixing an aqueous solution comprising a monomer, e.g. hydroxymethylacrylamide 103, and a chain transfer agent, e.g. 1-thioglycerol 105, with an oil phase comprising a steric stabiliser, with the emulsion formed when the water and oil phases are agitated (e.g. by stirring). The water-in-oil emulsion also typically contains an initiator, which may have been added to the oil phase and/or the aqueous phase. The initiator is a compound that upon activation will initiate polymerisation of the monomer. The monodisperse seed particles 100 comprise non-crosslinked oligomers of poly N,N-dimethylacrylamide 131 and are considered "activated seed particles". The seed particles 100 may be prepared as described elsewhere in this application.

In the first step monodisperse seed particles 100 are added to the water-in-oil emulsion and the emulsion is agitated for a period of time (for instance for at least 30 minutes or for at least 1 hour, typically for 4-48 hours). During this period of time the monomer 103 and chain transfer agent 105 diffuse into the activated seed particles 100 to form the swollen seed particles 110. The swollen seed particles 110 comprise a mixture of at least the monomer 103, the chain transfer agent 105 and polymer from the activated seed particles 100. The swollen seed particles 110 may also include other components, for instance one or more porogens, which can enter the particles if included in the water-in-oil emulsion. For example, in the illustrated method, water is also present in the swollen seed particles 110, and this water may be considered a porogen. The second step comprises polymerisation of the monomer 103 to form the (non-crosslinked) hydrophilic polymer particles 130. In the second step polymerisation is initiated by activating the initiator, for example by heating the emulsion. The presence of the chain transfer agent 105 results in relatively short polymers of polyhydroxymethyl acrylamide 132 (e.g. oligomers) in the hydrogel polymer particles. These relatively short polymers, combined with the lack of cross-linking, means that the hydrophilic polymer particles 130 may act as larger "activated seed particles" suitable for a further round of swelling and polymerisation. The hydrophilic polymer particles will contain the non-crosslinked relatively short polymers of polymers of polyhydroxymethyl acrylamide 132, as well as a (typically smaller proportion) of non-crosslinked oligomers of poly N,N-dimethylacrylamide 131.

Prior to the third step a water-in-oil emulsion is formed. The water-in-oil emulsion is formed by mixing an aqueous solution comprising a monomer, e.g. hydroxymethylacrylamide 103, and a crosslinker, e.g. 1,2-dihydroxy bisacrylamide 102 with an oil phase comprising a steric stabiliser. If a (very) highly crosslinked particle is desired, it is also possible to replace the monomer with a crosslinker, so that the only monomers present in the water-in-oil emulsion are crosslinking monomers (i.e. crosslinkers). The water-in-oil emulsion also typically contains an initiator, which may have been added to either the oil phase or the aqueous phase. The initiator is a compound that upon activation will initiate polymerisation of the monomer and the crosslinker. In the third step (second round of swelling) hydrophilic polymer particles 130 are added to the water-in-oil emulsion and the emulsion is agitated for a period of time (for instance for at least 30 minutes or for at least 1 hour, typically for 4-48 hours). During this period of time the monomer 103 and crosslinker 102 diffuse into the hydrophilic polymer particles 130 to form the swollen hydrogel polymer particles 140. The swollen hydrophilic polymer particles 140 comprise a mixture of at least the monomer 103, crosslinker 102 and polymers from the hydrophilic polymer particles 130. The swollen hydrogel polymer particles 140 may also include other components, for instance one or more porogens, which can enter the particles if included in the water-in-oil emulsion. For example, in the illustrated method, water is also present in the swollen seed particles 110, and this water may be considered a porogen. The fourth step comprises polymerisation of the monomer 103 and cross-linker 102 to form the crosslinked hydrogel polymer particles 104. In the fourth step polymerisation is initiated by activating the initiator, for example by heating the emulsion.

The monomer, chain transfer agent, radical initiator, stabiliser, cross-linker, organic solvent and optional porogen may each be as defined elsewhere herein. The monomer may be or comprise hydroxymethylacrylamide or hydroxyethylacrylamide. The chain transfer agent may be or comprise 1-thioglycerol. The radical initiator may be or comprise azobisdimethyl valeronitrile, e.g. 2,2'-azodi(2-methylbutyronitrile) (AMBN). The stabiliser may be or comprise Hypermer 2296, Abil WE09, and Abil EM90. The crosslinker may be 1,2-dihydroxy bisacrylamide or N,N'-((ethane-1,2-diylbis(oxy))bis(ethane-2,1-diyl))diacrylamide.

The solution (a) may comprise not more than 60% wt hydrophilic vinylic monomer. For example, the solution (a) may comprise not more than 55% wt or 50% wt hydrophilic vinylic monomer. For example, the solution (a) may comprise not more than 45% wt or 40% wt hydrophilic vinylic monomer; e.g. solution (a) may comprise not more than 30% wt hydrophilic vinylic monomer. The solution (a) may comprise at least 2% wt hydrophilic vinylic monomer. The solution (a) may comprise at least 5% wt hydrophilic vinylic monomer. The solution (a) may comprise at least 8% wt hydrophilic vinylic monomer. The solution (a) may comprise at least 2% wt % (e.g. 5% wt) hydrophilic vinylic monomer and not more than 60% wt hydrophilic vinylic monomer, for example the solution (a) may comprise at least 8% wt hydrophilic vinylic monomer and not more than 60% wt hydrophilic vinylic monomer. The solution (a) may comprise at least 2% wt % (e.g. 5% wt) hydrophilic vinylic monomer and not more than 50% wt hydrophilic vinylic monomer, for example the solution (a) may comprise at least 8% wt hydrophilic vinylic monomer and not more than 50% wt hydrophilic vinylic monomer. The solution (a) may comprise at least 2% wt % (e.g. 5% wt) hydrophilic vinylic monomer and not more than 45% wt hydrophilic vinylic monomer, for example the solution (a) may comprise at least 8% wt hydrophilic vinylic monomer and not more than 45% wt hydrophilic vinylic monomer. The solution (a) may comprise at least 2% wt % (e.g. 5% wt) hydrophilic vinylic monomer and not more than 30% wt hydrophilic vinylic monomer, for example the solution (a) may comprise at least 8% wt vinylic monomer and not more than 30% wt hydrophilic vinylic monomer. The solution (a) may comprise at least 2% wt % (e.g. 5% wt) hydrophilic vinylic monomer and not more than 15% hydrophilic vinylic monomer, e.g. the solution (a) may comprise about 10% wt hydrophilic vinylic monomer.

The solution (e) may comprise not more than 60% wt hydrophilic vinylic monomer. For example, the solution (e) may comprise not more than 55% wt or 50% wt hydrophilic vinylic monomer. For example, the solution (e) may comprise not more than 45% wt or 40% wt hydrophilic vinylic monomer; e.g. solution (e) may comprise not more than 30% wt hydrophilic vinylic monomer. The solution (e) may comprise at least 2% wt hydrophilic vinylic monomer. The solution (e) may comprise at least 5% wt hydrophilic vinylic monomer. The solution (e) may comprise at least 8% wt hydrophilic vinylic monomer. The solution (e) may comprise at least 2% wt % (e.g. 5% wt) hydrophilic vinylic monomer and not more than 60% wt hydrophilic vinylic monomer, for example the solution (e) may comprise at least 8% wt hydrophilic vinylic monomer and not more than 60% wt hydrophilic vinylic monomer. The solution (e) may comprise at least 2% wt % (e.g. 5% wt) hydrophilic vinylic monomer and not more than 50% wt hydrophilic vinylic monomer, for example the solution (e) may comprise at least 8% wt hydrophilic vinylic monomer and not more than 50% wt hydrophilic vinylic monomer. The solution (e) may comprise at least 2% wt % (e.g. 5% wt) hydrophilic vinylic monomer and not more than 45% wt hydrophilic vinylic monomer, for example the solution (e) may comprise at least 8% wt hydrophilic vinylic monomer and not more than 45% wt hydrophilic vinylic monomer. The solution (e) may comprise at least 2% wt % (e.g. 5% wt) hydrophilic vinylic monomer and not more than 30% wt hydrophilic vinylic monomer, for example the solution (e) may comprise at least 8% wt vinylic monomer and not more than 30% wt hydrophilic vinylic monomer. The solution (e) may comprise at least 2% wt % (e.g. 5% wt) hydrophilic vinylic monomer and not more than 15% hydrophilic vinylic monomer, e.g. the solution (e) may comprise about 10% wt hydrophilic vinylic monomer.

In highly crosslinked particles, the hydrophilic vinylic monomer of solution (e) may be or comprise a crosslinker. For example, the monomer may be or comprise at least one compound of formula (IIa) or (IIb).

The level of crosslinking in the crosslinked hydrogel polymer particles formed by the method can be expressed as the percentage by weight (% wt) of crosslinker monomer included in the total monomer used in the polymerisation (i.e. in the second polymerisation step). The % wt of crosslinker monomer may be equivalent to the % wt of the crosslinker in matrix polymer (i.e. the % wt of crosslinker in the dry weight of the crosslinked polymer particles). Typical levels of crosslinking include >5% wt crosslinker, for example >10% wt crosslinker, or >15% wt crosslinker, e.g. >20% wt crosslinker (such as >30% wt crosslinker). The level of crosslinking may also be, for instance 5-60% wt crosslinker, for example 10-50% wt crosslinker. The level of crosslinking may also be, for instance 15-40% wt crosslinker, for example 20-40% wt crosslinker, e.g. 20-30% wt crosslinker. The level of crosslinking may be 20-80% wt crosslinker or 25-75% wt crosslinker, e.g. 25-60% wt crosslinker or 30-50% wt crosslinker; for example in high density particles. The solution (e) may therefore comprise at an amount of crosslinker in % wt that corresponds to 5-60% of the amount of hydrophilic vinylic monomer, for example 10-50% of the amount of hydrophilic vinylic monomer. The solution (e) may therefore comprise at an amount of crosslinker in % wt that corresponds to, for instance 15-40% of the amount of hydrophilic vinylic monomer, for example 20-40% of the amount of hydrophilic vinylic monomer, e.g. 20-30% of the amount of hydrophilic vinylic monomer.

The level of crosslinking may be >30% wt crosslinker or >40% wt crosslinker (e.g. >50% wt crosslinker), for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer in solution (e) may be a crosslinker, e.g. the hydrophilic vinyilic monomer and the crosslinker may be the same compound. The solution (e) may comprise at an amount of crosslinker in % wt that corresponds to 20-80% of the amount of hydrophilic vinylic monomer, for example 25-60% of the amount of hydrophilic vinylic monomer.

The radical initiator may be present in an amount of from about 0.1 wt % to about 1.5 wt % in each or at least one emulsion. For example the radical initiator may be present in each or at least one emulsion in an amount of from about 0.6 wt % to about 1.2 wt %; e.g. the radical initiator may be present in each or at least one emulsion in an amount of about 0.8 wt % in each or at least one emulsion.

The addition of a chain transfer agent reduces the molecular weight of the polymer of the monodisperse polymer particles by reacting with the free radical of a growing polymer chain to terminate the chain and transfer the lone electron to a radical species derived from the chain transfer agent. The radical species derived from the chain transfer agent may then react with a monomer to form a radical from the monomer, which can then react with another monomer to commence formation of a new polymer chain. The chain transfer reagent may be a thiol or a haloalkane. For example, the chain transfer agent may be selected from thiols (e.g. 1-thioglycerol, 1-octanethiol, hexane thiol, 6-mercapto-1-hexanol, benzylthiol), alkyl thiols (e.g. 1-octanethiol, hexane thiol) and thipolyols (e.g. 1-thioglycerol). The chain transfer agent may be or comprise 1-thioglycerol. The total amount of chain transfer agent added can be in the range 1 mol per 10 mol of monomer to 1 mol per 300 mol of monomer, for example 1 mol per 20 mol of monomer to 1 mol per 100 mol monomer, e.g. approximately 1 mol chain transfer agent per 30 mol of monomer.

The monodisperse crosslinked hydrogel polymer particles formed according to a method of the invention may be porous. For example, the monodisperse crosslinked hydrogel polymer particles formed may have a porosity of at least 5%, e.g. at least 10%. The disclosure includes porous monodisperse crosslinked hydrogel polymer particles having a porosity of from 20% to 95%, particularly of from 30% to 90%, e.g. of from 40% to 90%, such as from 50% to 80%. The porous monodisperse crosslinked hydrogel polymer particles formed may be transparent to solvated molecules, for example the porous monodisperse crosslinked hydrogel polymer particles may be transparent to oligonucleotides and nucleic acid amplification reagents and sequencing reagents (e.g. primers, nucleotides and polymerases).

The monodisperse crosslinked hydrogel polymer particles formed according to a method of the invention may have a mode diameter of from 0.5 μm to 10 μm, for example of from 0.5 μm to 5 μm. The monodisperse crosslinked hydrogel polymer particles formed may have a mode diameter of at least 500 nm, e.g. at least 600 nm, optionally at least 800 nm, as in the case of particles having a diameter of at least 1 μm. The monodisperse crosslinked hydrogel polymer particles formed according to a method of the invention may have a mode diameter of not more than 10 μm, e.g. not more than 5 μm, optionally not more than 3 μm, as in the case of particles having a diameter of not more than 2 μm. The size and size distribution of the monodisperse crosslinked hydrogel polymer particles formed according to a method of the invention may be determined as described below under the heading "analytical methods".

The monodisperse crosslinked hydrogel polymer particles formed according to a method of the invention may have a CV of less than 20%, for example less than 15%. For example, the particles may have a CV of less than 10%, such as a CV of less than 8%, e.g. a CV of less than 5%.

The monodisperse crosslinked hydrogel polymer particles formed according to a method of the invention may comprise functional groups. The functional groups may be selected from a hydroxyl, a carboxylic acid (—COOH), a primary amine or a secondary amine. In an embodiment, the functional groups are provided by a hydrophilic vinylic monomer (e.g. compound of formula (I)) and not a crosslinker (e.g. compound of formula (IIa) or formula (IIb)). The functional groups may be enhanced to facilitate binding with target analytes (e.g. oligonucleotides) or target receptors. Exemplary methods of enhancing functional groups of the particles are described herein in the section relating to "Uses of the Particles".

The monodisperse crosslinked hydrogel polymer particles formed according to methods of the invention may comprise oligonucleotides attached to the particles. The oligonucleotides may be attached to the monodisperse crosslinked hydrogel polymer particles via a linker. For example, each of (or a proportion of) the monodisperse hydrogel polymer particles may comprise a plurality of oligonucleotides attached to the particle. The plurality of oligonucleotides may be identical for each individual crosslinked hydrogel polymer particle. For example, a first crosslinked hydrogel polymer particle may comprise a plurality of oligonucleotides having a first sequence attached to the first particle, and a second crosslinked hydrogel polymer particle may comprise a plurality of oligonucleotides having a second sequence attached to the second crosslinked hydrogel polymer particle. Where the monodisperse crosslinked hydrogel polymer particles are porous, the oligonucleotides may be attached to the outer surface of the particle or attached inside a pore. The pores may be of sufficient size to render the particle transparent to the oligonucleotides, such that the oliogonucleotides may be located partly or wholly within the pores, even when a polymerase is attached to the oligonucleotide.

The monodisperse crosslinked hydrogel polymer particles formed according to a method of the invention may be stable (i.e. resistant to polymer degradation) in aqueous solution over the typical temperature ranges of aqueous solutions. The monodisperse crosslinked hydrogel polymer particles formed may be stable at a temperature of up to about 100° C. For example the monodisperse crosslinked hydrogel polymer particles formed may be stable in a temperature range of from about 0° C. to about 100° C.

An embodiment of the invention provides particles obtained by, or having the characteristics of particles obtained by, the preparative processes described herein.

The polymer particle forming processes described herein may be worked to be highly reproducible and scaleable. The invention may therefore enable consistency between and within batches, which is a prerequisite for industrial application. The invention may also enable production of pilot scale batches of e.g. at least 300 g as well as kilogram scale industrial batches.

The polymer particle forming processes described herein can be performed consistently without the problems which in practice can arise with emulsion polymerisation, e.g. agglomeration of particles as well as variation in the product.

Uses of the Particles

The particles can be used in many applications, e.g. polynucleotide sequencing, polynucleotide sequencing, information storage, color imaging, bioprocessing, diagnostic microbiology, biosensors and drug delivery.

The polymer particles can be activated to facilitate conjugation with a target analyte, such as a polynucleotide. In addition to the methods described below, suitable methods of activation and bioconjugation are described in G. T. Hermanson, *Bioconjugate Techniques,* 2013 ($3^{rd}$ Edition), Academic Press, the content of which is incorporated by reference herein in its entirety.

For example, functional groups on the polymeric particle can be enhanced to permit binding with target analytes or analyte receptors. In a particular example, functional groups of the polymer particles can be modified with reagents capable of converting the functional groups to reactive moieties that can undergo nucleophilic or electrophilic substitution. For example, hydroxyl groups on the polymer particles can be activated by replacing at least a portion of the hydroxyl groups with a sulfonate group or chlorine. Exemplary sulfonate groups can be derived from tresyl, mesyl, tosyl, or tosyl chloride, or any combination thereof. Sulfonate can act to permit nucleophiles to replace the sulfonate. The sulfonate may further react with liberated chlorine to provide a chlorinated groups that can be used in a process to conjugate the particles. In another example, where the polymer particles comprise amine groups or carboxylic acid groups (e.g. from a functional monomer), the amine groups or carboxylic acid groups can be activated.

For example, target analyte or analyte receptors can bind to the polymer particles through nucleophilic substitution with the sulfonate group or other activated group. In particular example, target analyte receptors terminated with a nucleophile, such as an amine or a thiol, can undergo nucleophilic substitution to replace the sulfonate groups on the surface of the polymer particles. As a result of the activation, conjugated particles can be formed.

In another example, sulfonated particles can be further reacted with mono- or multi-functional mono- or multi-nucleophilic reagents that can form an attachment to the particle while maintaining nucleophilic activity for oligonucleotides comprising electrophilic groups, such as maleimide. In addition, the residual nucleophilic activity can be converted to electrophilic activity by attachment to reagents comprising multi-electrophilic groups, which are subsequently to attach to oligonucleotides comprising nucleophilic groups.

In another example, a monomer containing the functional group (functional monomer) may be included in the mixture of monomers during the polymerization. The functional monomer can include, for example, an acrylamide containing a carboxylic acid, ester, halogen or other amine reactive group. The ester group may be hydrolyzed before the reaction with an amine oligonucleotide.

Other activation chemistries include incorporating multiple steps to convert a specified functional group to accommodate specific desired linkages. For example, the sulfonate modified hydroxyl group can be converted into a nucleophilic group through several methods. In an example, reaction of the sulfonate with azide anion yields an azide substituted hydrophilic polymer. The azide can be used directly to conjugate to an acetylene substituted biomolecule via "CLICK" chemistry that can be performed with or without copper catalysis. Optionally, the azide can be converted to amine by, for example, catalytic reduction with hydrogen or reduction with an organic phosphine. The resulting amine can then be converted to an electrophilic group with a variety of reagents, such as di-isocyanates, bis-NHS esters, cyanuric chloride, or a combination thereof. In an example, using di-isocyanates yields a urea linkage between the polymer and a linker that results in a residual isocyanate group that is capable of reacting with an amino substituted biomolecule to yield a urea linkage between the linker and the biomolecule. In another example, using bis-NHS esters yields an amide linkage between the polymer and the linker and a residual NHS ester group that is capable of reacting with an amino substituted biomolecule to yield an amide linkage between the linker and the biomolecule. In a further example, using cyanuric chloride yields an amino-triazine linkage between the polymer and the linker and two residual chloro-triazine groups one of which is capable of reacting with an amino substituted biomolecule to yield an amino-triazine linkage between the linker and the biomolecule. Other nucleophilic groups can be incorporated into the particle via sulfonate activation. For example, reaction of sulfonated particles with thiobenzoic acid anion and hydrolysis of the consequent thiobenzoate incorporates a thiol into the particle which can be subsequently reacted with a maleimide substituted biomolecule to yield a thio-succinimide linkage to the biomolecule. Thiol can also be reacted with a bromo-acetyl group.

Covalent linkages of biomolecules onto refractory or polymeric substrates can be created using electrophilic moieties on the substrate coupled with nucleophilic moieties on the biomolecule or nucleophilic linkages on the substrate coupled with electrophilic linkages on the biomolecule. Because of the hydrophilic nature of most common biomolecules of interest, the solvent of choice for these couplings is water or water containing some water soluble organic solvent in order to disperse the biomolecule onto the substrate. In particular, polynucleotides are generally coupled to substrates in water systems because of their poly-anionic nature. Because water competes with the nucleophile for the electrophile by hydrolyzing the electrophile to an inactive moiety for conjugation, aqueous systems generally result in low yields of coupled product, where the yield is based on the electrophilic portion of the couple. When high yields of electrophilic portion of the reaction couple are desired, high concentrations of the nucleophile are required to drive the reaction and mitigate hydrolysis, resulting in inefficient use of the nucleophile. In the case of polynucleic acids, the metal counter ion of the phosphate can be replaced with a lipophilic counter-ion, in order to help solubilize the biomolecule in polar, non-reactive, non-aqueous solvents. These solvents can include amides or ureas such as formamide, N,N-dimethylformamide, acetamide, N,N-dimethylacetamide, hexamethylphosphoramide, pyrrolidone, N-methylpyrrolidone, N,N,N',N'-tetramethylurea, N,N'-dimethyl-N, N'-trimethyleneurea, or a combination thereof; carbonates such as dimethyl carbonate, propylene carbonate, or a combination thereof; ethers such as tetrahydrofuran; sulfoxides and sulfones such as dimethylsulfoxide, dimethylsulfone, or a combination thereof; hindered alcohols such as tert-butyl alcohol; or a combination thereof. Lipophilic cations can include tetraalkylammomiun or tetraarylammonium cations such as tetramethylamonium, tetraethylamonium, tetrapropylamonium, tetrabutylamonium, tetrapentylamonium, tetrahexylamonium, tetraheptylamonium, tetraoctylamonium, and alkyl and aryl mixtures thereof, tetraarylphosphonium cations such as tetraphenylphosphonium, tetraalkylarsonium or tetraarylarsonium such as tetraphenylarsonium, and trialkylsulfonium cations such as trimethylsulfonium, or a combination thereof. The conversion of polynucleic acids into organic solvent soluble materials by exchanging metal cations with lipophilic cations can be performed by a variety of standard cation exchange techniques.

The polymer particles can be activated to facilitate conjugation with a target analyte, such as a polynucleotide. For example, functional groups on the crosslinked hydrogel polymer particles can be enhanced to permit binding with target analytes or analyte receptors. In a particular example, functional groups of the polymer can be modified with reagents capable of converting hydrophilic polymer functional groups to reactive moieties that can undergo nucleophilic or electrophilic substitution. In particular, where the polymer particles have carboxyl functionality, these can be activated to facilitate conjugation, for example to biomolecules, such as nucleic acids.

In embodiments where the particles are formed with a comonomer including hydroxyl groups, hydroxyl groups on the hydrophilic particle can be activated by replacing at least a portion of the hydroxyl groups with a sulfonate group or chlorine. Exemplary sulfonate groups can be derived from tresyl, mesyl, tosyl, or fosyl chloride, or any combination thereof. Sulfonate can act to permit nucleophiles to replace the sulfonate. The sulfonate may further react with liberated chlorine to provide chlorinated groups that can be used in a process to conjugate the particles. In another example, amine groups on the hydrophilic polymer can be activated.

For example, target analyte or analyte receptors can bind to the hydrophilic polymer through nucleophilic substitution with the sulfonate group. In particular example, target analyte receptors terminated with a nucleophile, such as an amine or a thiol, can undergo nucleophilic substitution to replace the sulfonate groups on the surface of the hydrophilic polymer. As a result of the activation, a conjugated particle can be formed.

In another example, where the particles are formed from monomers comprising an amine, nucleophilic amino groups can be modified with di-functional bis-electrophilic moieties, such as a di-isocyanate or bis-NHS ester, resulting in a hydrophilic particle reactive to nucleophiles.

When conjugated to polynucleotides, the polymer particles may include a density of polynucleotides, termed nucleotide density, of at least $7 \times 10^4$ per $\mu m^3$. For example, the nucleotide density may be at least $10^5$ per $\mu m^3$, such as at least $10^6$ per $\mu m^3$, at least $5 \times 10^6$ per $\mu m^3$, at least $8 \times 10^6$ per $\mu m^3$, at least $1 \times 10^7$ per $\mu m^3$, or even at least $3 \times 10^7$ per $\mu m^3$. In a further example, the nucleotide density may be not greater than $10^{15}$ per $\mu m^3$.

Such polymer particles can be used in a variety of separations techniques and analytic techniques. In particular, the polymer particles may be useful in binding polynucleotides. Such binding polynucleotides may be useful in separating polynucleotides from solution or can be used for analytic techniques, such as sequencing. In a particular example illustrated in FIG. 5, such polymeric particles can be used as a support for polynucleotides during sequencing techniques. For example, the particles may immobilize a polynucleotide for sequencing using fluorescent sequencing techniques. In another example, the polymer particles may immobilize a plurality of copies of a polynucleotide for sequencing using ion-sensing techniques.

In general, the polymeric particle can be treated to include a biomolecule, including nucleosides, nucleotides, nucleic acids (oligonucleotides and polynucleotides), polypeptides, saccharides, polysaccharides, lipids, or derivatives or analogs thereof. For example, the polymer particles may bind or attach to a biomolecule. A terminal end or any internal portion of a biomolecule can bind or attach to a polymeric particle. The polymer particles may bind or attach to a biomolecule using linking chemistries. A linking chemistry includes covalent or non-covalent bonds, including an ionic bond, hydrogen bond, affinity bond, dipole-dipole bond, van der Waals bond, and hydrophobic bond. A linking chemistry includes affinity between binding partners, for example between: an avidin moiety and a biotin moiety; an antigenic epitope and an antibody or immunologically reactive fragment thereof; an antibody and a hapten; a digoxigen moiety and an anti-digoxigen antibody; a fluorescein moiety and an anti-fluorescein antibody; an operator and a repressor; a nuclease and a nucleotide; a lectin and a polysaccharide; a steroid and a steroid-binding protein; an active compound and an active compound receptor; a hormone and a hormone receptor; an enzyme and a substrate; an immunoglobulin and protein A; or an oligonucleotide or polynucleotide and its corresponding complement.

Figure 5:
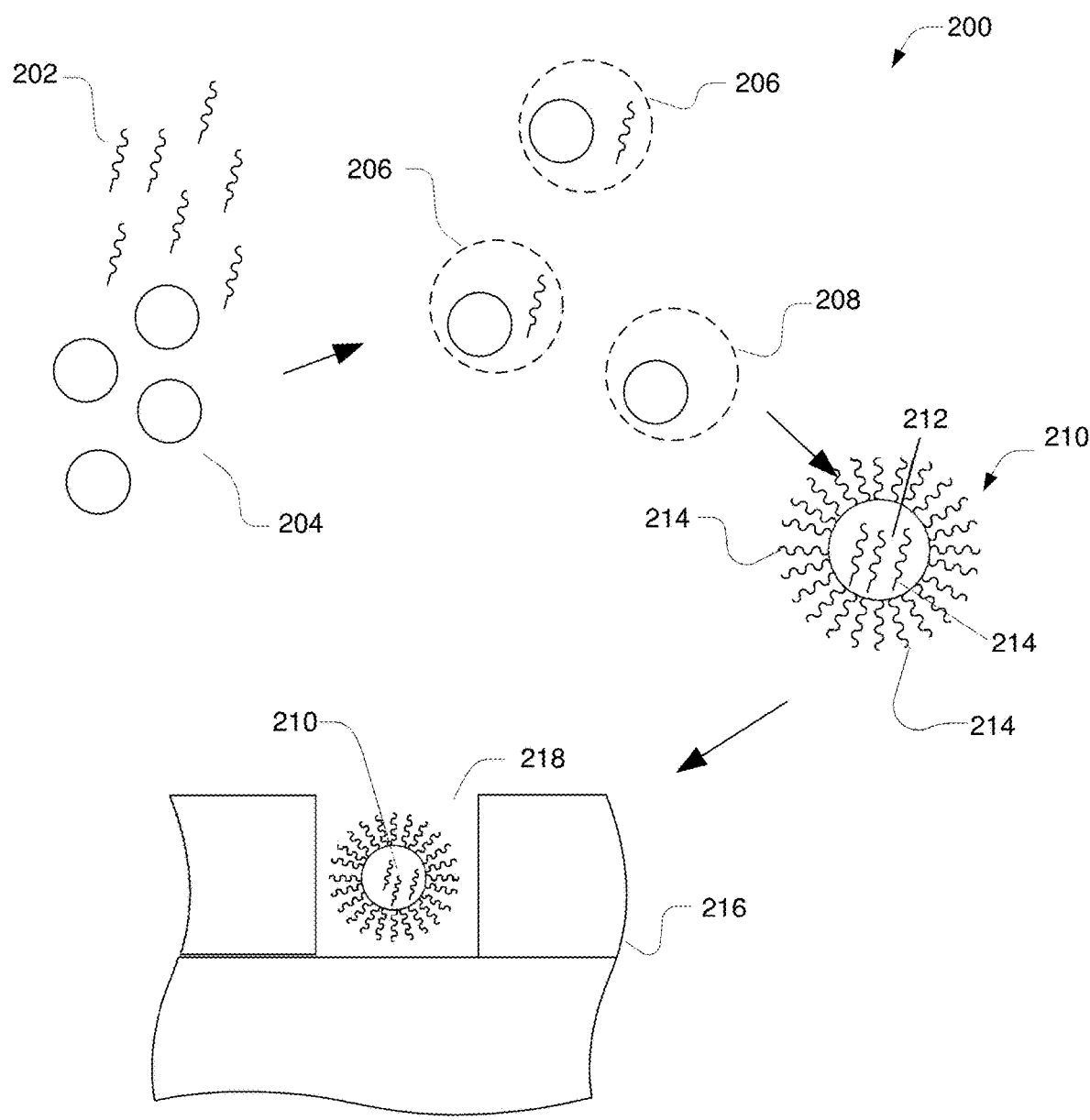
FIG. 5 illustrates the use of particles of the invention in nucleotide sequencing and/or detection.
Figure 1:
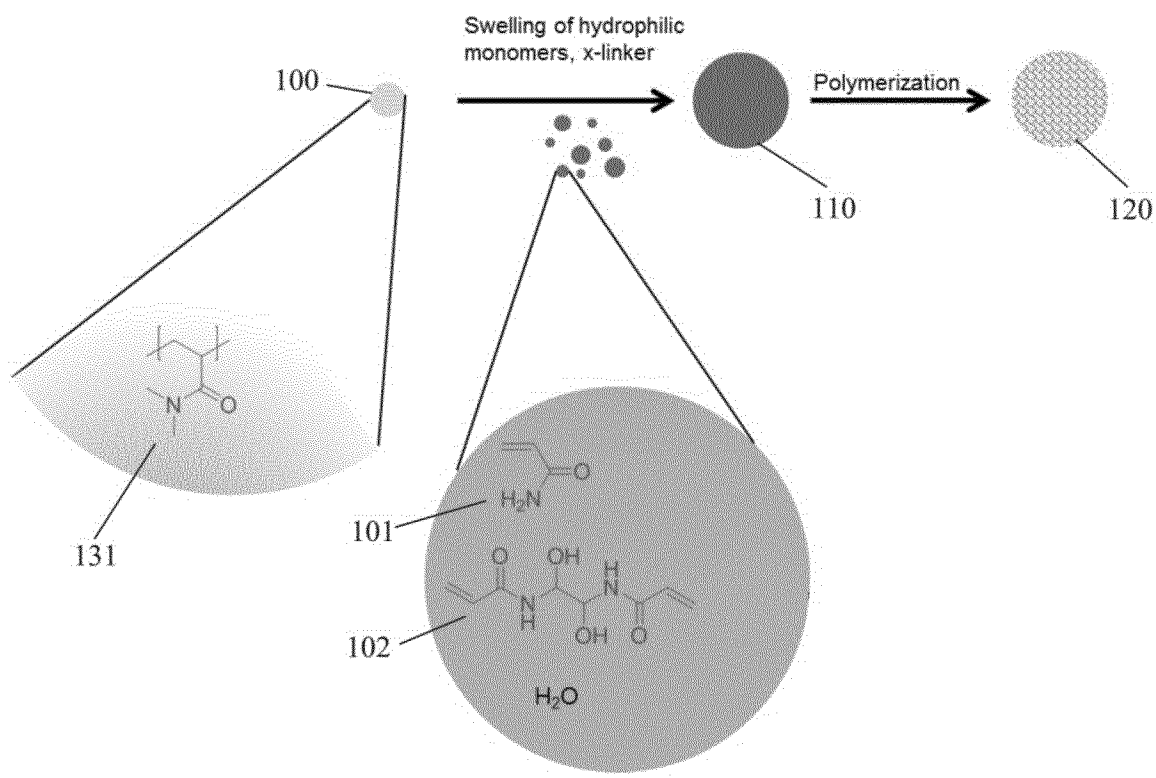
Figure 2:
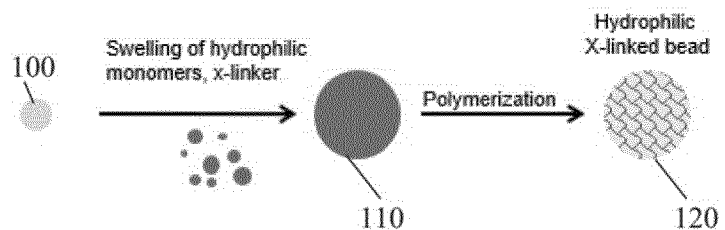
Figure 3:
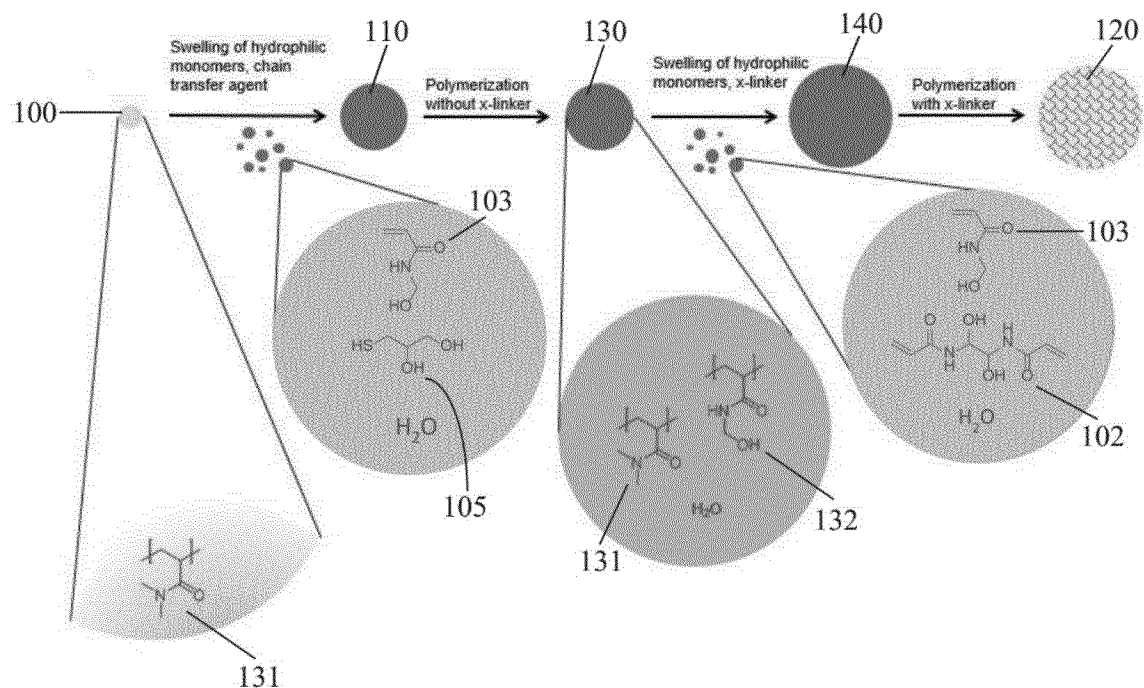
Figure 4:
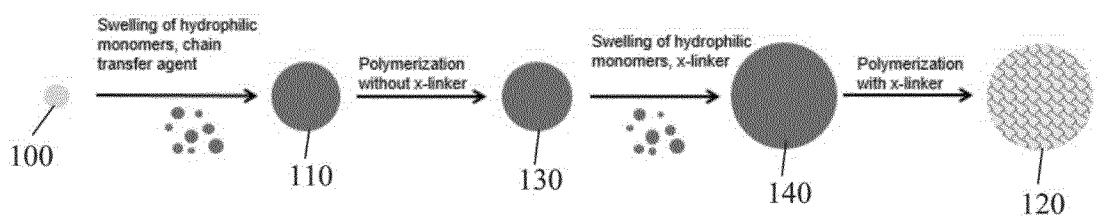
Figure 5:
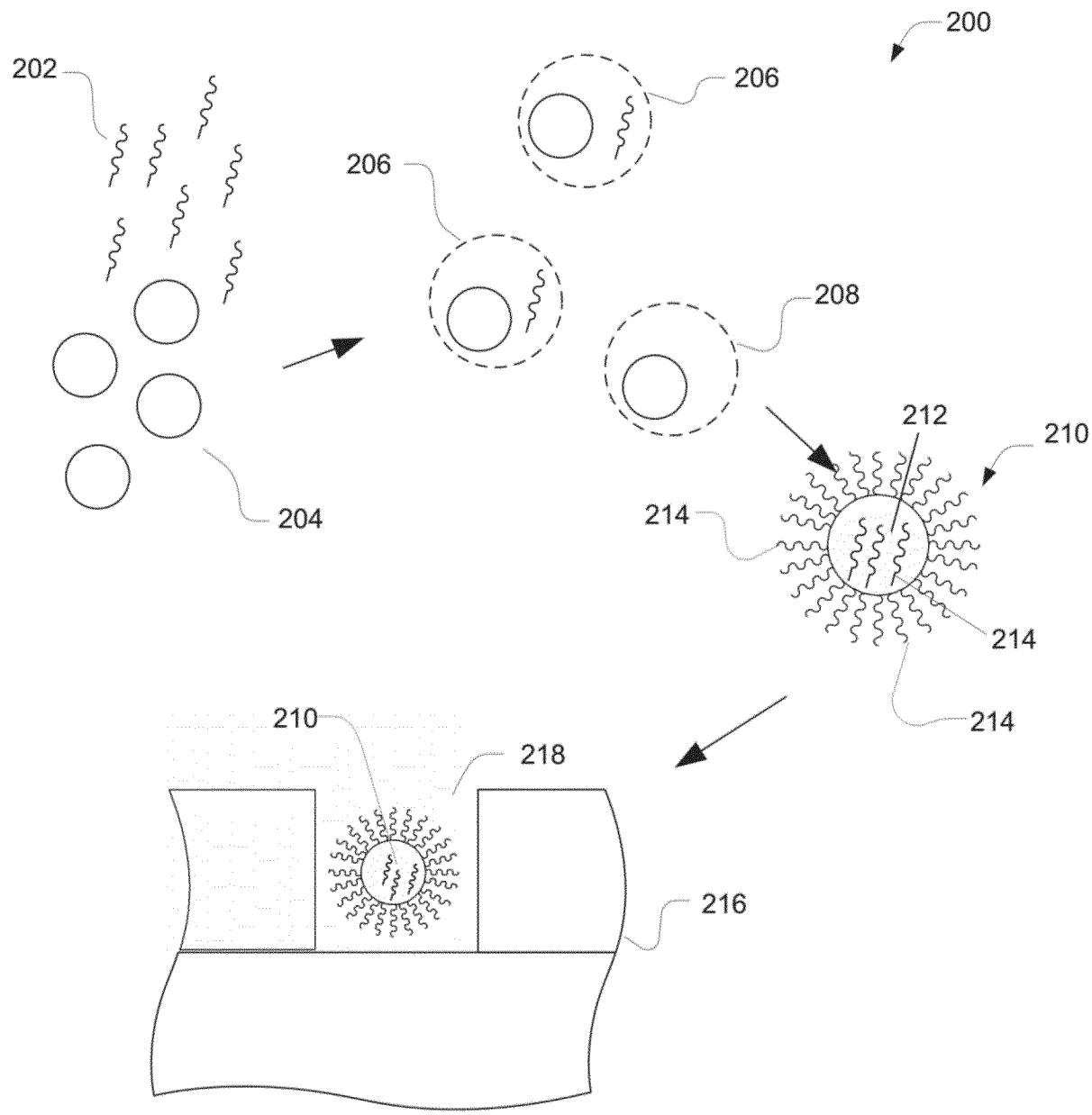

As illustrated in FIG. 5, a plurality of polymer particles 204 (for example monodisperse crosslinked hydrogel polymer particles of the disclosure) may be placed in a solution along with a plurality of polynucleotides 202. The plurality of particles 204 may be activated or otherwise prepared to bind with the polynucleotides 202. For example, the particles 204 may include an oligonucleotide complementary to a portion of a polynucleotide of the plurality of polynucleotides 202.

In a particular embodiment, the polymer particles and polynucleotides are subjected to polymerase chain reaction (PCR) amplification. For example, dispersed phase droplets 206 or 208 are formed as part of an emulsion and can include a particle or a polynucleotide. In an example, the polynucleotides 202 and the hydrophilic particles 204 are provided in low concentrations and ratios relative to each other such that a single polynucleotide 202 is likely to reside within the same dispersed phase droplets as a single polymer particle 204. Other droplets, such as a droplet 208, can include a single polymer particle and no polynucleotide. Each droplet 206 or 208 can include enzymes, nucleotides, salts or other components sufficient to facilitate duplication of the polynucleotide. Alternatively, amplification techniques, such as recombinase polymerase amplification (RPA) with or without emulsion, may be used.

In an aspect, the invention provides the use of crosslinked hydrogel polymer particles of the invention in nucleic acid amplification.

In embodiments, methods for nucleic acid amplification comprise: conducting a primer extension reaction on a polynucleotide that is hybridized to an oligonucleotide which is attached to a polymer particle. In embodiments the polymer particle is a monodisperse crosslinked hydrogel polymer particle of the disclosure. In embodiments, methods for nucleic acid amplification comprise: (a) providing a polymer particle attached to a single-stranded oligonucleotide (e.g., a primer oligonucleotide); (b) providing a single-stranded template polynucleotide; (c) hybridising the single-stranded oligonucleotide to the single-stranded template polynucleotide; (d) contacting the single-stranded template polynucleotide with a polymerase and at least one nucleotide under conditions suitable for the polymerase to catalyse polymerisation of at least one nucleotide onto the single-stranded oligonucleotide so as to generate an extended single-stranded oligonucleotide. In embodiments, the method further comprises: (e) removing (e.g., denaturing) the single-stranded template polynucleotide from the extended single-stranded oligonucleotide so that the single-stranded oligonucleotide remains attached to the polymeric particle; (f) hybridising the remaining single-stranded oligonucleotide to a second single-stranded template polynucleotide; and (g) contacting the second single-stranded template polynucleotide with a second polymerase and a second at least one nucleotide, under conditions suitable for the second polymerase to catalyse polymerisation of the second at least one nucleotide onto the single-stranded oligonucleotide so as to generate a subsequent extended single-stranded oligonucleotide. In embodiments, steps (e), (f) and (g) can be repeated at least once. In embodiments, the polymerase and the second polymerase comprise a thermostable polymerase. In embodiments, the conditions suitable for nucleotide polymerisation include conducting the nucleotide polymerisation steps (e.g., steps (d) or (g)) at an elevated temperature. In embodiments, the conditions suitable for nucleotide polymerisation include conducting the nucleotide polymerisation step (e.g., steps (d) or (g)) at alternating temperatures (e.g., an elevated temperature and a relatively lower temperature). In embodiments, the alternating temperature ranges from 60-95° C. In embodiments, the temperature cycles can be about 10 seconds to about 5 minutes, or about 10 minutes, or about 15 minutes, or longer. In embodiments, methods for nucleic acid amplification can generate one or more polymeric particles each attached to a plurality of template polynucleotides comprising sequences that are complementary to the single-stranded template polynucleotide or to the second single-stranded template polynucleotide. In embodiments, each of the polymeric particles can be attached with a plurality of single-stranded oligonucleotides (e.g., capture oligonucleotides). In embodiments, step (b), (c), (d), (e), (f) or (g) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide. In embodiments, methods for nucleic acid amplification (as described above) can be conducted in an aqueous phase solution in an oil phase (e.g., dispersed phase droplet).

Following PCR, particles are formed, such as particle 210, which can include the polymer particle 212 and a plurality of copies 214 of the polynucleotide. The majority of the polynucleotides 214 are illustrated on the external surface of the particle 210 for the purposes of clarity. The polynucleotides may, however, extend within (or be located within) the particle 210, as also illustrated. For example, hydrogel and hydrophilic particles may have a low concentration of polymer relative to water and may therefore be relatively porous. They may include polynucleotide segments on the interior of and throughout the particle 210 and polynucleotides may reside in pores and other openings. In particular, the particle 210 can permit diffusion of enzymes, nucleotides, primers and reaction products used to monitor the reaction. A high number of polynucleotides per particle produces a better signal.

In embodiments, polymeric particles from an emulsion-breaking procedure may be collected and washed in preparation for sequencing. Collection may be conducted by contacting biotin moieties (e.g., linked to amplified polynucleotide templates which are attached to the polymeric particles) with avidin moieties, and separation away from polymeric particles lacking biotinylated templates. Collected polymer particles that carry double-stranded template polynucleotides may be denatured to yield single-stranded template polynucleotides for sequencing. Denaturation steps may include treatment with base (e.g., NaOH), formamide, or pyrrolidone.

Sequencing can be performed by detecting nucleotide addition. Nucleotide addition may be detected using methods such as fluorescent emission methods or ion detection methods. For example, a set of fluorescently labeled nucleotides may be provided to the system 216 and can migrate to the well 218. Excitation energy may also be provided to the well 218. When a nucleotide is captured by a polymerase and added to the end of an extending primer, a label of the nucleotide may fluoresce, indicating which type of nucleotide is added. These and other sequencing methods described herein may be combined with methods for nucleic acid amplification. For example, in the methods for nucleic acid amplification described herein with steps (a)-(g), the methods may comprise a step (h) of sequencing by detecting the nucleotide addition.

In an alternative example, solutions including a single type of nucleotide can be fed sequentially. In response to nucleotide addition, the pH within the local environment of the well 218 may change. Such a change in pH may be detected by ion sensitive field effect transistors (ISFET). As such, a change in pH can be used to generate a signal indicating the order of nucleotides complementary to the polynucleotide of the particle 210.

In particular, a sequencing system can include a well, or a plurality of wells, disposed over a sensor pad of an ionic sensor, such as a field effect transistor (FET). In embodiments, a system includes one or more polymer particles loaded into a well which is disposed over a sensor pad of an ionic sensor (e.g., FET), or one or more polymeric particles loaded into a plurality of wells which are disposed over sensor pads of ionic sensors (e.g., FET). In embodiments, a FET may be a chemFET or an ISFET. A "chemFET" or chemical field-effect transistor, includes a type of field effect transistor that acts as a chemical sensor. The chemFET has the structural analog of a MOSFET transistor, where the charge on the gate electrode is applied by a chemical process. An "ISFET" or ion-sensitive field-effect transistor, can be used for measuring ion concentrations in solution; when the ion concentration (such as H+) changes, the current through the transistor changes accordingly.

Returning to FIG. 5, in an example, a well 218 of the array of wells may be operatively connected to measuring devices. For example, for fluorescent emission methods, a well 218 may be operatively coupled to a light detection device. In the case of ionic detection, the lower surface of the well 218 may be disposed over a sensor pad of an ionic sensor, such as a field effect transistor (e.g. a chemFET).

Exemplary systems involving sequencing via detection of ionic byproducts of nucleotide incorporation are the Ion Torrent PGM™ or Proton™ sequencers (Life Technologies), which are ion-based sequencing systems that sequences nucleic acid templates by detecting hydrogen ions produced as a byproduct of nucleotide incorporation. Typically, hydrogen ions are released as byproducts of nucleotide incorporations occurring during template-dependent nucleic acid synthesis by a polymerase. The Ion Torrent PGM™ or Proton™ sequencers detect the nucleotide incorporations by detecting the hydrogen ion byproducts of the nucleotide incorporations. The Ion Torrent PGM™ or Proton™ sequencers may include a plurality of template polynucleotides to be sequenced, each template disposed within a respective sequencing reaction well in an array. The wells of the array may each be coupled to at least one ion sensor that can detect the release of H$^+$ ions or changes in solution pH produced as a byproduct of nucleotide incorporation. The ion sensor comprises a field effect transistor (FET) coupled to an ion-sensitive detection layer that can sense the presence of H$^+$ ions or changes in solution pH. The ion sensor may provide output signals indicative of nucleotide incorporation which can be represented as voltage changes whose magnitude correlates with the H$^+$ ion concentration in a respective well or reaction chamber. Different nucleotide types may be flowed serially into the reaction chamber, and may be incorporated by the polymerase into an extending primer (or polymerization site) in an order determined by the sequence of the template. Each nucleotide incorporation may be accompanied by the release of H$^+$ ions in the reaction well, along with a concomitant change in the localized pH. The release of H$^+$ ions may be registered by the FET of the sensor, which produces signals indicating the occurrence of the nucleotide incorporation. Nucleotides that are not incorporated during a particular nucleotide flow may not produce signals. The amplitude of the signals from the FET can also be correlated with the number of nucleotides of a particular type incorporated into the extending nucleic acid molecule thereby permitting homopolymer regions to be resolved. Thus, during a run of the sequencer, multiple nucleotide flows into the reaction chamber along with incorporation monitoring across a multiplicity of wells or reaction chambers may permit the instrument to resolve the sequence of many nucleic acid templates simultaneously.

Another sequencing system is the SOLiD™ sequencing system (Sequencing by Oligonucleotide Ligation and Detection) of Applied Biosystems, which uses stepwise cycled ligation for high throughput DNA sequencing. In this bead based system, beads (i.e. polymer particles) loaded with DNA templates undergo sequential ligation and cleavage reactions using 4-colour, fluorescently-labeled octameric probes. These probes are delivered serially and serve to interrogate dinucleotide positions on DNA strands. It would be desirable to support higher bead densities that facilitate an increased number of bead events per instrument run and improved probe chemistry, affording increased sequencing fidelity.

Sequencing by Oligonucleotide Ligation and Detection involves attachment of a nucleic acid target to a crosslinked polymer particles (beads) followed by immobilization of a plurality of the particles onto a surface. Each nucleic acid-bead conjugate comprises a unique DNA sequence, sequencing techniques of this type are disclosed in International Publication No. WO 2006/084132 A2 (incorporated herein by reference).

Methods of attachment of the beads to the support have utilized a flat glass microscope slide irreversibly coated with streptavidin. Nucleic acid-laden beads are contacted with biotinylated nucleotides (e.g., obtained by the action of biotinylated dNTP's and terminal deoxytransferase on the DNA target subsequent to attachment to the bead). Incubation of the biotinylated beads with the streptavidin coated slide results in immobilization of the beads onto the slide by the interaction of streptavidin with the biotin. While kinetically this is a very effective attachment scheme, movement of the beads on the slide was sometimes observed under the conditions required by the DNA sequence assay. When beads are present in high densities on the slide (e.g., up to 100,000 beads/mm$^2$) and interrogated multiple times (e.g., up to 25 times), any significant bead movement can preclude robust identification of a particular bead on subsequent scans within a dense population of beads.

US 2009/0099027 (equivalent to WO2009/026546, both incorporated herein by reference) therefore describes a covalent system for bead immobilization that reduces movement of the beads during sequencing and other forms of genetic analysis. The method comprises: reacting a nucleophilic group on the surface of a substrate with a molecule comprising a plurality of electrophilic groups thereby providing one or more free electrophilic groups on the surface of the substrate; and reacting nucleophilic groups on a surface of a particulate material with the one or more free electrophilic groups on the surface of the substrate to covalently attach the particulate material to the substrate.

US 2009/0099027 describes the modification of a nucleophilic (more particularly, amino functional) surface with a multifunctional electrophilic reagent. For example, the electrophilic surfaces of silicate glass microscope slides can be readily converted to a nucleophilic surface by reacting surface groups with (aminopropyl) trialkoxysilanes.

A DNA target nucleic acid that had been covalently attached to a crosslinked polymer bead may be modified by the action of aminoalkyl dNTP's and terminal deoxytransferase on the DNA target subsequent to attachment to the bead. The nucleophilic amino group on the DNA target can then react with the residual electrophilic group of the support surface to form multiple stable covalent bonds between the bead and the glass surface.

It has been found that stable covalent bonds can be formed between a surface containing electrophilic groups and particles containing nucleophilic groups. In addition, beads containing nucleophilic amino groups from the action of amino-dNTP's and terminal deoxytransferase on a DNA target can be immobilized under aqueous basic conditions on the modified surface. For example, surfaces comprising amino groups that have been activated with benzene 1,4-diisothiocyanate can be used to immobilize beads with nucleophilic groups. In addition, the covalent attachment appears to be quite stable, and no bead movement is observed.

The surface immobilized beads can be used in methods of analysing nucleic acid sequences based on repeated cycles of duplex extension along a single stranded template via ligation. Sequencing methods of this type are disclosed in U.S. Pat. Nos. 5,750,341; 5,969,119; and 6,306,597 B1 and in International Publication No. WO 2006/084132 A2. Each of these publications is incorporated by reference herein in its entirety. Moreover, the techniques described in the aforementioned publications can be used to analyse (e.g., sequence) nucleic acid templates attached to particles that are bound to supports as described herein. The immobilized beads can be used in sequencing methods that do not necessarily employ a ligation step, such as sequencing using labeled nucleotide that have removable blocking groups that prevent polynucleotide chain extension (e.g., U.S. Pat. Nos. 6,664,079; 6,232,465; and 7,057,026, each of which is incorporated by reference herein in its entirety). The immobilized beads can be used in a variety of techniques in which signals on the beads are repeated detected through multiple cycles.

The beads which are used in SOLiD sequencing may be monodisperse crosslinked hydrogel particles of the disclosure. An embodiment therefore includes the use of the monodisperse particles in the methods and products disclosed in the publications mentioned in the previous paragraph and the applicant of the present application considers all such uses, methods and products to fall within the present invention and reserves the right to claim them. The use of submicron particles in SOLiD sequencing enables a greater density of particles to be attached to the glass surfaces (e.g. glass panels or microscope slides). Further included in an embodiment is a method of performing SOLiD sequencing which uses monodisperse particles of the disclosure, e.g. wherein monodisperse submicron of the present disclosure are coupled to a nucleic acid target and immobilised on a surface, e.g. a glass surface. The method of immobilisation is not critical and may be covalent or non-covalent, examples of non-covalent coupling being through streptavidin/avidin-biotin binding. The covalent coupling may be as described in US 2009/0099027 and WO2009026546, for example, but any other suitable technique for covalent coupling may be used. Included in an embodiment, therefore, is a method of forming a product (an article of manufacture), comprising coupling monodisperse submicron particles of the present disclosure to a nucleic acid and optionally further comprising immobilising the resultant nucleic acid-laden particles on a surface, e.g. a glass surface. The nucleic acid may be used as a target in sequencing, e.g. using SOLID sequencing.

For example, a method is provided that comprises:
(a) hybridizing a first initializing oligonucleotide probe to a target polynucleotide to form a probe-target duplex, wherein the oligonucleotide probe has an extendable probe terminus, wherein the target polynucleotide is attached to a polymer particle which is a member of a population of polymer particles as disclosed herein and wherein the particle is covalently attached to the surface of a solid support;

(b) ligating a first end of an extension oligonucleotide probe to the extendable probe terminus thereby forming an extended duplex containing an extended oligonucleotide probe, wherein the extension oligonucleotide probe comprises a cleavage site and a detectable label;

(c) identifying one or more nucleotides in the target polynucleotide by detecting the label attached to the just-ligated extension oligonucleotide probe;

(d) cleaving the just-ligated extension oligonucleotide probe at the cleavage site to generate the extendable probe terminus, wherein cleavage removes a portion of the just-ligated extension oligonucleotide probe that comprises the label from the probe-target duplex; and (e) repeating steps (b), (c) and (d) until a sequence of nucleotides in the target polynucleotide is determined.

Also provided is a method of sequencing a nucleic acid comprising:

(a) hybridizing a primer to a target polynucleotide to form a primer-target duplex, wherein the target polynucleotide is attached at a 5' end to a polymer particle which is a member of a population of polymer particles as disclosed herein and wherein the polymer particle is covalently attached to the surface of a support;

(b) contacting the primer-target duplex with a polymerase and one or more different nucleotide analogues to incorporate a nucleotide analogue onto the 3' end of the primer thereby forming an extended primer strand, wherein the incorporated nucleotide analogue terminates the polymerase reaction and wherein each of the one or more nucleotide analogues comprises (i) a base selected from the group consisting of adenine, guanine, cytosine, thymine and uracil and their analogues (ii) a unique label attached to the base or analogue thereof via a cleavable linker; (iii) a deoxyribose; and (iv) a cleavable chemical group which caps an —OH group at a 3'-position of the deoxyribose;

(c) washing the surface of the support to remove any unincorporated nucleotide analogues;

(d) detecting the unique label attached to the just-incorporated nucleotide analogue to thereby identify the just-incorporated nucleotide analogue;

(e) optionally, permanently capping any unreacted —OH group on the extended primer strand;

(f) cleaving the cleavable linker between the just incorporated nucleotide analogue and the unique label;

(g) cleaving the chemical group capping the —OH group at the 3'-position of the deoxyribose of the just incorporated nucleotide analogue to uncap the —OH group;

(h) washing the surface of the support to remove cleaved compounds;

(i) repeating steps (b)-(h).

The polymer particles of the disclosure may be used in any method of nucleic acid sequencing which involves a polymer particle. An embodiment includes particles of the disclosure coupled to a nucleic acid as well as a method of sequencing a nucleic acid which comprises coupling a nucleic acid to a population of particles of the disclosure. The nucleic acid may be DNA or RNA.

The present disclosure includes a product (e.g. an article of manufacture) comprising a plurality of monodisperse particles of the disclosure coupled to a substrate such as, for example, glass surface, for example through a streptavidin-biotin linkage, an avidin-biotin linkage or through a covalent linkage, e.g. as described in US 2009/0099027 and WO2009/026546. The particles may be coupled to the substrate through a nucleic acid. The present disclosure includes the use of the monodisperse submicron particles of the disclosure to make such a product. An embodiment includes the use of the attachment chemistry described in US 2009/0099027 and WO2009/026546 to attach monodisperse submicron particles of the disclosure to a substrate, and the applicant reserves the right to claim methods of using such chemistry and the products thereof. The present specification therefore includes by reference the disclosures of US 2009/0099027 and WO2009026546.

Embodiments therefore include methods in which functionalised monodisperse polymer particles of the disclosure are subjected to one or more further reactions to obtain a desired product. Other embodiments include the use of these products in applications.

In view of the consistency of the quality and characteristics which the particles of the disclosure may possess, they may be used in methods which comprise performing processes in relation to a conjugated substance, e.g. selected from labels, biological molecules and biological structures, for example biological molecules such as amino acids, saccharides, nucleotides and nucleosides and multimers made by condensing together two or more such monomers, e.g. polypeptides, proteins, polysaccharides, oligonucleotides and nucleic acids. As labels may be mentioned dyes, e.g. fluorescent dyes, quenchers, enzymes, and semiconductor nanocrystals. Embodiments of the invention include such uses as well as:

i) conjugates comprising a population of particles of the disclosure at least a portion of which are coupled to a conjugated substance, e.g. one as just described ii) a method comprising coupling at least a portion of a population of particles of the disclosure to a substance, e.g. one as just described iii) a method comprising coupling at least a portion of a population of particles of the disclosure to a substrate.

Analytical Methods

Molecular Weight Measurement

The weight average molecular weight (Mw) of the oligomers in the seed particle can be determined from measurements made using gel permeation chromatography (GPC). In GPC a series of polymer particle standards are run and used to generate a calibration curve. The Mw of the oligomers may be measured by GPC relative to polystyrene standards using as eluent DMF with 0.01 M LiBr. As these Mw values are calculated relative to standards of a polymer (polystyrene) that is different to that of the seed particles, the calculated Mw represents a relative value, rather than an absolute value. The measurements will therefore be reproducible, but will not provide the actual Mw.

An outline of the GPC method that was used in the examples provided herein is as follows. The following experimental conditions were used:

| | |
|---|---|
| Eluent: | DMF with 0.01M LiBr |
| Precolumn: | PSS GRAM, 10 µm, Guard ID 8.0 mm × 50 mm |
| Columns: | PSS GRAM, 10 µm, Linear M ID 8.0 mm × 300 mm |
| | PSS GRAM, 10 µm, Linear M ID 8.0 mm × 300 mm |
| Temperature: | 70° C. |
| Pump: | PSS SECcurity 1260 HPLC pump |
| Flow rate: | 1.0 mL/min |
| Inject. system: | PSS SECcurity 1260 autosampler |
| Inject. volume: | 50 µL |
| Sample conc.: | 3.0 g/L |
| Detector: | PSS SECcurity 1260 refractive index detector (RID) |
| Chromatography data system: | PSS WinGPC UniChrom Version 8.2 |

Polystyrene standards with different molecular weights were measured under the above experimental conditions to obtain a calibration curve. The samples were then run. Mw was then calculated for the samples based on the PS calibration curve.

Size and Size Distribution

The size distribution of samples can be measured using disc centrifugation, e.g. CPS Disc Centrifugation™ on Disc Centrifuge Model DC20000, using protocols provided by the instrument manufacturer. Accurate results require calibration with a standard of similar density to the sample being analysed and thus is only of use where a suitable polymeric standard is available, for example a set of compact polystyrene particle standards for particles of the disclosure comprising predominantly polystyrene. Where the samples being measured have a density that is not known, e.g. for porous particles, the measurement obtained by CPS disc centrifugation will be reproducible but will not provide the actual diameter.

An outline of the CPS Disc Centrifugation™ that was used in the examples provided herein is as follows, with three different experimental methods used, with selection of the appropriate method based on, e.g. the size and porosity of the particles to be analysed. The skilled person would be able to readily adapt these methods as appropriate, for example by selecting a suitable gradient, disc speed and standard particles, based on the size and porosity of the particles to be analysed.

CPS Method 1 (e.g. Examples 32, 33)

Disc centrifuge analysis was performed on a CPS DC20000 from CPS instruments with a disc speed of 7500 rpm and a gradient of 3-7 wt % sucrose in 1.5 g/L SDS (aq.). The gradient was made using an Auto Gradient pump from CPS instruments and the volume of the injected gradient was 16-17 mL. The samples were diluted to approximately 0.01 wt % in MilliQ-H$_2$O prior to injection. The method used for analysis had the following settings: Max. diameter 4.0 µm, min. diameter 0.2 µm, particles density 1.032 g/mL, particle refractive index 1.4, particle absorption 0, particle non-sphericity 1, calibration standard diameter 1.069 µm, calibration standard density 1.052, standard half—with 0.15 µm, liquid density 1.016 g/mL, liquid refractive index 1.343. The size reported is the absorption peak diameter and the CV is determined by setting the boarders around the main peak.

CPS Method 2 (e.g. Examples 8, 9, 16-30)

Disc centrifuge analysis was performed on a CPS DC20000 from CPS instruments with a disc speed of 7500 rpm and a gradient of 3-7 wt % sucrose in 1.5 g/L SDS (aq.). The gradient was made using an Auto Gradient pump from CPS instruments and the volume of the injected gradient was 16-17 mL. The method used for analysis had the following settings: Max. diameter 6.0 µm, min. diameter 0.05 µm, particles density 1.032 g/mL, particle refractive index 1.032, particle absorption 0, particle non-sphericity 1, calibration standard diameter 0.486 µm, calibration standard density 1.052, standard half—with 0.15 µm, liquid density 1.016 g/mL, liquid refractive index 1.343.

The size reported is the absorption peak diameter and the CV is determined by setting the borders around the main peak.

CPS Method 3 (e.g. Examples 34-47)

Disc centrifuge analysis was performed on a CPS DC20000 from CPS instruments with a disc speed of 10000 rpm and a gradient of 8-24 wt % sucrose in 1.5 g/L SDS (aq.). The gradient was made using an Auto Gradient pump from CPS instruments and the volume of the injected gradient was 16-17 mL. The samples were diluted to approximately 0.01 wt % in MilliQ-H2O prior to injection. The method used for analysis had the following settings: Max. diameter 4.0 µm, min. diameter 0.1 µm, particles density 1.6 g/mL, particle refractive index 1.592, particle absorption 0.2, particle non-sphericity 1, calibration standard diameter 1.098, calibration standard density 1.6, standard half—with 0.2 µm, liquid density 1.06 g/mL, liquid refractive index 1.355.

The size reported is the absorption peak diameter and the CV is determined by setting the boarders around the main peak.

Photon correlation spectroscopy (PCS) can be used to obtain the hydrodynamic diameter of a particle in the form of the z-average. The measurement is independent of the particle density and based on Brownian motion of small particles. PCS measurements for nanosized particles can be obtained, for example with a Malvern ZetaSizer Nano-ZS, Model ZEN3600. Further details and methods can be found in the Malvern Zetasizer Nano series manual (incorporated herein by reference in its entirety).

Another technique that can be used to determine the size and size distribution of particles is optical microscopy. A population of beads may be prepared by placing an aqueous solution comprising beads on a microscope slide, then capturing an image of the beads at a suitable level of magnification, e.g. 100× or greater, and analyzing the size of the beads using image analysis software.

An outline of the optical microscopy method that was used in the examples provided herein is as follows. Microscopy samples were prepared by sandwiching a 0.12 mm, 9 mm diameter Secure-Seal™ spacer between a cover slip and a Secure-Seal™ Hybridization Chamber Gasket. The formed cavity was filled with 8 µL of beads diluted in 150 mM NaCl followed by a short centrifugation and attachment to a microscope slide. Phase contrast optical microscopy was then performed on an Olympus IX81 inverted microscope using 100× lens. Multiple images were collected automatically using a Matlab based macro for Manager. An out of focus image was collected as the background and subtracted from the phase contrast image. The background subtracted image was then thresholded using Otsu's method to identify individual beads for size analysis. Green fluorescent polystyrene bead with standard sizes were used to calibrate the measured bead size by fluorescence microscopy. Then a series of Alexa 488 labeled hydrogel beads were used to calibrate phase contrast size to fluorescent size.

Optical microscopy is a preferred method for measuring the size of the particles, as it provides a measurement that is independent of the density of the particles. Disc centrifuge analysis is a preferred method of measuring the size distribution of particles (CV), as optical microscopy is based on image analysis and the presence of artefacts in the image can result in an artificially high CV.

EXAMPLES

Synthesis of Seed Particles

Example 1

A 250 mL 3-necked round-bottom flask equipped with a mechanical blade stirrer and a condenser was charged with 5.0 g of distilled N,N-dimethylacrylamide, 4.0 g of Kraton G1650, 0.20 g of 2,2'-Azobis(2-methylpropionitrile), 108.0 g of heptane, 27.1 g of toluene, and 0.21 mL of 1-octanethiol. Once everything had dissolved the reaction mixture was purged with Ar (g) for 10 min. The reaction was then heated to 70° C. using an oil bath and heated for 8 h while stirring at 400 rpm. The resulting dispersion was analyzed by dynamic light scattering yielding a z-average diameter of 521 nm.

Example 2

A 500 mL 3-necked round-bottom flask equipped with a mechanical and a blade stirrer and a condensor was charged with 10.1 g of distilled N,N-dimethylacrylamide, 8.0 g of Kraton G1650, 0.40 g of 2,2'-Azobis(2-methylpropionitrile), 216.0 g of heptane, 54.1 g of toluene, and 0.85 mL of 1-octanethiol. Once everything had dissolved the reaction mixture was purged with Ar (g) for 10 min. The reaction was then heated to 70° C. using an oil bath and heated for 8 h while stirring at 360 rpm. The resulting dispersion was analyzed by dynamic light scattering yielding a z-average diameter of 733 nm. The particles present in the dispersion were also analysed by GPC yielding an Mw of 8,410.

Example 3

A 2 L jacketed round-bottom flask equipped with a mechanical anchor stirrer and a condensor was charged with 36.6 g of distilled N,N-dimethylacrylamide, 27.7 g of Kraton G1650, 1.4 g of 2,2'-Azobis(2-methylpropionitrile), 747.2 g of heptane, 186.9 g of toluene, and 2.56 g of 1-octanethiol. Once everything had dissolved the reaction mixture was purged with Ar (g) for 30 min. The reaction was then heated to 71° C. using a temperature controlled water bath connected to the reactor and heated for 15 h while stirring at 350 rpm. During the first 2.5 h of heating a low flow of Ar (g) was maintained. The resulting dispersion was analyzed by dynamic light scattering yielding a z-average diameter of 1035 nm. The particles present in the dispersion were also analysed by GPC yielding an Mw of 10,300.

Example 4

The method was performed as per Example 1, but with the reaction mixture heated and stirred at 350 rpm overnight. The resulting dispersion was analyzed by dynamic light scattering yielding a z-average diameter of 387 nm. The particles present in the dispersion were also analysed by GPC yielding an Mw of 22,400.

Example 5 (Comparative Example)

The method was performed as per Example 4, but without the addition of 1-octantethiol, i.e. the reaction mixture did not contain any 1-octantethiol. The resulting dispersion was analyzed by dynamic light scattering yielding a z-average diameter of 238 nm. The particles present in the dispersion were also analysed by GPC yielding an Mw of 403,000.

Example 6

The method was performed as per Example 4. The resulting dispersion was analyzed by dynamic light scattering yielding a z-average diameter of 358 nm. The particles present in the dispersion were also analysed by GPC yielding an Mw of 21,200.

Synthesis of Polymer Particles from Low Molecular Weight Seed Particles

Example 7

100 mL batch of micron-sized acrylamide particles formed in Heptane/Toluene using 0.8 wt % initiator.

Solution 1 (10 wt % Acrylamide (AAm) stock solution): 50 g acrylamide monomer and 450 g water are mixed until a clear and homogeneous solution is formed.

Solution 2 (stabilizer): 10 g of Hypermer 2296 (stabilizer) is weighed out followed by the addition of 70 g of a 1:1 (vol:vol) heptane:toluene (hereafter referred to as the solvent or H/T) mixture. The stabilizer solution is stirred until a homogeneous solution is obtained. 0.8 g of Azobisdimethyl valeronitril (radical initiator from Wako Chemicals, hereafter called V-65) is added to the solution under gentle stirring.

Solution 3 (monomer phase): 0.5 g of 1,2-dihydroxy bis acrylamide (crosslinker, hereafter called DHEBA) is added to 20 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, Solution 4 is transferred to a 100 mL reactor with stirrer, and 8.1 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Example 8

10 mL batch of micron-sized acrylamide particles formed in Heptane/Toluene using 0.5 wt % initiator.

Solution 1 (10 wt % Acrylamide (AAm) stock solution): 50 g acrylamide monomer and 450 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained. 0.05 g of Azobisdimethyl valeronitril (radical initiator from Wako Chemicals, hereafter called V-65) is added to the solution under gentle stirring.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Redispersion and analysis: To a 2 mL eppendorf tube 300 μL of polymerized emulsion, 300 μL of a heptane/toluene mixture (50:50), and 1200 μL of a methanol/deionized water mixture (50:50) were added. The tube was vortexed and centrifuged. The supernatant was removed and the pellet was washed three times with 300 μL heptane/toluene mixture (50:50) and 1200 μL of a methanol/deionized water mixture (50:50). Subsequently one wash in a methanol/deionized water mixture (50:50) and two washes in deionized water were performed before finally resuspending the pellet in 200 μL of deionized water. The product was analyzed using optical microscopy and disc centrifuge. Microscopy was performed by diluting the redispersed product 20 times in 150 mM NaCl solution and image statistics was collected from 28 images yielding a mode diameter of 2.3 μm. Relative disc centrifuge diameter using CPS method 2 was determined to 2.8 μm with a CV=3.0% (main peak).

Example 9

10 mL batch of micron-sized acrylamide particles formed in Heptane/Toluene using alternative stabilizer.

Solution 1 (10 wt % Acrylamide (AAm) stock solution): 50 g acrylamide monomer and 450 g water are mixed until a clear and homogeneous solution is formed.

Solution 2 (stabilizer): 1 g of Abil EM 90 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained. 0.08 g of Azobisdimethyl valeronitril (radical initiator from Wako Chemicals, hereafter called V-65) is added to the solution under gentle stirring.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Redispersion and analysis: To a 2 mL eppendorf tube 300 μL of polymerized emulsion was added, the tube filled with toluene to the 2 mL mark and centrifuged. After removal of the supernatant the pellet was redispersed in toluene and centrifuged. Additionally two washes using toluene was performed followed by two washes using deionized water. Finally the pellet was redispersed in deionized water to a total volume of 2 mL and the product was analyzed using optical microscopy and disc centrifuge. Microscopy image statistics was collected from 10 images yielding a mode diameter of 2.6 μm. Relative disc centrifuge diameter using CPS method 2 was determined to 3.3 μm with a CV=3.9%.

Example 10

10 mL batch of micron-sized acrylamide particles formed in nonpolar solvent using with swelling at elevated temperature.

Solution 1 (10 wt % Acrylamide (AAm) stock solution): 50 g acrylamide monomer and 450 g water are mixed until a clear and homogeneous solution is formed.

Solution 2 (stabilizer): 1 g of Hypermer 2296 (stabilizer) is weighed out followed by the addition of 7 g of a 1:1(vol:vol) heptane:toluene (hereafter referred to as the solvent or H/T) mixture. The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at 50° C. under gentle stirring/rotation). Following swelling, 0.08 g of Azobisdimethyl valeronitril (radical initiator from Wako Chemicals, hereafter called V-65) is added to the solution under gentle stirring. Solution 4 is polymerized at 50° C. for 7 h under stirring.

Example 11

10 mL batch of micron-sized acrylamide particles formed in Heptane/Toluene using higher acrylamide content.

Solution 1 (40 wt % Acrylamide (AAm) stock solution): 200 g acrylamide monomer and 300 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at 50° C. under gentle stirring/rotation). Following swelling, 0.08 g of Azobisdimethyl valeronitril (radical initiator from Wako Chemicals, hereafter called V-65) is added to the solution under gentle stirring. Solution 4 is polymerized at 50° C. for 7 h under stirring.

Example 12

10 mL batch of micron-sized acrylamide particles formed in Linpar 10-13.

Solution 1 (10 wt % Acrylamide (AAm) stock solution): 50 g acrylamide monomer and 450 g water are mixed until a clear and homogeneous solution is formed.

Solution 2 (stabilizer): 1 g of Hypermer 2296 (stabilizer) is weighed out followed by the addition of 7 g Linpar 10-13 (hereafter referred to as the solvent). The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a PDMAAm particle suspension (approximately 7 wt % dry content—hereafter referred to as seed) is added to the emulsion, and the seed-containing emulsion is allowed to swell overnight (~16 h) at 50° C. under gentle stirring/rotation). Following swelling, 0.08 g of Azobisdimethyl valeronitril (radical initiator from Wako Chemicals, hereafter called V-65) is added to the solution under gentle stirring. Solution 4 is polymerized at 50° C. for 7 h under stirring.

Example 13

10 mL batch of micron-sized hydroxymethyl acrylamide particles formed in Heptane/Toluene.

Solution 1 (10 wt % N-hydroxymethylacrylamide (HMAAm) stock solution): 50 g hydroxymethyl acrylamide monomer and 450 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % HMAAm stock solution). The solution is then heated to ~40° C. to facilitate mixing. 0.08 g of Azobisdimethyl valeronitril (radical initiator from Wako Chemicals, hereafter called V-65) is added to the solution under gentle stirring.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Example 14

10 mL batch of micron-sized TRIS acrylamide particles formed in Heptane/Toluene.

Solution 1 (10 wt % TRIS acrylamide (TRIS) stock solution): 50 g TRIS acrylamide monomer and 450 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained. 0.08 g of Azobisdimethyl valeronitril (radical initiator from Wako Chemicals, hereafter called V-65) is added to the solution under gentle stirring.

Solution 3 (monomer phase): 0.05 g of 1,2-dihydroxy bis acrylamide (crosslinker, hereafter called DHEBA) is added to 2 g of solution 1 (10 wt % TRIS stock solution). The solution is then heated to ~40° C. to facilitate mixing.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Example 15

10 mL batch of micron-sized Hydroxyethyl methacrylate particles formed in Heptane/Toluene.

Solution 1 (10 wt % Hydroxyethyl methacrylate (HEMA) stock solution): 50 g hydroxyethyl methacrylate monomer and 450 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % HEMA stock solution). The solution is then heated to ~40° C. to facilitate mixing. 0.01 g of Azobisdimethyl valeronitril (radical initiator from Wako Chemicals, hereafter called V-65) is added to the solution under gentle stirring.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, 0.81 g of a suspension of seed particles of Example 2 (approximately 7 wt % dry content—hereafter referred to as seed) is added to the emulsion, and the seed-containing emulsion is allowed to swell overnight (~16 h) at room temperature under gentle stirring/rotation). Following swelling, Solution 4 is polymerized at 50° C. for 7 h under stirring.

Example 16 (Comparative Example)

10 mL batch of acrylamide product formed in Heptane/Toluene in the absence of seed particles.

Solution 1 (10 wt % acrylamide (AAm) stock solution): 50 g acrylamide monomer and 450 g water are mixed until a clear and homogeneous solution is formed.

Solution 2 (stabilizer): 1 g of Hypermer 2296 (stabilizer) is weighed out followed by the addition of 7 g of a 1:1 (vol:vol) heptane:toluene (hereafter referred to as the solvent or H/T) mixture. The stabilizer solution is stirred until a homogeneous solution is obtained.

Solution 3 (monomer phase): 0.05 g of 1,2-dihydroxy bis acrylamide (crosslinker, hereafter called DHEBA) is added to 2 g of solution 1 (10 wt % AAm stock solution). The solution is then heated to ~40° C. to facilitate mixing. 0.08 g of Azobisdimethyl valeronitril (radical initiator from Wako Chemicals, hereafter called V-65) is added to the solution under gentle stirring.

Solution 4 (emulsion phase): Solutions 2 and 3 are mixed using Ultraturrax for 1 minute, and then sonicated for 3 minutes (6×30 sec intervals) on ice (Branson digital sonifier 450 CE, 40% amplitude). Following emulsification, the emulsion is allowed to swell overnight (~16 h) at room temperature under gentle stirring/rotation). Following swelling, Solution 4 is polymerized at 50° C. for 7 h under stirring.

Redispersion and analysis: To a 2 mL eppendorf tube 300 µL of polymerized emulsion, 300 µL of toluene, and 1200 µL of deionized water were added. The tube was vortexed and centrifuged. The supernatant was removed and the pellet was washed twice with 300 µL toluene and deionized water (add to 2 mL line). Subsequently two washes in deionized water were performed before finally resuspending the pellet in 200 μL of deionized water. The product was analyzed using optical microscopy and disc centrifuge. Microscopy was performed by diluting the redispersed product 10 times in 150 mM NaCl solution and image statistics was collected from 25 images. The broad distribution made it difficult to determine a realistic value for size using microscopy. Relative disc centrifuge diameter using CPS method 2 was determined to 1.4 μm with a CV=30%.

Example 17

Solution 1 (monomer phase): A 100 mL Duran flask equipped with a stir bar was charged with 0.9 g of N,N'-(1,2-dihydroxyethylene)bisacrylamide (DHEBA) and 39 g of H2O. The mixture was heated to ~40° C. while stirring until all DHEBA was dissolved, followed by the addition of 4.4 g of acrylamide (AAm).

Solution 2 (stabilizer): 0.8 g of 2,2'-azobis(2-methylpropionitrile) (AIBN), 9 g of Span 80, 33 g of toluene, and 33 g of heptane were added to a 250 mL Duran flask and shaken until all had dissolved.

Solution 3 (emulsion): 20 g of Solution 1 was added to solution 2 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 5 g of seed particles of Example 4) were charged into a 3-necked round bottom flask equipped with a condenser, a mechanical stirrer, and a gas inlet and stirred overnight at 100 rpm and 22° C. Finally the flask was purged with Ar (g) for 10 min before heating to 70° C. while stirring at 50 rpm for 7 h.

Redispersion and analysis: To a 2 mL eppendorf tube 300 μL of polymerized emulsion was added and the tube was filled with 1-methyl-2-pyrrolidone (NMP). The tube was vortexed and centrifuged. The supernatant was removed and the pellet was washed two times with NMP and two times with deionized water before finally resuspending the pellet in 150 μL of deionized water. The product was analyzed using optical microscopy and disc centrifuge. Microscopy was performed by diluting the redispersed sample 100 times in 150 mM NaCl (aq) resulting in mode diameter of 1.3 μm. Characterization by disc centrifuge using CPS method 2 gave a diameter of 1.5 μm with a CV=6.5% (main peak).

Example 18

Solution 1 (monomer phase): As in Example 17.
Solution 2 (stabilizer): 0.8 g of 2,2'-azodi(2-methylbutyronitrile) (AMBN), 9 g of Hypermer 2296, 64 g of dodecane were added to a 250 mL Duran flask and shaken until all had dissolved.
Solution 3 (emulsion): As in Example 17 but polymerizing for 24 h.

Redispersion and analysis: To a 2 mL eppendorf tube 300 μL of polymerized emulsion, 300 μL of a heptane/toluene mixture (50:50), and 1200 μL of a methanol/deionized water mixture (50:50) were added. The tube was vortexed and centrifuged. The supernatant was removed and the pellet was washed three times with 300 μL heptane/toluene mixture (50:50) and 1200 μL of a methanol/deionized water mixture (50:50). Subsequently one wash in a methanol/deionized water mixture (50:50) and two washes in deionized water were performed before finally resuspending the pellet in 100 μL of deionized water. The product was analyzed using optical microscopy and disc centrifuge. Microscopy was performed by diluting the redispersed sample 100 times in 150 mM NaCl (aq) for microscopy resulting in a mode diameter of 1.0 μm. Characterization by disc centrifuge using CPS method 2 gave a diameter of 1.4 μm with a CV=5.2% (main peak).

Example 19

Solution 1 (monomer phase): As in Example 17.
Solution 2 (stabilizer): 0.8 g of 2,2'-azodi(2-methylbutyronitrile) (AMBN), 9 g of Abil WE09, 13 g of mineral oil, and 52 g of diethylhexyl carbonate (Tegosoft DEC) were added to a 250 mL Duran flask and shaken until all had dissolved.
Solution 3 (emulsion): As in Example 17.
Redispersion and analysis: As in Example 18 but final redispersion in 50 μL and diluted 30 times in 150 mM NaCl (aq) for microscopy resulting in a mode diameter of 1.0 μm. Characterization by disc centrifuge using CPS method 2 gave a diameter of 1.7 μm with a CV=6.4% (main peak).

Example 20

Solution 1 (monomer phase): As in Example 17 but changing AAm to hydroxyethyl acrylamide (HEAAm).
Solution 2 (stabilizer): As in Example 19.
Solution 3 (emulsion): As in Example 17.
Redispersion and analysis: As in Example 18 but final redispersion in 50 μL and diluted 30 times in 150 mM NaCl (aq) for microscopy resulting in a mode diameter of 1.0 μm. Characterization by disc centrifuge using CPS method 2 gave a diameter of 1.7 μm with a CV=6.4% (main peak).

Example 21

Solution 1 (monomer phase): A 100 mL Duran flask equipped with a stir bar was charged with 0.95 g of N,N'-(1,2-dihydroxyethylene)bisacrylamide (DHEBA) and 18 g of H2O. The mixture was heated to ~40° C. while stirring until all DHEBA was dissolved followed by the addition of 4.8 g of acrylamide (AAm).
Solution 2 (stabilizer): As in Example 19.
Solution 3 (emulsion): As in Example 17.
Redispersion and analysis: As in Example 18 but final redispersion in 50 μL and diluted 30 times in 150 mM NaCl (aq) for microscopy resulting in a mode diameter of 1.3 μm. Characterization by disc centrifuge using CPS method 2 gave a diameter of 2.5 μm with a CV=5.6% (main peak).

Example 22

Solution 1 (monomer phase): As in Example 17.
Solution 2 (stabilizer): As in Example 19.
Solution 3 (emulsion): As in Example 17 but using 21 g of Solution 1 and 4 g of the seed particles of Example 6.
Redispersion and analysis: As in Example 17. Microscopy was performed by diluting the redispersed product 200 times in 150 mM NaCl (aq) resulting in a mode diameter of 1.2 μm. Characterization by disc centrifuge using CPS method 2 gave a diameter of 2.0 μm with a CV=5.7% (main peak).

Example 23

Solution 1 (monomer phase): As in Example 17 but changing AAm to 2.5 g AAm and 0.03 g of 3-acrylamidopropionic acid (AAmPA).
Solution 2 (stabilizer): As in Example 19.
Solution 3 (emulsion): As in Example 22.

Redispersion and analysis: As in Example 17, but with final redispersion in 150 μL and diluted 200 times in 150 mM NaCl (aq) for microscopy resulting in a mode diameter of 1.3 μm. Characterization by disc centrifuge using CPS method 2 gave a diameter of 1.7 μm with a CV=8.0% (main peak).

Reaction of carboxylic acid groups: 50 μL of redispersed beads were added to a 2 mL eppendorf tube, washed twice with NMP and then redispersed in 100 μL of NMP. As a first step, 40 μL of 100 mM N,N,N',N'-tetramethyl-O—(N-succinimidyl)uronium tetrafluoroborate solution in NMP was added and the tube placed on a thermomixer for 1 h at 1000 rpm. In a second step, 20 μL of Alexafluor 488 cadaverine (1 mg in 250 μL of NMP) was added and the tube was placed on a thermomixer for 1 h at 1000 rpm. The beads were washed three times with NMP and three times with H2O. The beads were then redispersed in 1000 mL of 150 mM NaCl (aq) and finally diluted additionally ten times in 150 mM NaCl (aq). Imaging was done using both phase contrast and fluorescence microscopy confirming the presence of reactive groups. As a control experiment beads from Example 22 were treated with the above dying protocol yielding beads that were not visible in fluorescence microscopy.

Example 24

Solution 1 (monomer phase): As in Example 17 but with the AAm replaced with N-(2-hydroxyethyl) methacrylamide (HEMAAm).
Solution 2 (stabilizer): As in Example 19.
Solution 3 (emulsion): As in Example 22.
Redispersion and analysis: As in Example 17 but final redispersion in 150 μL and diluted 200 times in 150 mM NaCl (aq) for microscopy resulting in a mode diameter of 1.2 μm. Characterization by disc centrifuge using CPS method 2 gave a diameter of 1.7 μm with a CV=5.8% (main peak).

Example 25

Solution 1 (monomer phase): As in Example 17 but changing H$_2$O to 10% methanol in H$_2$O.
Solution 2 (stabilizer): As in Example 19.
Solution 3 (emulsion): As in Example 22.
Redispersion and analysis: As in Example 17 but final redispersion in 150 μL and diluted 200 times in 150 mM NaCl (aq) for microscopy resulting in a mode diameter of 1.3 μm. Characterization by disc centrifuge using CPS method 2 gave a diameter of 1.9 μm with a CV=6.7% (main peak).

Example 26

Solution 1 (monomer phase): As in Example 17 but changing AAm to methacrylamide (MAAm).
Solution 2 (stabilizer): As in Example 19.
Solution 3 (emulsion): As in Example 22.
Redispersion and analysis: As in Example 17 but final redispersion in 100 μL and diluted 400 times in 150 mM NaCl (aq) for microscopy resulting in a mode diameter of 1.3 μm. Characterization by disc centrifuge using CPS method 2 gave a diameter of 1.8 μm with a CV=9.3% (main peak).

Example 27

Solution 1 (monomer phase): As in Example 17.
Solution 2 (stabilizer): As in Example 19.
Solution 3 (emulsion): As in Example 22 but stirring for 1 h at 20° C. instead of overnight.
Redispersion and analysis: As in Example 17 but final redispersion in 100 μL and diluted 400 times in 150 mM NaCl (aq) for microscopy resulting in a mode diameter of 1.1 μm. Characterization by disc centrifuge using CPS method 2 gave a diameter of 1.7 μm with a CV=6.1% (main peak).

Example 28 (Comparative Example)

Solution 1 (monomer phase): As in Example 17.
Solution 2 (stabilizer): As in Example 19.
Solution 3 (emulsion): As in Example 17 but using 24 g of Solution 1 and 1 of seed particles of Example 5.
Redispersion and analysis: As in Example 17 but final redispersion in 200 μL and diluted 100 times in 150 mM NaCl (aq) for microscopy resulting in a mode diameter of 1.6 μm. Characterization by disc centrifuge using CPS method 2 gave a diameter of 3.1 μm with a CV=28% (main peak).

Example 29 (Comparative Example)

Solution 1 (monomer phase): As in Example 17.
Solution 2 (stabilizer): As in Example 19.
Solution 3 (emulsion): As in Example 17 but using seed particles of Example 5 (not seed particles from Example 4).
Redispersion and analysis: As in Example 17 but final redispersion in 200 μL and diluted 100 times in 150 mM NaCl (aq) for microscopy resulting in a mode diameter of 1.6 μm. Characterization by disc centrifuge using CPS method 2 gave a diameter of 3.1 μm with a CV=28% (main peak).

Example 30

Solution 1 (monomer phase): As in Example 17 but exchanging AAm for hydroxyethyl acrylate (HEA).
Solution 2 (stabilizer): As in Example 19.
Solution 3 (emulsion): As in Example 22.
Redispersion and analysis: As in Example 17 but final redispersion in 100 μL and diluted 10 times in 150 mM NaCl (aq) for microscopy resulting in a mode diameter of 1.2 μm. Characterization by disc centrifuge using CPS method 2 gave a diameter of 1.6 μm with a CV=6.1% (main peak).

Synthesis of Seed Particles

Example 31

A 2 L jacketed round-bottom flask equipped with a mechanical anchor stirrer and a condensor was charged with 34.6 g of distilled N,N-dimethylacrylamide, 27.6 g of Kraton G1650, 1.5 g of 2,2'-Azobis(2-methylpropionitrile), 747.9 g of heptane, 187.0 g of toluene, and 1.2 g of 1-octanethiol. Once everything had dissolved the reaction mixture was purged with Ar (g) for 60 min. The reaction was then heated to 71° C. using a temperature controlled water bath connected to the reactor and heated for 16 h while stirring at 400 rpm. The resulting dispersion was analyzed by dynamic light scattering yielding a z-average diameter of 360 nm.

Highly Swellable Particles

Example 32

Solution 1 (Monomer Phase):

A 250 mL Duran flask was charged with 1.7 g of hydroxyethyl acrylamide (HEAAm), 0.02 g of acrylamidopropionic acid (AAPA), 0.26 g of N,N'-(1,2-dihydroxyethylene)bisacrylamide (DHEBA), and 22.9 g of $H_2O$. The mixture was shaken until all had dissolved.

Solution 2 (Stabilizer):

1.76 g of 2,2'-azodi(2-methylbutyronitrile) (AMBN), 24 g of Abil WE09, 26 g of mineral oil, and 104 g of diethylhexyl carbonate (Tegosoft DEC) were added to a 250 mL beaker and mixed with a magnetic stir bar until all had dissolved.

Solution 3 (Emulsion):

71 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 4.17 g of PDMAAm seed (Example 31) were charged into a 1 L jacketed round bottom flask equipped with a condenser, a mechanical stirrer, and a gas inlet and stirred overnight at 100 rpm at 20° C. Finally the flask was purged with Ar (g) for 30 min before heating to 70° C. while stirring at 50 rpm for 7 h.

Redispersion and Analysis:

50 g of the crude product and 150 g N-methyl-2-pyrrolidone (NMP) were added to a 250 mL centrifugation flask. The flask was shaken for 90 min followed by centrifugation for 15 min at 10000 rpm. The supernatant was removed and the product was washed additionally once with NMP and 3 times with $H_2O$ before final redispersion in $H_2O$. The product was analyzed using optical microscopy and disc centrifuge. Microscopy was performed by diluting the redispersed product to a concentration of 0.04 wt % in 150 mM NaCl solution and image statistics was collected from 4 images yielding a mode diameter of 1.3 µm. Relative disc centrifuge diameter using CPS method 1 was determined to 1.6 µm with a CV=8.0%.

Transfer to NMP:

20 g of particle suspension in $H_2O$ was divided in to 2×50 mL centrifugation tubes, the tubes filled with NMP and centrifuged for 10 min at 10000 rpm. The supernatants were removed followed by additional 3 washes in NMP before final resuspension in NMP.

Example 33

Solution 1 (Monomer Phase):
As in Example 32.
Solution 2 (Stabilizer):
As in Example 32.
Solution 3 (emulsion): As in Example 32.
Redispersion and Analysis:

50 g of the crude product and 150 g N-methyl-2-pyrrolidone (NMP) were added to a 250 mL centrifugation flask. The flask was shaken for 90 min followed by centrifugation for 15 min at 10000 rpm. The supernatant was removed and the product was washed additionally once with NMP and 3 times with $H_2O$ before final redispersion in $H_2O$. The product was analyzed using optical microscopy and disc centrifuge. Microscopy was performed by diluting the redispersed product to a concentration of 0.05 wt % in 150 mM NaCl solution and image statistics was collected from 25 images yielding a mode diameter of 1.6 µm. Relative disc centrifuge diameter using CPS method 1 was determined to 1.7 µm with a CV=6.6%.

Transfer to NMP:
As in Example 32.

Less Swellable Particles

Example 34

Solution 1 (Monomer Phase):

A 500 mL Duran flask was charged with 28.6 g of hydroxymethyl acrylamide (HMAAm), 0.95 g of acrylamidopropionic acid (AAPA), 19.7 g of N,N'-((ethane-1,2-diylbis(oxy))bis(ethane-2,1-diyl))diacrylamide (EG-BEAAm), and 29.4 g of $H_2O$. The mixture was shaken until all had dissolved.

Solution 2 (Stabilizer):

3.8 g of 2,2'-azodi(2-methylbutyronitrile) (AMBN), 48 g of Abil WE09, 53 g of mineral oil, and 210 g of diethylhexyl carbonate (Tegosoft DEC) were added to a 600 mL beaker and mixed with a magnetic stir bar until all had dissolved.

Solution 3 (Emulsion):

262 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 40 g of PDMAAm seed (Example 31) were charged into a 1 L jacketed round bottom flask equipped with a condenser, a mechanical stirrer, and a gas inlet and stirred overnight at 100 rpm at 22° C. Finally the flask was purged with Ar (g) for 30 min before heating to 70° C. while stirring at 64 rpm for 7 h.

Redispersion and Analysis:

The crude product was divided into 2×250 mL centrifugation flasks and centrifuged for 15 min at 5000 rpm and 10 min at 7000 rpm. The supernatants were removed and the particles were redispersed in isopropanol. The redispersed particles were then split into a total of 6×250 mL centrifuge bottles, washed 4 times with isopropanol and 6 times with $H_2O$ and before final redispersion in $H_2O$. The particles were then filtered through three different filtration mesh fabrics: Sefar Nitex 03-64/32, Sefar Nitex 03-30/18, and Sefar Nitex 03-1/1. The product was analyzed using optical microscopy and disc centrifuge. Bright field microscopy was performed by diluting the redispersed product to a concentration of 0.01 wt % in 150 mM NaCl solution and image statistics was collected from 18 images yielding a mode diameter of 0.91 µm. Relative disc centrifuge diameter using CPS method 3 was determined to 0.54 µm with a CV=6.2%.

Example 35

Solution 1 (Monomer Phase):

A 500 mL Duran flask was charged with 27.0 g of hydroxymethyl acrylamide (HMAAm), 2.6 g of acrylamidopropionic acid (AAPA), 19.7 g of N,N'-((ethane-1,2-diylbis(oxy))bis(ethane-2,1-diyl))diacrylamide (EG-BEAAm), and 49.3 g of $H_2O$. The mixture was shaken until all had dissolved.

Solution 2 (Stabilizer):
As in Example 34.
Solution 3 (Emulsion):
As in Example 34.

Redispersion and Analysis:

The crude product was divided into 2×250 mL centrifugation flasks and centrifuged for 25 min at 5000 rpm. The supernatants were removed and the particles were redispersed in isopropanol. The redispersed particles were then split into a total of 6×250 mL centrifuge bottles, washed 4 times with isopropanol and 5 times with $H_2O$ and before final redispersion in $H_2O$. The particles were then filtered through two different filtration mesh fabrics: Sefar Nitex 03-30/18, and Sefar Nitex 03-1/1. The product was analyzed using optical microscopy and disc centrifuge.

Bright field microscopy was performed by diluting the redispersed product to a concentration 0.01 wt % in 150 mM NaCl solution and image statistics was collected from 21 images yielding a mode diameter of 0.90 µm. Relative disc centrifuge diameter using CPS method 3 was determined to 0.53 µm with a CV=5.2%.

Example 36

Solution 1 (Monomer Phase):

A 500 mL Duran flask was charged with 24.8 g of hydroxymethyl acrylamide (HMAAm), 5.0 g of acrylamidopropionic acid (AAPA), 19.9 g of N,N'-((ethane-1,2-diylbis(oxy))bis(ethane-2,1-diyl))diacrylamide (EGBEAAm), and 49.7 g of $H_2O$. The mixture was shaken until all had dissolved.

Solution 2 (Stabilizer):

3.8 g of 2,2'-azodi(2-methylbutyronitrile) (AMBN), 52 g of Abil WE09, 57 g of mineral oil, and 228 g of diethylhexyl carbonate (Tegosoft DEC) were added to a 1000 mL beaker and mixed with a magnetic stir bar until all had dissolved.

Solution 3 (Emulsion):

284 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 17 g of PDMAAm seed (Example 31) were charged into a 1 L jacketed round bottom flask equipped with a condenser, a mechanical stirrer, and a gas inlet and stirred overnight at 100 rpm at 25° C. Finally the flask was purged with Ar (g) for 30 min before heating to 70° C. while stirring at 62 rpm for 7 h.

Redispersion and Analysis:

The crude product was divided into 2×250 mL centrifugation flasks and centrifuged for 20 min at 3000 rpm and 10 min 5000 rpm. The supernatants were removed and the particles were redispersed in isopropanol. The redispersed particles were then split into a total of 6×250 mL centrifuge bottles, washed 4 times with isopropanol and 6 times with $H_2O$ and before final redispersion in $H_2O$. The particles were then filtered through two different filtration mesh fabrics: Sefar Nitex 03-30/18, and Sefar Nitex 03-1/1. The product was analyzed using optical microscopy and disc centrifuge. Bright field microscopy was performed by diluting the redispersed product to a concentration of 0.01 wt % in 150 mM NaCl solution and image statistics was collected from 30 images yielding a mode diameter of 1.0 µm. Relative disc centrifuge diameter using CPS method 3 was determined to 0.57 µm with a CV=6.3%.

Example 37

Solution 1 (Monomer Phase):

A 250 mL Duran flask was charged with 1.8 g of hydroxymethyl acrylamide (HMAAm), 0.7 g of acrylamidopropionic acid (AAPA), 4.9 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (Stabilizer):

2.8 g of 2,2'-azodi(2-methylbutyronitrile) (AMBN), 35 g of Abil WE09, 38 g of mineral oil, and 153 g of diethylhexyl carbonate (Tegosoft DEC) were added to a 400 mL beaker and mixed with a magnetic stir bar until all had dissolved.

Solution 3 (Emulsion):

66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 31) were charged into a 1 L jacketed round bottom flask equipped with a condenser, a mechanical stirrer, and a gas inlet and stirred overnight at 100 rpm at 19° C. Finally the flask was purged with Ar (g) for 30 min before heating to 70° C. while stirring at 55 rpm for 7 h.

Redispersion and Analysis:

The crude product added to a 250 mL centrifugation flask and centrifuged for 20 min at 5000 rpm. The supernatants were removed and the particles were redispersed in isopropanol. The redispersed particles were then split into a total of 2×250 mL centrifuge bottles, washed 3 times with isopropanol and 6 times with $H_2O$ and before final redispersion in $H_2O$. The particles were then filtered through two different filtration mesh fabrics: Sefar Nitex 03-30/18, and Sefar Nitex 03-1/1. The product was analyzed using optical microscopy and disc centrifuge. Bright field microscopy was performed by diluting the redispersed product to a concentration of 0.01 wt % in 150 mM NaCl solution and image statistics was collected from 21 images yielding a mode diameter of 0.84 µm. Relative disc centrifuge diameter using CPS method 3 was determined to 0.41 µm with a CV=9.5%.

Example 38

Solution 1 (Monomer Phase):

A 250 mL Duran flask was charged with 12.3 g of N,N'-((ethane-1,2-diylbis(oxy))bis(ethane-2,1-diyl))diacrylamide (EGBEAAm), and 12.4 g of $H_2O$. The mixture was shaken until all had dissolved.

Solution 2 (Stabilizer):

As in Example 37.

Solution 3 (Emulsion):

As in Example 37.

Redispersion and Analysis:

As in Example 37. The product was analyzed using optical microscopy and disc centrifuge. Bright field microscopy was performed by diluting the redispersed product to a concentration of 0.01 wt % in 150 mM NaCl solution and image statistics was collected from 24 images yielding a mode diameter of 0.85 µm. Relative disc centrifuge diameter using CPS method 3 was determined to 0.50 µm with a CV=8.7%.

Example 39

Solution 1 (Monomer Phase):

A 250 mL Duran flask was charged with 2.1 g of hydroxymethyl acrylamide (HMAAm), 0.3 g of acrylic acid (AA), 4.9 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (Stabilizer):
As in Example 37.
Solution 3 (Emulsion):
As in Example 37.
Redispersion and Analysis:
As in Example 37. The product was analyzed using optical microscopy and disc centrifuge. Bright field microscopy was performed by diluting the redispersed product to a concentration of 0.01 wt % in 150 mM NaCl solution and image statistics was collected from 21 images yielding a mode diameter of 0.85 µm. Relative disc centrifuge diameter using CPS method 3 was determined to 0.42 µm with a CV=7.6%.

2-Stage Particles

Example 40

Stage 1: Swelling and Polymerization of Particles in the Absence of Crosslinker
Solution 1 (12 wt % Hydroxymethyl Acrylamide (HMAAm) Stock Solution):
125 g hydroxymethyl acrylamide monomer (48% solution) and 375 g DI water were mixed until a clear and homogeneous solution is formed.
Solution 2 (Monomer Phase):
5 µL of 1-thioglycerol was added to 2 g of solution 1 (25 wt % HMAAm stock solution). The solution was then heated to ~40° C. to facilitate mixing. 0.08 g of azobisdimethyl valeronitril (V-65) was added to the solution under gentle stirring.
Solution 3 (Stabilizer):
1 g of Hypermer 2296 (stabilizer) was weighed out followed by the addition of 7 g of a 1:1 (vol:vol) heptane:toluene (hereafter referred to as the solvent or H/T) mixture. The stabilizer solution was stirred until a homogeneous solution was obtained.
Solution 4 (Emulsion Phase):
Solutions 2 and 3 were mixed using Ultraturrax for 1 minute, and then sonicated for 3 minutes (6×30 sec intervals) on ice (Branson digital sonifier 450 CE, 40% amplitude). Following emulsification, 0.81 g of a PDMAAm seed (Example 3) was added to the emulsion, and the seed-containing emulsion was allowed to swell overnight (~16 h) at room temperature under gentle stirring/rotation). Following swelling, Solution 4 was polymerized at 50° C. for 7 h under stirring.
Stage 2: Secondary Swelling and Polymerization of Cross-Linked Particles
Solution 5 (Second Stabilizer Solution):
Same as Solution 3.
Solution 6 (Second Monomer Phase):
0.05 g of 1,2-dihydroxy bis acrylamide (DHEBA) was added to 8 mL of solution 1 (25 wt % HMAAm stock solution). The solution was then heated to ~40° C. to facilitate mixing. 0.05 g of azobisdimethyl valeronitril (V-65) was added to the solution under gentle stirring.
Solution 7 (Second Emulsion Phase):
Solutions 5 and 6 were mixed using Ultraturrax for 1 minute, and then sonicated for 3 minutes (6×30 sec intervals) on ice (Branson digital sonifier 450 CE, 40% amplitude).
Redispersion and Analysis:
To a 2 mL eppendorf tube 300 µL of polymerized emulsion, 300 µL of a heptane/toluene mixture (50:50), and 1200 µL of a methanol/deionized water mixture (50:50) were added. The tube was vortexed and centrifuged. The supernatant was removed and the pellet was washed three times with 300 µL heptane/toluene mixture (50:50) and 1200 µL of a methanol/deionized water mixture (50:50). Subsequently one wash in a methanol/deionized water mixture (50:50) and two washes in deionized water were performed before finally resuspending the pellet in 150 µL of deionized water. The product was analyzed using optical microscopy and disc centrifuge. Bright field microscopy was performed by diluting the redispersed product 10 times in 150 mM NaCl solution and image statistics was collected from 21 images yielding a mode diameter of 4.0 µm. Relative disc centrifuge diameter using CPS method 3 was determined to 0.69 µm with a CV=3.4%.

Example 41

Stage 1: Swelling and Polymerization of Particles in the Absence of Crosslinker
Solution 1 (24 wt % Hydroxymethyl Acrylamide (HMAAm) Stock Solution):
25 g hydroxymethyl acrylamide monomer (48% solution) and 25 g DI water are mixed until a clear and homogeneous solution is formed.
Solution 2 (Monomer Phase):
As in Example 40, but using 20 µL of 1-thioglycerol.
Solution 3 (Stabilizer):
As in Example 40.
Solution 4 (Emulsion Phase):
As in Example 40.
Stage 2: Secondary Swelling and Polymerization of Cross-Linked Particles
As in Example 40, but using the 50 wt % HMAAm stock solution.
Redispersion and Analysis:
To a 2 mL eppendorf tube 300 µL of polymerized emulsion, 300 µL of a heptane/toluene mixture (50:50), and 1200 µL of a methanol/deionized water mixture (50:50) were added. The tube was vortexed and centrifuged. The supernatant was removed and the pellet was washed three times with 300 µL heptane/toluene mixture (50:50) and 1200 µL of a methanol/deionized water mixture (50:50). Subsequently one wash in a methanol/deionized water mixture (50:50) and two washes in deionized water were performed before finally resuspending the pellet in 200 µL of deionized water. The product was analyzed using optical microscopy and disc centrifuge. Bright field microscopy was performed by diluting the redispersed product 10 times in 150 mM NaCl solution and image statistics was collected from 21 images yielding a mode diameter of 3.4 µm. Relative disc centrifuge diameter using CPS method 3 was determined to 0.89 µm with a CV=3.8%.

Example 42

Stage 1: Swelling and Polymerization of Particles in the Absence of Crosslinker
Solution 1 (Monomerphase):
A 250 mL Duran flask was charged with 16.0 g of hydroxyethyl acrylamide (HEAAm), 0.3 g of 1-thioglycerol, and 8.3 g of $H_2O$. The mixture was shaken until all had dissolved.
Solution 2 (Stabilizer):
2.6 g of 2,2'-azodi(2-methylbutyronitrile) (AMBN), 32 g of Abil WE09, 35 g of mineral oil, and 139 g of diethylhexyl carbonate (Tegosoft DEC) were added to a 250 mL beaker and mixed with a magnetic stir bar until all had dissolved.

Solution 3 (Emulsion):

65 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 10.3 g of PDMAAm seed were charged into a 250 mL 3-necked round bottom flask equipped with a condenser, a mechanical stirrer, and a gas inlet and stirred overnight at 100 rpm at 20° C. Finally the flask was purged with Ar (g) for 30 min before heating to 70° C. while stirring at 53 rpm for 7 h.

Stage 2: Secondary Swelling and Polymerization of Cross-Linked Particles

Solution 5 (Second Monomer Phase):

A 250 mL Duran flask was charged with 7.1 g of hydroxyethyl acrylamide (HEAAm), 2.4 g of N,N'-((ethane-1,2-diylbis(oxy))bis(ethane-2,1-diyl))diacrylamide (EGBEAAm), and 14.2 g of $H_2O$. The mixture was shaken until all had dissolved.

Solution 6 (Second Stabilizer):

2.6 g of 2,2'-azodi(2-methylbutyronitrile) (AMBN), 34 g of Abil WE09, 37 g of mineral oil, and 147 g of diethylhexyl carbonate (Tegosoft DEC) were added to a 400 mL beaker and mixed with a magnetic stir bar until all had dissolved.

Solution 7 (Second Emulsion):

69 g of solution 6 was added to solution 5 followed by mixing using an Ultraturrax for 1 min. Further emulsification was performed by sonication using an UP 200s from Hielscher Ultrasound Technology with cycle setting 0.9 and amplitude setting 40%. In the next step solution 7 and 7.7 g of polymerized solution 3 were charged into a 250 mL 3-necked round bottom flask equipped with a condenser, a mechanical stirrer, and a gas inlet and stirred overnight at 100 rpm at 22° C. Finally the flask was purged with Ar (g) for 30 min before heating to 70° C. while stirring at 56 rpm for 7 h.

Redispersion and Analysis:

The crude product added to a 250 mL centrifugation flask and centrifuged for 30 min at 5000 rpm. The supernatant was removed and the particles were redispersed in isopropanol. The redispersed particles were then washed 2 times with isopropanol and 14 times with $H_2O$ and before final redispersion in $H_2O$. The product was analyzed using optical microscopy and disc centrifuge. Bright field microscopy was performed by diluting the redispersed product to a concentration of 0.05 wt % in 150 mM NaCl solution and image statistics was collected from 97 images yielding a mode diameter of 5.6 μm. Relative disc centrifuge diameter using CPS method 3 was determined to 2.0 μm with a CV=7.5%.

Example 43

Stage 1: Swelling and Polymerization of Particles in the Absence of Crosslinker

Solution 1 (Monomer Phase):

As in Example 42.

Solution 2 (Stabilizer):

2.6 g of 2,2'-azodi(2-methylbutyronitrile) (AMBN), 32 g of Hypermer 2296, 88 g of toluene, and 89 g of heptane were added to a 400 mL beaker and mixed with a magnetic stir bar until all had dissolved.

Solution 3 (Emulsion):

As in Example 42, but using this example's solutions.

Stage 2: Secondary Swelling and Polymerization of Cross-Linked Particles

Solution 5 (Second Monomer Phase):

A 250 mL Duran flask was charged with 7.0 g of hydroxyethyl acrylamide (HEAAm), 2.3 g of N,N'-((ethane-1,2-diylbis(oxy))bis(ethane-2,1-diyl))diacrylamide (EGBEAAm), and 14.1 g of $H_2O$. The mixture was shaken until all had dissolved.

Solution 6 (Second Stabilizer):

0.96 g of 2,2'-azodi(2-methylbutyronitrile) (AMBN), 12 g of Hypermer 2296, 34 g of toluene, and 34 g of heptane were added to a 250 mL beaker and mixed with a magnetic stir bar until all had dissolved.

Solution 7 (Second Emulsion):

67 g of solution 6 was added to solution 5 followed by mixing using an Ultraturrax for 1 min. Further emulsification was performed by sonication using an UP 200s from Hielscher Ultrasound Technology with cycle setting 0.9 and amplitude setting 40%. In the next step solution 7 and 7.7 g of polymerized solution 3 were charged into a 250 mL 3-necked round bottom flask equipped with a condenser, a mechanical stirrer, and a gas inlet and stirred overnight at 100 rpm at 22° C. Finally the flask was purged with Ar (g) for 30 min before heating to 70° C. while stirring at 55 rpm for 7 h.

Redispersion and Analysis:

The crude product added to a 250 mL centrifugation flask and centrifuged for 5 min at 3000 rpm. The supernatant was removed and the particles were redispersed in isopropanol. The redispersed particles were then washed 3 times with isopropanol and 10 times with $H_2O$ and before final redispersion in $H_2O$. The product was analyzed using optical microscopy and disc centrifuge. Bright field microscopy was performed by diluting the redispersed product to a concentration of 0.02 wt % in 150 mM NaCl solution and image statistics was collected from 72 images yielding a mode diameter of 4.4 μm. Relative disc centrifuge diameter using CPS method 3 was determined to 1.3 μm with a CV=7.1%.

Multifunctional Cross-Linkers

Example 44

Synthesis of N,N-bis(2-acrylamidoethyl)acrylamide (BAAmEAAm). Diethylenetriamine (14.63 g; 142 mmol) was dissolved in 200 mL acetonitrile. Potassium carbonate (64.68 g; 468 mmol) was added and the reaction mixture was cooled to 0° C. with an ice bath. Acryloyl chloride (36.3 mL, 447 mmol) was added dropwise over approximately 45 minutes. The ice bath was removed and the reaction was stirred at ambient temperature for two hours. The reaction mixture was filtered and the filtercake was rinsed with 200 mL $CH_2Cl_2$. Inhibitor (phenothiazine, 10.1 mg) was added to the filtrate before the volatiles were removed under reduced pressure at 25° C. The crude material was purified by dry flash chromatography on silica using a gradient of methanol in dichloromethane. The fractions containing product were pooled and 9.9 mg of phenothiazine was added before finally drying the product under vacuum. Yield 12.97 g.

Example 45

Solution 1 (Monomer Phase):

A 250 mL Duran flask was charged with 3.1 g of hydroxyethyl acrylamide (HEAAm), 0.7 g of acrylamidopropionic acid (AAPA), 3.7 g of N,N'-((ethane-1,2-diylbis(oxy))bis(ethane-2,1-diyl))diacrylamide (EGBEAAm), 0.3 g of N,N- bis(2-acrylamidoethyl)acrylamide (BAAmEAAm) and 17 g of H$_2$O. The mixture was shaken until all had dissolved.

Solution 2 (Stabilizer):

2.6 g of 2,2'-azodi(2-methylbutyronitrile) (AMBN), 32 g of Abil WE09, 35 g of mineral oil, and 140 g of diethylhexyl carbonate (Tegosoft DEC) were added to a 250 mL beaker and mixed with a magnetic stir bar until all had dissolved.

Solution 3 (Emulsion):

65 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.87 g of PDMAAm seed (Example 31) were charged into a 250 mL 3-necked round bottom flask equipped with a condenser, a mechanical stirrer, and a gas inlet and stirred overnight at 100 rpm at 20° C. Finally the flask was purged with Ar (g) for 30 min before heating to 70° C. while stirring at 53 rpm for 7 h.

Redispersion and Analysis:

70 g the crude product was added into a 1000 mL centrifugation flask together with 500 mL H$_2$O and 2-butanol followed by shaking for 30 min. The mixture was then centrifuged and the top 2-butanol phase removed followed by additionally 2×200 mL 2-butanol washes. The suspension was then divided into 6×250 mL centrifuge bottle and washed with H$_2$O 6 times before final redispersion in H$_2$O. The product was analyzed using optical microscopy and disc centrifuge. Bright field microscopy was performed by diluting the redispersed product to a concentration of 0.01 wt % in 150 mM NaCl solution and image statistics was collected from 25 images yielding a mode diameter of 0.82 µm. Relative disc centrifuge diameter using CPS method 3 was determined to 0.43 µm with a CV=4.6%.

Example 46

Solution 1 (Monomer Phase):

A 250 mL Duran flask was charged with 3.0 g of hydroxyethyl acrylamide (HEAAm), 0.7 g of acrylamidopropionic acid (AAPA), 3.7 g of N,N'-((ethane-1,2-diylbis(oxy))bis(ethane-2,1-diyl))diacrylamide (EGBEAAm), 0.2 g of 4-arm PEG-acrylamide and 17 g of H$_2$O. The mixture was shaken until all had dissolved.

Solution 2 (Stabilizer):

As in Example 45.

Solution 3 (Emulsion):

As in Example 45.

Redispersion and Analysis:

70 g the crude product was added into a 1000 mL centrifugation flask together with 500 mL H$_2$O and 2-butanol followed by shaking for 60 min. The mixture was then centrifuged and the top 2-butanol phase removed followed by additionally one wash with 2-butanol. The suspension was then washed with H$_2$O 5 times before final redispersion in H$_2$O. The product was analyzed using optical microscopy and disc centrifuge. Bright field microscopy was performed by diluting the redispersed product to a concentration of 0.01 wt % in 150 mM NaCl solution and image statistics was collected from 11 images yielding a mode diameter of 0.86 µm. Relative disc centrifuge diameter using CPS method 3 was determined to 0.41 µm with a CV=6.0%.

Example 47

Solution 1 (Monomer Phase):

A 250 mL Duran flask was charged with 1.8 g of hydroxyethyl acrylamide (HEAAm), 0.7 g of acrylamidopropionic acid (AAPA), 2.5 g of N,N-bis(2-acrylamidoethyl)acrylamide (BAAmEAAm) and 20 g of H$_2$O. The mixture was shaken until all had dissolved.

Solution 2 (Stabilizer):

As in Example 45.

Solution 3 (Emulsion):

As in Example 45.

Redispersion and Analysis:

70 g the crude product was added into a 1000 mL centrifugation flask together with 500 mL H$_2$O and 2-butanol followed by shaking for 60 min. The mixture was then centrifuged and the top 2-butanol phase removed followed by additionally one wash with 2-butanol. The suspension was then divided into 6×250 mL centrifuge bottle and washed with H$_2$O 5 times before final redispersion in H$_2$O. The product was analyzed using optical microscopy and disc centrifuge. Bright field microscopy was performed by diluting the redispersed product to a concentration of 0.01 wt % in 150 mM NaCl solution and image statistics was collected from 24 images yielding a mode diameter of 0.67 µm. Relative disc centrifuge diameter using CPS method 3 was determined to 0.39 µm with a CV=6.4%.

Activation of a Hydrogel Containing Carboxylate Groups.

Example 48

To a 7200 µL suspension of particles of Example 32 in NMP, is added 22.6 mg of O—(N-Succinimidyl)-N,N,N',N'-tetramethyluroniumtetrafluoroborate (TSTU), 27 µL of tributylamine, and NMP to a final volume of 7.5 mL. After shaking at room temperature for 1 h, the suspension is centrifuged at 15,000 rpm for 50 min. The supernatant is removed from the resulting pellet, and the pellet is re-suspended into 4 mL of fresh NMP and centrifuged for 1 h at 15,000 rpm. The supernatant is removed from the NHS ester activated hydrogel comprising resulting pellet. Repeat the 4 mL NMP wash/spin one more time.

Example 49

As per Example 48, but using a 7300 µL suspension of particles of Example 33.

Conjugation of the Hydrogel with Amine Terminal DNA Probe

Example 50

An amount of 193.4 µL of a 5.17 mM NMP solution of 5'-amine terminated 30-mer oligonucleotide (that has tetrabutylammonium counter ion for each oligonucleotide phosphate group) is added to the carboxylate NHS ester hydrogel pellet from Example 48. This suspension is diluted to 9.976 mL with NMP. After addition of 23.8 microliter of 42 mM tributylamine in NMP, total reaction volume of 10 mL, the reaction vessel is agitated in a thermomixer at 66° C. for 16 h. It is added 10 mL water and cooled to room temperature, to this mixture is added 10 mL 0.25 M NaOH. It is agitated in a thermomixer for 15 min at room temperature and 1 mL 50×TE is added, followed by centrifugation for 50 min, and removal of the supernatant. The resulting pellet is re-suspended in 10 milliliter of 1×TE, followed by centrifugation for 50 min, and removal of the supernatant. At this point, the hydrogel pellet is re-suspended in 10 mL of 1×TE buffer and heated at 80° C. for 1 h; after centrifugation (50 min at 15,000 rpm) and removal of the supernatant, the conjugated hydrogels are washed, as above, with 10 mL of 1×TE, followed by centrifugation for 50 min, and removal of the supernatant. The resulting pellet is re-suspended in 14 mL of deionized water and filtered with 5 μm syringe filter for later use

Example 51

As in Example 50, but using the carboxylate NHS ester hydrogel pellet from Example 49.
Templating with OCP143 Library, Chip Loading and Sequencing

Example 52

For more information see user guides on thermofisher. com, the following is a brief description. The conjugated particles were templated with a DNA library of size 100-120 basepairs by emulsion PCR. The templating was performed on the automated Ion Chef™ instrument using 530 v1 standard Ion Chef™ reagents and consumables. The particles were manually loaded onto the chips and the sequencing was performed on an Ion Proton™ sequencer. Key metrics from the sequencing from conjugated particles in Example 50: 1.4 M total reads, 98.6% raw read accuracy and 75 bases AQ20 mean (probability of incorrect base call 1%). Key metrics from the sequencing from conjugated particles in Example 51: 3.0 M total reads, 98.7% raw read accuracy and 83 bases AQ20 mean

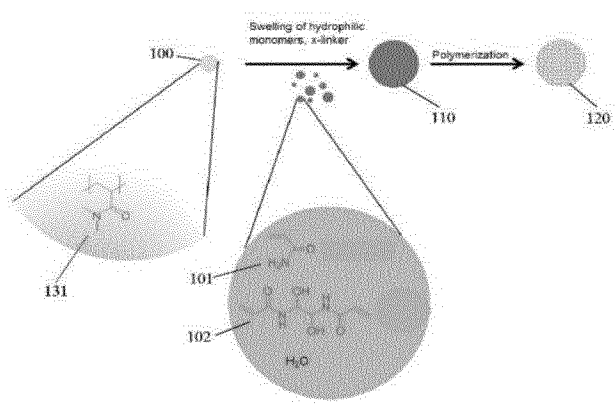

The invention claimed is:
1. Monodisperse cross-linked hydrogel polymer particles comprising a polymer formed from
   (a) a hydrophilic vinylic monomer having a log $P_{oct/wat}$ (log P) of less than about 1; and
   (b) a crosslinker comprising at least two vinyl groups, wherein the crosslinker comprises at least one compound of formula (IIa) or (IIb):

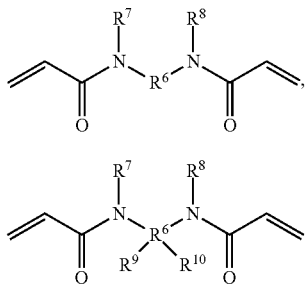

wherein $R^6$ is selected from —$C_1$—$C_6$ alkyl—, —$C_1$—$C_6$ heteroalkyl-, —$C_1$—$C_6$ cycloalkyl—, —$C_1$—$C_6$ hydroxyalkyl—, —$C_1$—$C_6$ ether—, or polyether comprising 2 to 100 $C_2$—$C_3$ ether units;
$R^7$ and $R^8$ are each independently selected from —H, —$C_1$—$C_6$ alkyl, —$C_1$—$C_6$ heteroalkyl, —$C_3$—$C_6$ cycloalkyl, —$C_1$—$C_6$ hydroxyalkyl, or —$C_1$—$C_6$ ether;
$R^9$ is —N($R^{11}$)C(O)CH=$CH_2$;
$R^{10}$ is selected from —H and —N($R^{12}$)C(O)CH=$CH_2$; and
$R^{11}$ and $R^{12}$ are each independently selected from —H, —$C_1$—$C_6$ alkyl, —$C_1$—$C_6$ heteroalkyl, —$C_3$—$C_6$ cycloalkyl, —$C_1$—$C_6$ hydroxyalkyl, or —$C_1$—$C_6$ ether;

optionally wherein one or more of $R^6$, $R^7$, $R^8$, $R^9$, $R^{10}$, $R^{11}$ and $R^{12}$ are independently substituted, where chemically possible, by 1 to 5 substituents which are each independently at each occurrence selected from: oxo, =$NR^a$, =$NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$—$C_4$—alkyl, $C_2$—$C_4$—alkenyl, $C_2$—$C_4$—alkynyl, $C_1$—$C_4$ haloalkyl; wherein $R^a$ is independently at each occurrence selected from: H, $C_1$—$C_4$ alkyl and $C_1$—$C_4$ alkenyl, wherein when the monodisperse cross-linked hydrogel polymer particles are in aqueous solution, the particles each absorb at least 20% of their weight of the solution.

2. The polymer particles of claim 1, wherein the hydrophilic vinylic monomer has a log P of less than about 0.6.
3. The polymer particles of claim 1, wherein the hydrophilic vinylic monomer has a log P of from 0.5 to −2.
4. The polymer particles of claim 1, wherein the hydrophilic vinylic monomer is an acrylamide monomer and/or an acrylate monomer.
5. The polymer particles of claim 1, wherein the hydrophilic vinylic monomer comprises at least one compound of formula (I):

wherein:
$R^1$ is —H, —$CH_3$ or —$CH_2CH_3$;
$R^2$ is —$OR^3$ or —N($R^4$)$R^5$;
$R^3$ is —H, —$C_1$—$C_6$ alkyl, or —$C_1$—$C_6$ alcohol; and
$R^4$ and $R^5$ are each independently selected from —H, —$C_1$—$C_6$ alkyl, —$C_1$—$C_6$ haloalkyl, —$C_1$—$C_6$ alcohol, wherein $R^3$ and/or $R^4$ and/or $R^5$ are optionally each independently substituted, where chemically possible, by 1 to 5 substituents which are each independently at each occurrence selected from: oxo, =$NR^a$, =$NOR^a$, halo, nitro, cyano, $NR^aR^a$, $NR^aS(O)_2R^a$, $NR^a$ $CONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$—$C_4$—alkyl, $C_2$—$C_4$—alkenyl, $C_2$—$C_4$—alkynyl, $C_1$—$C_4$ haloalkyl; wherein $R^a$ is independently at each occurrence selected from: H and $C_1$—$C_4$ alkyl.

6. The polymer particles of claim 5, wherein $R^1$ is —H or —$CH_3$.
7. The polymer particles of claim 5, wherein $R^2$ is —$OR^3$.
8. The polymer particles of claim 5, wherein $R^3$ is —H.
9. The polymer particles of any of claim 5, wherein $R^4$ is —H or —$C_1$—$C_6$ alkyl.
10. The polymer particles of claim 5, wherein $R^5$ may be —H or —$C_1$—$C_6$ alkyl.
11. The polymer particles of claim 1, wherein the hydrophilic vinlyic monomer is selected from or comprises at least one acrylamide monomer, acrylic monomer, methacrylamide monomer, or methacrylic monomer.
12. The polymer particles of claim 1, wherein the hydrophilic vinylic monomer is selected from or comprises acrylamide, hydroxymethyl acrylamide, hydroxyethyl acrylamide, [tris(hydroxymethyl)methyl]acrylamide, 3-acrylamidopropanoic acid, methacrylamide, 2-hydroxyethyl methacrylamide, (3-aminopropyl)methacrylamide, or 2-hydroxyethyl acrylate; optionally wherein the hydrophilic vinylic monomer is selected from or comprises at least one of acrylamide (prop-2-enamide), hydroxymethyl acrylamide, hydroxyethylacrylamide, trishydroxymethyl methacrylamide, 2-hydroxyethyl methacrylate and acrylic acid.

13. The polymer particles of claim 1, wherein the hydrophilic vinylic monomer comprises a primary amide group (—C(O)NH$_2$).

14. The polymer particles of claim 1, wherein the crosslinker has a log P value of less than about 1.

15. The polymer particles of claim 1, wherein the crosslinker is or comprises N,N'-(1,2-dihydroxyethylene)bisacrylamide, N,N'-methylenebis(acrylamide), N,N'-ethylenebis(acrylamide), glycerol 1,3-diglycerolate diacrylate, piperazine diacrylamide, N,N'-((ethane-1,2-diylbis(oxy))bis(ethane-2,1-diyl))diacrylamide, polyethyleneglycol diacrylamide (MW≤2000), 4-Arm PEG-Acrylamide (MW≤2000), and/or N,N-bis(2-acrylamidoethyl)acrylamide.

16. Monodisperse cross-linked hydrogel polymer particles comprising a polymer formed from
(a) a hydrophilic vinylic monomer having a log P$_{oct/wat}$ (log P) of less than about 1; and
(b) a crosslinker comprising at least two vinyl groups, wherein the crosslinker is or comprises N,N'-((ethane-1,2-diylbis(oxy))bis(ethane-2,1-diyl))diacrylamide, or polyethyleneglycol diacrylamide (MW≤2000) or 4-Arm PEG-Acrylamide (MW≤2000), wherein when the monodisperse cross-linked hydrogel polymer particles are in aqueous solution, the particles each absorb at least 20% of their weight of the solution.

17. A method of forming monodisperse crosslinked hydrogel polymer particles comprising:
forming a solution (a) of at least 2% wt of a hydrophilic vinylic monomer in an aqueous solution, the solution also comprising a crosslinker comprising at least two vinyl groups, wherein the crosslinker comprises at least one compound of formula (IIa) or (IIb):

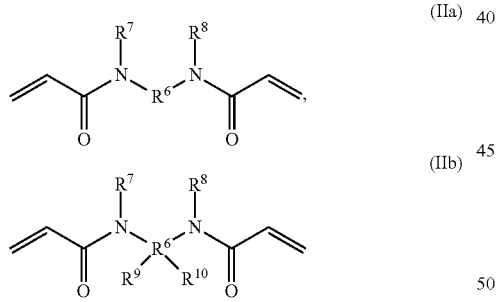

wherein R$^6$ is selected from —C$_1$—C$_6$ alkyl—, —C$_1$—C$_6$ heteroalkyl—, —C$_1$—C$_6$ cycloalkyl—, —C$_1$—C$_6$ hydroxyalkyl—, —C$_1$—C$_6$ ether—, or polyether comprising 2 to 100 C$_2$—C$_3$ ether units;

R$^7$ and R$^8$ are each independently selected from —H, —C$_1$—C$_6$ alkyl, —C$_1$—C$_6$ heteroalkyl, —C$_3$—C$_6$ cycloalkyl, —C$_1$—C$_6$ hydroxyalkyl, or —C$_1$-C$_6$ ether;

R$^9$ is —N(R$^{11}$)C(O)CH═CH$_2$;

R$^{10}$ is selected from —H and —N(R$^{12}$)C(O)CH═CH$_2$; and

R$^{11}$ and R$^{12}$ are each independently selected from —H, —C$_1$—C$_6$ alkyl, —C$_1$—C$_6$ heteroalkyl, —C$_3$—C$_6$ cycloalkyl, —C$_1$—C$_6$ hydroxyalkyl, or —C$_1$—C$_6$ ether;

optionally wherein one or more of R$^6$, R$^7$, R$^8$, R$^9$, R$^{10}$, R$^{11}$ and R$^{12}$ are independently substituted, where chemically possible, by 1 to 5 substituents which are each independently at each occurrence selected from: oxo, ═NR$^a$, ═NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, S(O)R$^a$, S(O)$_2$OR$^a$, S(O)$_2$R$^a$, S(O)$_2$NR$^a$R$^a$, CO$_2$R$^a$ C(O)R$^a$, CONR$^a$R$^a$, C$_1$—C$_4$—alkyl, C$_2$—C$_4$—alkenyl, C$_2$—C$_4$—alkynyl, C$_1$—C$_4$ haloalkyl; wherein R$^a$ is independently at each occurrence selected from: H, C$_1$—C$_4$ alkyl and C$_1$—C$_4$ alkenyl;

forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion;

allowing the monodisperse seed particles to form swollen particles in the emulsion; and polymerizing the swollen particles to form the monodisperse crosslinked hydrogel polymer particles, wherein when the monodisperse cross-linked hydrogel polymer particles are in aqueous solution, the particles each absorb at least 20% of their weight of the solution.

18. A method of forming monodisperse crosslinked hydrogel polymer particles comprising:
forming a solution (a) of at least 2% wt of a hydrophilic vinylic monomer in an aqueous solution, the solution also comprising a crosslinker, wherein the crosslinker is or comprises N,N-((ethane-1,2-diylbis(oxy))bis(ethane-2,1-diyl))diacrylamide, polyethyleneglycol diacrylamide (MW≤2000) or 4-Arm PEG-Acrylamide (MW≤2000);

forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion;

allowing the monodisperse seed particles to form swollen particles in the emulsion; and polymerizing the swollen particles to form the monodisperse crosslinked hydrogel polymer particles, wherein when the monodisperse cross-linked hydrogel polymer particles are in aqueous solution, the particles each absorb at least 20% of their weight of the solution.

* * * * *

UNITED STATES PATENT AND TRADEMARK OFFICE
CERTIFICATE OF CORRECTION

| | | |
|---|---|---|
| PATENT NO. | : 10,836,854 B2 | Page 1 of 5 |
| APPLICATION NO. | : 15/745620 | |
| DATED | : November 17, 2020 | |
| INVENTOR(S) | : Geir Fonnum et al. | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIGS. 1-5 with FIGS. 1-5 as shown on the attached pages.

In the Claims

In Column 71, Claim 1, Line 32, delete "from" and insert -- from: --, therefor.

In Column 73, Claim 16, Line 20, delete "from" and insert -- from: --, therefor.

In Column 74, Claim 18, Lines 38-39, delete "N,N-((ethane-1,2-diylbis(oxy))bis(ethane-2,1-diyl))diacrylamide," and insert -- N,N'-((ethane-1,2-diylbis(oxy))bis(ethane-2,1-diyl))diacrylamide, --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*

(12) United States Patent
Fonnum et al.

(10) Patent No.: US 10,836,854 B2
(45) Date of Patent: Nov. 17, 2020

(54) INVERSE UGELSTAD PARTICLES

(71) Applicant: LIFE TECHNOLOGIES AS, Olso (NO)

(72) Inventors: Geir Fonnum, Oslo (NO); Nils Pontus Lundberg, Strømmen (NO); Muhammed Talha Gokmen, Fjellhamar (NO); Synne Larsen, Oslo (NO); Wilhelm Glomm, Malvik (NO); Heidi Johnsen, Trondheim (NO); Ruth Schmid, Tiller (NO); Lars Kilaas, Trondheim (NO)

(73) Assignees: SINTEF, Trondheim (NO); LIFE TECHNOLOGIES AS, Oslo (NO)

( * ) Notice: Subject to any disclaimer, the term of this patent is extended or adjusted under 35 U.S.C. 154(b) by 0 days.

(21) Appl. No.: 15/745,620

(22) PCT Filed: Jul. 19, 2016

(86) PCT No.: PCT/EP2016/067218
§ 371 (c)(1),
(2) Date: Jan. 17, 2018

(87) PCT Pub. No.: WO2017/013138
PCT Pub. Date: Jan. 26, 2017

(65) Prior Publication Data
US 2018/0215852 A1    Aug. 2, 2018

(30) Foreign Application Priority Data
Jul. 20, 2015   (GB) .................................. 1512725.1

(51) Int. Cl.
*C08F 265/10* (2006.01)
*C08F 120/54* (2006.01)
*C08F 265/06* (2006.01)

(52) U.S. Cl.
CPC .......... *C08F 265/10* (2013.01); *C08F 120/54* (2013.01); *C08F 265/06* (2013.01)

(58) Field of Classification Search
CPC ..... C08F 265/10; C08F 265/06; C08F 120/54
See application file for complete search history.

(56) References Cited

U.S. PATENT DOCUMENTS

| | | | | |
|---|---|---|---|---|
| 4,539,200 | A * | 9/1985 | Quarfoot | A61K 31/785 424/78.06 |
| 6,133,047 | A * | 10/2000 | Elaissari | B03C 1/01 427/127 |
| 2013/0210991 | A1 | 8/2013 | Fonnum et al. | |

FOREIGN PATENT DOCUMENTS

| | | | | |
|---|---|---|---|---|
| CN | 1631913 A | 6/2005 | | |
| EP | 1564227 | 8/2005 | | |
| EP | 1564227 A1 * | 8/2005 | ........ | C08F 257/02 |
| JP | S62135573 A | 6/1987 | | |
| JP | H081895 A | 1/1996 | | |
| JP | 2002542318 A | 12/2002 | | |
| JP | 2005501960 A | 1/2005 | | |
| WO | WO-03022316 A1 | 3/2003 | | |
| WO | WO-2004/011513 | 2/2004 | | |
| WO | WO-2017013138 A1 | 1/2017 | | |

OTHER PUBLICATIONS

International Search Report and Written Opinion 2016, 1-10.

* cited by examiner

*Primary Examiner* — Robert D Harlan

(57) ABSTRACT

This invention relates to monodisperse cross-linked hydrogel polymer particles comprising a polymer formed from (a) a hydrophilic vinylic monomer; and (b) a crosslinker comprising at least two vinyl groups. The invention also relates to monodisperse seed particles with a Z-average diameter of from 100 nm to 1500 nm that comprise a plurality of non-crosslinked oligomers of poly N,N-dimethylacrylamide. Also provided are methods of forming the monodisperse cross-linked hydrogel polymer particles and monodisperse seed particles.

18 Claims, 3 Drawing Sheets